US006681174B1

(12) United States Patent
Harvey et al.

(10) Patent No.: US 6,681,174 B1
(45) Date of Patent: Jan. 20, 2004

(54) METHOD AND SYSTEM FOR OPTIMUM BUS RESOURCE ALLOCATION

(76) Inventors: Lee Harvey, 111 Willow Point Rd, Winnipeg (CA), R2J 2P7; Eugene Pachet, 90 Paulley Dr, Winnipeg (CA), R2C 3K4

(*) Notice: Subject to any disclaimer, the term of this patent is extended or adjusted under 35 U.S.C. 154(b) by 0 days.

(21) Appl. No.: 09/722,824

(22) Filed: Nov. 28, 2000

Related U.S. Application Data

(60) Provisional application No. 60/225,736, filed on Aug. 17, 2000.

(51) Int. Cl.⁷ ........................... G06F 17/60; G01S 3/02

(52) U.S. Cl. ....................................... 701/117; 340/433

(58) Field of Search .......................... 701/9, 43, 23–29, 701/31–32, 36, 39, 44, 117–123, 200–202, 207–211, 213–215, 224–225, 300–302; 340/425.5, 430–438, 459–463, 988–996; 342/352, 450, 357.01–357.09, 357.12–357.13, 357.17, 454–458; 455/403–404, 426, 39, 507, 95–100

(56) References Cited

U.S. PATENT DOCUMENTS

| | | | | | |
|---|---|---|---|---|---|
| 5,598,167 | A | * | 1/1997 | Zijderhand | 342/457 |
| 5,602,739 | A | * | 2/1997 | Haagenstad | 701/117 |
| 5,604,676 | A | * | 2/1997 | Penzias | 705/417 |
| 5,724,243 | A | * | 3/1998 | Westerlage et al. | 455/456 |
| 6,028,537 | A | * | 2/2000 | Suman et al. | 340/988 |
| 6,087,984 | A | * | 7/2000 | Keller et al. | 342/357.17 |
| 6,140,956 | A | * | 10/2000 | Hillman et al. | 342/357.05 |
| 6,275,773 | B1 | * | 8/2001 | Lemelson et al. | 340/436 |
| 6,437,743 | B1 | * | 8/2002 | Mintz et al. | 342/463 |

FOREIGN PATENT DOCUMENTS

| | | | |
|---|---|---|---|
| JP | 08-292988 | * 11/1996 | G06F/17/60 |

* cited by examiner

*Primary Examiner*—Thu Nguyen
(74) *Attorney, Agent, or Firm*—Dorsey & Whitney LLP

(57) ABSTRACT

A system and method allow for optimum allocation of buses or similar vehicles. The buses may form a fleet in a metropolitan transportation system. Each bus may be assigned to complete one or more routes during a given time period. Using geo-satellite position system technology, a bus may determine its current location and provide the current location to a local bus operating center or hub. The hub may monitor locations of known obstacles, and may monitor progress of the bus in completing its route. If an obstacle could interfere with route completion, the hub may send an alert and an alternate route to the bus. If a bus cannot complete its assigned route due to the presence of obstacles, the hub may determine that one or more additional buses must be put in service to satisfy required bus routing.

20 Claims, 81 Drawing Sheets

METHOD AND SYSTEM FOR OPTIMUM BUS RESOURCE ALLOCATION

RELATED APPLICATIONS

This application claims the benefit of U.S. Provisional Application Serial No. 60/225,736, filed Aug. 17, 2000.

TECHNICAL FIELD

The technical field relates to systems and methods used to monitor the status and control the operation of a motor vehicle.

BACKGROUND

Most engine-powered vehicles use monitoring devices to detect the presence of various undesirable operating conditions, such as engine over heating, low oil pressure, and low fuel, and include indicators to warn the operator of such conditions. Not all of the various monitored parameters have the same importance. For example, an engine air filter or a hydraulic fluid filter may gradually clog during operation of the vehicle. The vehicle operator should be warned of such clogging, but generally there is no need to immediately remedy the situation, and the vehicle can be operated until for some time before servicing and maintenance. A low fuel condition requires more immediate attention from the operator. A loss of engine oil pressure or a loss of hydraulic fluid represent conditions which require immediate operator attention to prevent damaging the vehicle.

Current monitoring systems detect the undesirable conditions and signal the vehicle operator by means of dial indicators, indicator lamps, or audible means. The efficiency of these systems depends upon the operator's careful attention to all of the various indicators and upon his judgement as to which may call for immediate correction. As the complexity of a vehicle increases, the number of monitored parameters generally increases. Therefore, the operator is required to direct more attention to the increasing number of indicators, and less attention to operating the vehicle.

When considering single vehicles, current on-board monitoring systems, and current diagnostic systems, focus on the parameters and test measurements of a single vehicle. No system exists to allow monitoring of a fleet of vehicles from a single remote location. Further, current systems do not allow trend analysis of a fleet of vehicles by aggregating trouble reports or similar data, and do not provide real-time or near-real-time assistance to local operators and repair technicians.

Current on-board monitoring systems also do not allow for real-time monitoring of on-board parameters at one or more remote locations and do not allow for remote vehicle control. For example, current monitoring systems do not provide a remote location with the ability to shut off an operating vehicle's engine.

Another drawback of current on-board monitoring systems is the need to perform partial or complete disassembly of components or systems to determine the nature and extent of an abnormal condition. This disassembly may be costly in terms of time and replacement parts, and may cause further damage to the vehicle.

SUMMARY

A vehicle electrical and diagnostic system includes a communications bus installed in the vehicle. Input/output (I/O) blocks are coupled to the communications bus. Also coupled to the bus is an industrial computer. The computer drives the vehicle's operating program. The computer also acts as an interface between the vehicle's systems and a human technician. The I/O blocks receive data from sensors installed in various locations within the vehicle and provide the data to the computer using the communications bus.

The computer may be used locally or remotely to diagnose the vehicle's components. The operating program on the vehicle may also be used to remotely control the vehicle. In an embodiment, one or more buses are coupled, using a wireless communications network to a hub or local bus operating center. Such a center may be part of a metropolitan transit authority, for example. As many as 256 or more such buses may be associated with each hub, and the transit authority may use many hubs for its fleet of transit buses. The buses use the wireless communications network to pass operating and diagnostic data in a real-time, near real-time and delayed manner. The transmitted data may be collected and stored at an Internet web site that may be associated with the hub. The data may then be accessed by a central support system that also accesses the Internet web site. The accessed data may be used to help make management, design and engineering decisions regarding the buses. For example, the central support system can collect engine trend analysis data that may indicate premature wear of engine piston rings. Using this data, the central support system can allocate more spare piston rings to its supply center, and may review engine design to improve wear characteristics.

The hub or the central support center may also use received operating data to monitor operation of one or more buses. The hub or the central support system may issue control signals to control operation of one or more bus components or systems. For example, the central support system may send control signals to open a switch in a bus engine control circuit to cause the bus engine to shutdown. Technicians at the central support system may access programming identical to that onboard the bus, and may, using a HMI (human to machine interface), select a "switch" to open. This operation then sends the control signal through the Internet web site and to the bus onboard computer to cause the bus programming to initiate the switch open command.

The hub or central support center and the bus 100 may use a geo-satellite positioning system (GPS) to maintain an accurate track of location of the bus. Using bus location information, the hub may optimize bus routing, steering the bus around obstacles, and may allocate other bus resources based on real-time routing and bus location information provided by the GPS.

DESCRIPTION OF THE DRAWINGS

The detailed description will refer to the following drawings wherein like numbers refer to like elements, and wherein.

DETAILED DESCRIPTION

Figure 1:
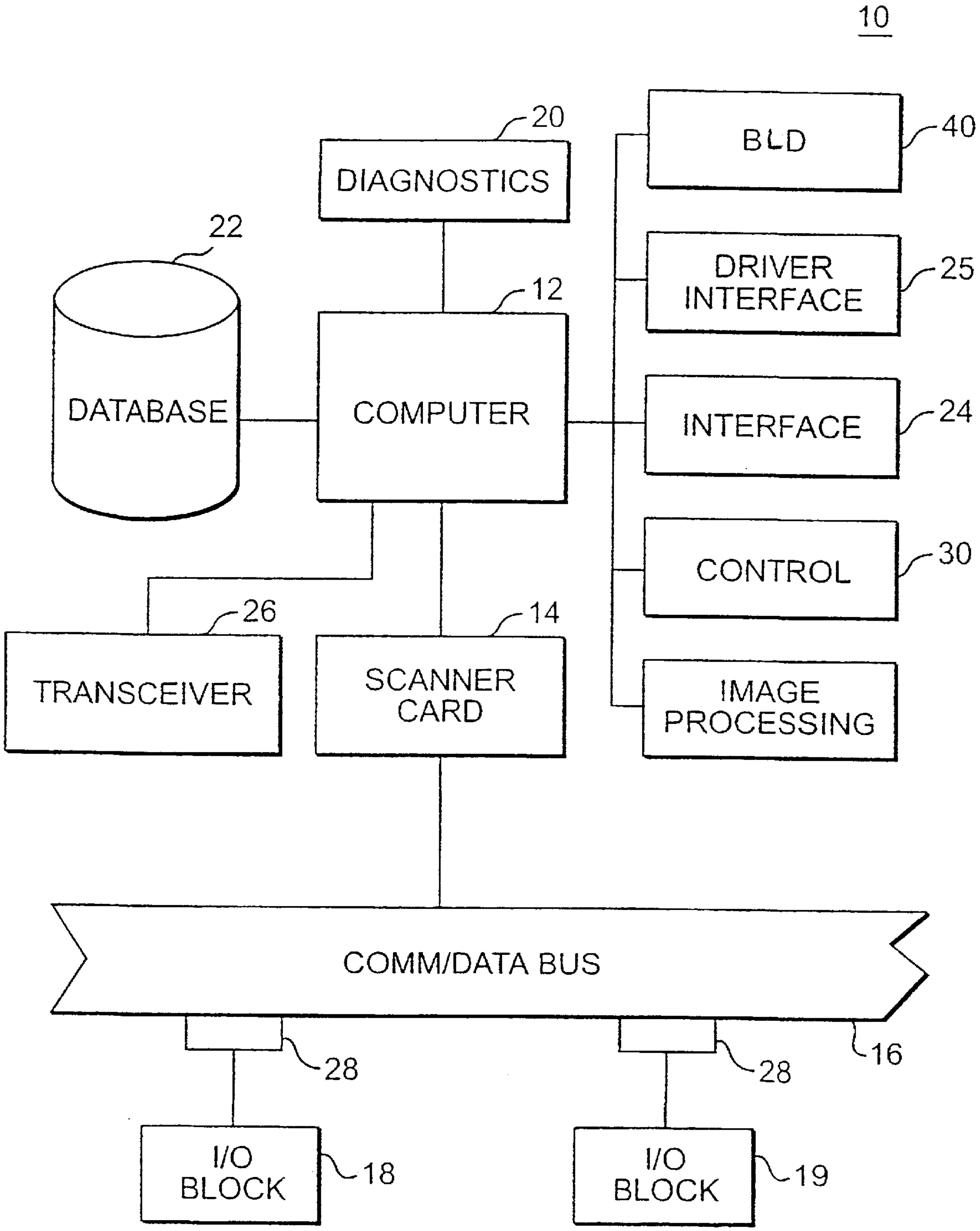
FIG. 1 is an overall block diagram of a diagnostic and control system that may be used with a bus or similar vehicle.

A vehicle diagnostic and control system provides for monitoring and maintenance of systems on a bus, and for controlling the operation of the bus systems. FIG. 1 is an overall block diagram of a bus diagnostic and control system 10. The system 10 includes a computer 12, a scanner card 14 coupled to the computer 12, a data bus 16 coupled to the scanner card 14, and input/output nodes 18 coupled to the data bus 16. The computer 12 includes programming to monitor the status of and to control a bus. The programming may include a diagnostics program 20 and a control program 30. These programs will be described in more detail later. The system 10 may include a local database 22 that stores data related to the bus. The system 10 may also include a vehicle information center, or interface, 24 that may be used by a technician to directly access data in the database 22 and to access the computer 12. The system 10 may also include a driver interface 25 that may be used to present limited information to the bus driver. The system 10 may also include image processing functions. The image processing function may be used to process images derived from one or more television or video cameras mounted on the bus. Such image processing may be used for collision avoidance and to provide other warning and monitoring capabilities for the bus.

The system 10 may be attached to other computers and may act as an interface to vehicle components or subsystems such as diesel engine, transmission and anti-lock brake subsystems. The system 10 integrates or centralizes diagnostics and controls of various vehicle subsystems. The system 10 may include a receiver/transmitter (transceiver) 26 that may be used to receive signals from a source external to the system 10 and to transmit information to the source. Finally, the system 10 may include a bus location device (BLD) 40 that, used in conjunction with a geo-satellite positioning system (GPS), generates precise bus location and kinematic motion information. The use of the BLD 40 and a GPS will be described in detail later.

In an embodiment, the system 10 is installed on, and is part of a bus, such as a commuter bus used for urban transportation. The system 10 gathers information about various bus systems, and either stores the information in the database 22, provides the information to a remote location, or processes the information according to programming provided with the computer 12. The results of the processing may be stored in the database 22, provided to the remote location, or displayed on the interface 24.

As noted above, the driver interface 25 may also provide information from the system 10 to the driver. The information may be provided in real time. Such information may include bus location information, such as that generated by a geo-satellite positioning system (GPS) that may be incorporated into the system 10. For example, the interface 25 may show a map of the area in the vicinity of the bus, including roads, bus routes, bus stops, and other information, and may show a current position of the bus by moving a representation of the bus over a bus route. The driver interface 25 may also incorporate a heads-up display feature that projects digital images of various bus parameters and other data so that the bus driver may view the data without distracting attention from driving.

The driver interface 25 may incorporate a speech recognition device to receive spoken commands from the bus driver. The spoken commands may be used to override remote control features of the bus, to request specific information relative to driving conditions, such as roadway conditions, weather conditions, traffic conditions, or other information needed by the bus driver for safe operation of the bus. Such information requests may be passed by the system 10 to a remote location, and the information may then be provided by radio control links, for example. The information may be displayed as text or graphical information on the driver interface 25. For example, a location of a traffic jam astride a bus route may be displayed by showing a map of the bus route with the location of the traffic jam superimposed. The bus driver may then use the information to avoid the traffic jam, to apprize passengers of potential delays, or to seek a way around the traffic jam.

While the system 10 is intended for use with a bus, the system 10 is not so limited. The system 10 may be adapted for use with any type of motor vehicle, including commercial trucks, and automobiles. The system 10 may also be adapted for use with other devices, including boats and ships, airplanes, and trains, for example.

The computer 12 may be an industrial computer, such as a 6181 Industrial Computer. The computer 12 is provided in an industrially hardened package to operate in the environment of a moving vehicle in all weather conditions.

The data bus 16 is an open communication network that connects devices such as photoelectric sensors, inductive proximity sensors, motor starters, drives, valve manifolds, and simple operator interfaces, or nodes having attached devices, together without the need for a separate I/O system. Devices may be removed and replaced from the network (the data bus 16) while the data bus 16 is under power without a separate programming tool. The data bus 16 may be a flat cable or a round cable capable of providing both power and communication to the nodes 18. The data bus 16 includes passive multiport taps 28, which may connect using a drop cable. The taps 28 may include 4 or 8 micro quick-disconnect ports in sealed versions to connect up to 8 physical devices or logical nodes.

The scanner card 14 allows the computer 12 to scan the data bus 16 in order to obtain status information related to various bus system components. The scanned information may then be stored in the database 22, and may be sent to an external location on a real-time or periodic basis, or when polled by the external location. For example, the database 22 may store the most recent hours worth of operating data for the bus, and the computer 12 may then provide all or part of the saved data to the external location. The data may be provided to the external location periodically, such as once per hour, or upon request for the stored data. Alternatively, the data may be sent to the external location at the time of its collection by the scanner card 14.

The transceiver 26 may incorporate a wireless communications device, such as a wireless modem, for example. The transceiver 26 may communicate over a wireless telephone network, such as a cellular telephone network, for example. The transceiver 26 may also be used to communicate with an Internet web site, and information related to the bus may subsequently be stored in a database accessible through the Internet web site.

Figure 2:
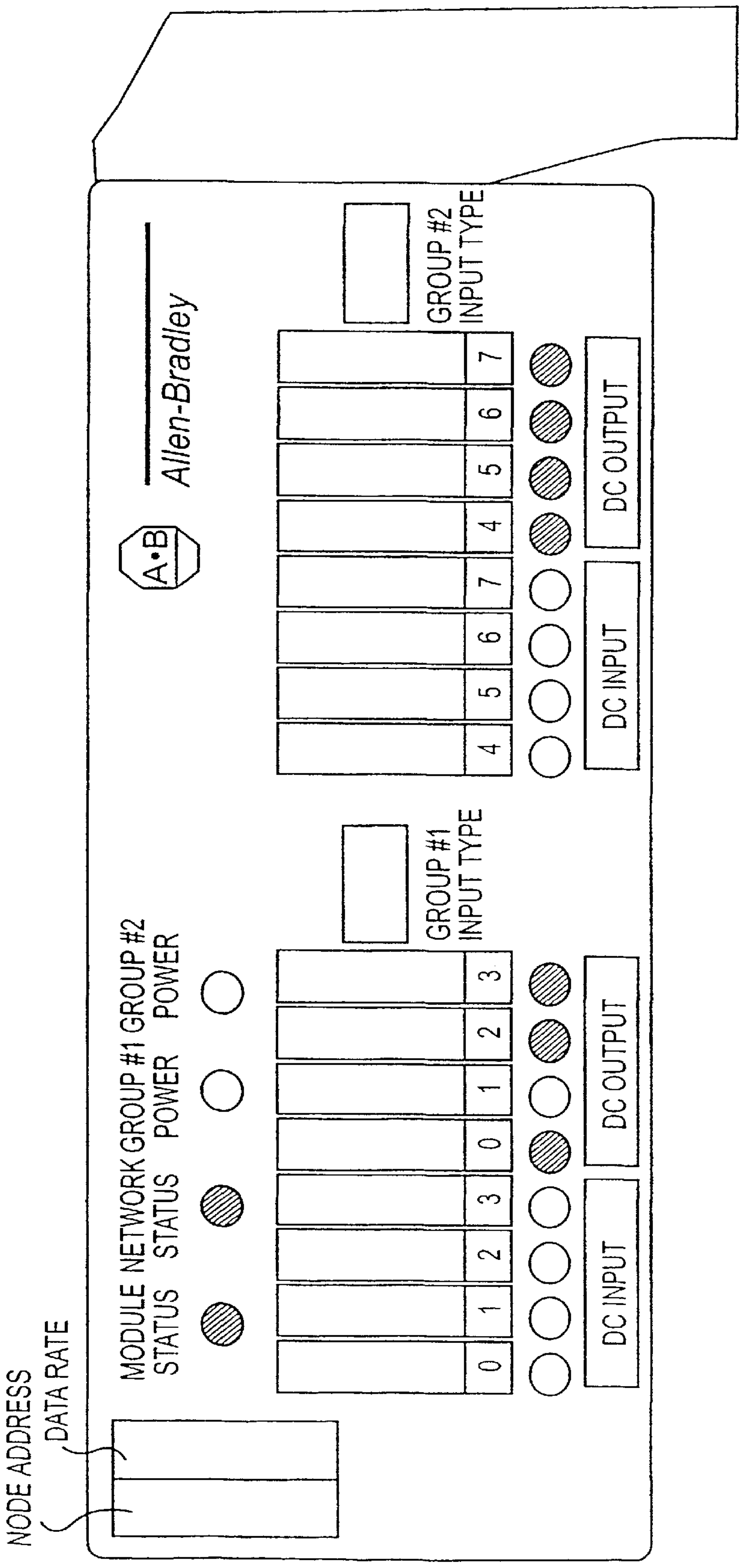
FIG. 2 illustrates a node that may be used with the system of FIG. 1.

FIG. 2 illustrates an example of a node 18 used with the system 10 of FIG. 1. The node 18 may include a semi-sealed housing that is capable of operating in close proximity to the sensor environment. The illustrated node 18 is a 10 amp 8×8 block that uses low voltage dc power and provides for 8 inputs and 8 outputs. Other configurations for the node 18 are also possible. The node 18 may be specifically designed for each application. That is, the node 18 may be adapted to a specific model or make of a bus, or other vehicle, or may be adapted for a specific use of a bus or other vehicle. Differences in specifications may include variations in input and output current and voltage, status light configurations, remote monitoring features, and number of attached devices, for example.

Figure 3A:
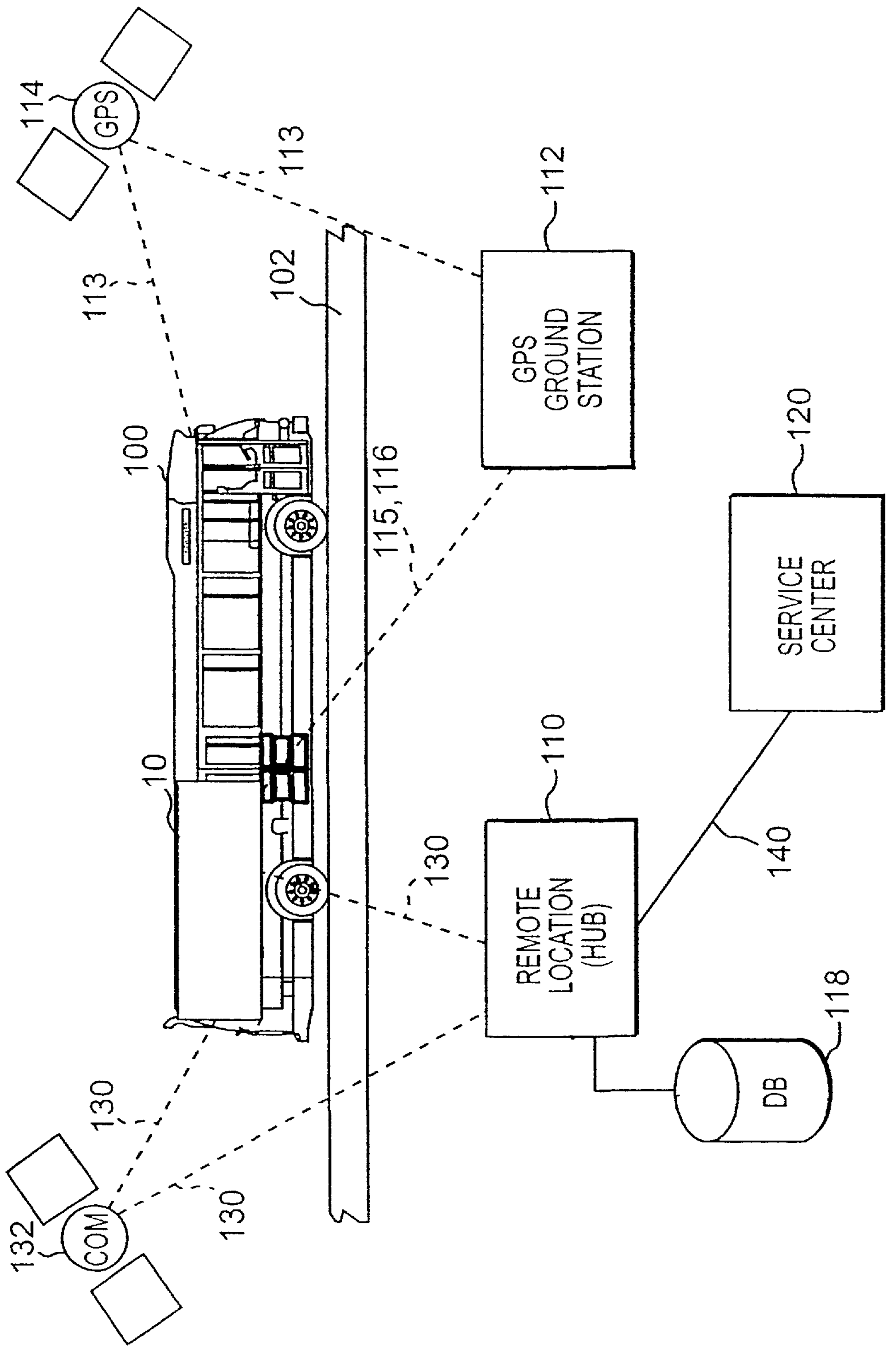
FIG. 3*a* is a block diagram of an environment that uses the system of FIG. 1.
Figure 3B:
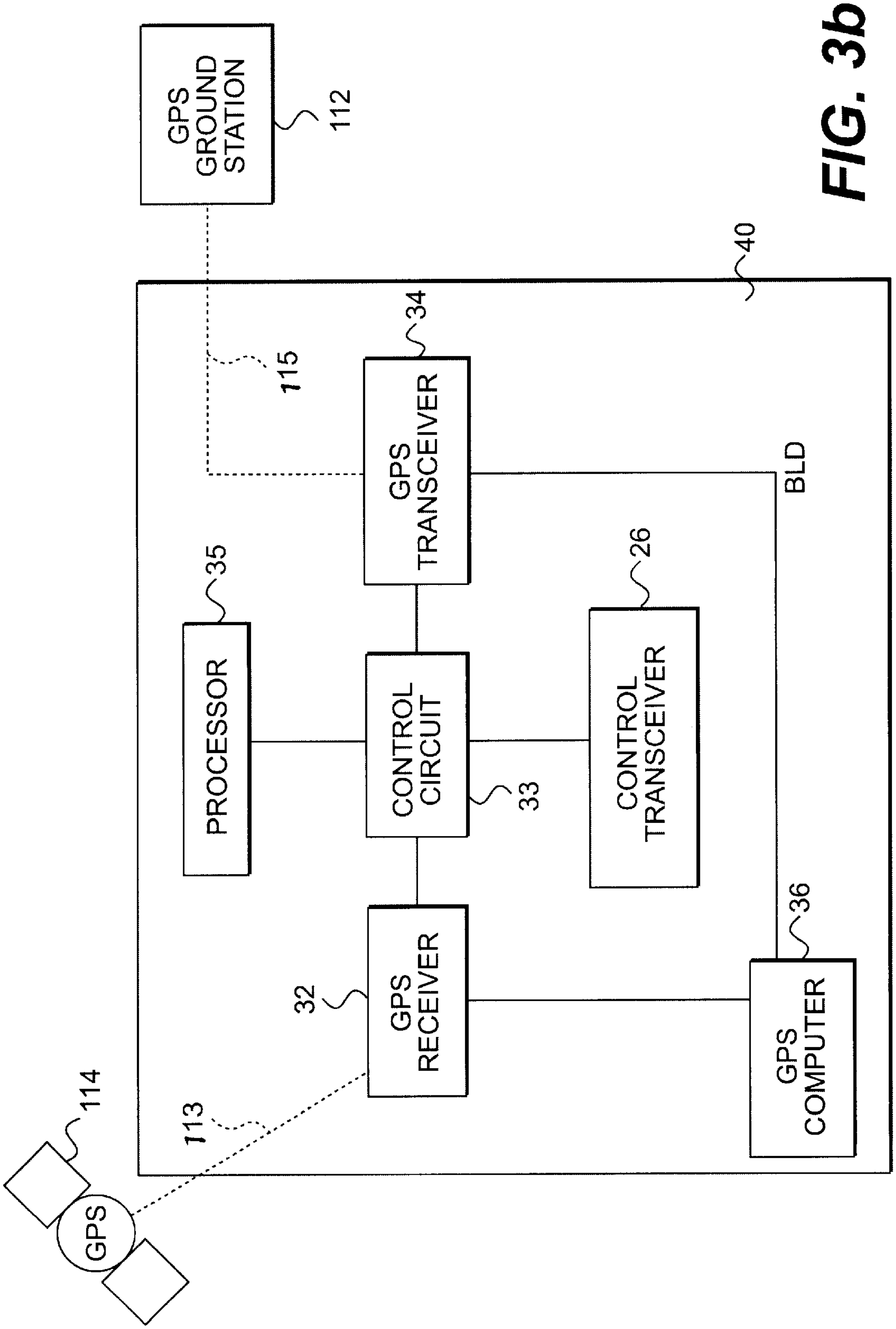
FIG. 3*b* is a block diagram of a bus location device that may be used with the system of FIG. 1.

The system 10 may be used to transmit information to, and receive information from a location external to the bus in which the system 10 is installed. FIG. 3*a* is a block diagram of an environment in which a bus 100, traveling over road 102, with the system 10 installed, communicates with a remote location 110. The remote location 110 may be affiliated with or be a part of a local transit authority, and the bus 100 may be one of a fleet of busses operated by the local transit authority. The remote location 110 may in turn communicate with a service center 120. The service center 120 could be affiliated with, or be part of a facility that manufactures buses such as the bus 100. As shown in FIG. 3*a*, the system 10 installed on the bus 100 communicates with the remote location 110 using a wireless voice/data network 130. The network 130 may be a cellular telephone network, a satellite communications network, including communications satellite 132, or other wireless network. The method of communication may involve Internet Protocols (IP), or other protocols for transmitting voice and/or data. The network 130 may also allow for direct, wired connection between the system 10 and the remote location. In this alternative configuration, the bus 100 may be driven to the remote location 110 and the system 10 may be wired into a diagnostics computer at the remote location 110.

The remote location 110 communicates with the service center 120 using a communications network 140. The communications network 140 may be a landline network, such as a public switched telephone network (PSTN), for example. The communications network 140 may also be a wireless network, or any other network capable of communicating voice and/or data.

Also included in the environment shown in FIG. 3*a* is a GPS that employs GPS satellite 114. Although one GPS satellite is shown, the GPS should be understood to use a standard number of such satellites, which is typically four satellites. The GPS is shown augmented with a GPS ground station 112 to provide centimeter location accuracy, and to derive bus attitude and position coordinates and bus kinematic tracking information. The GPS ground station 112 communicates with buses on designated roadways (e.g., the bus 100 traveling on a road 102) using a communications network (or radio control link) 115 for the purpose of receiving bus location and bus trajectory information and broadcasting control information to respective buses. The BLD 40, onboard the bus 100, may use the GPS integrated with bus video scanning, radar/lidar, and onboard speedometer and/or accelerometers to provide accurate bus location information. The bus location information may be combined with information concerning road conditions and other obstacles to ensure optimum bus routing.

As shown in FIG. 3*a*, the GPS satellites 114 transmits GPS ranging signals 113 to the bus 100 on the road 102. The GPS ranging signals 113 are modulated with pseudo-random ranging codes that permit precise determination of the distance from individual GPS satellites 114 to the bus 100. The distance calculations are based on accurately measured time delays encountered by the GPS ranging signals 113 transmitted from individual GPS satellites 114 to the bus 100. GPS makes use of very accurate atomic clocks and precisely known earth orbits for individual GPS satellites 114 to make such precise position calculations. A multichannel GPS receiver may be used in the bus 100 to simultaneously track and determine ranges from multiple GPS satellites 114 to enhance real-time location calculation times.

The accuracy and response time performance of the real-time GPS system (i.e., the BLD 40) may degrade as the GPS ranging signals 113 encounter ionospheric and atmospheric propagation delays while traveling from the GPS satellite 114 to the bus 100. These delays give rise to uncertainties in the exact position of the bus 100 when calculated using time-based triangulation methods. That is, because the propagation times from the GPS satellite 114 may vary depending on ionospheric and atmospheric conditions, the calculated range to individual GPS satellites 114 is only known within certain tolerance ranges. Clock uncertainties likewise give rise to errors. Consequently, some uncertainty exists in the position information derived using the GPS satellite ranging signals 113.

Differential GPS (DGPS) may be used to remove errors caused by uncertainties in propagation times in GPS ranging calculations. Differential GPS makes use of auxiliary ranging information from a stationary GPS receiver, the position of which is very precisely known. The use of differential GPS is illustrated in FIG. 3*a*, in which the GPS ground station 112 represents the stationary GPS receiver. The GPS ground station 112 receives the GPS ranging signals 113 from the GPS satellite 114. The GPS ground station 112 is connected through control links to the remote location 110 where precise GPS ground station location information is computed and stored. Because the GPS ground station 112 is stationary, very accurate location information can be determined.

GPS receivers use two PRN codes, the C/A and P codes to determine unambiguous range to each satellite. These codes are transmitted with "chip" rates of 1.203 MHZ and 10.23 MHZ respectively, resulting in wavelengths of about 300 meters and 30 meters, respectively. Hence the location resolution using these codes alone may be insufficient for a real-time bus tracking. GPS satellites transmit on two frequencies, L1 (1575.42 MHZ) and L2 (1227.6 MHZ). The corresponding carrier wavelengths are 19 and 24 centimeters. In known techniques of range measurement, the phase of these signals is detected, permitting range measurements with centimeter accuracy. Various techniques are known to resolve these ambiguities in real time for kinematic positioning calculations. Using known methods, the GPS ground station 112 may be used both to transmit auxiliary ranging codes 116 to the bus 100 using the radio control link 115 and to assist in carrier phase ambiguity resolution to permit precise bus tracking data.

The environment shown in FIG. 3*a* is configured so that buses, such as the bus 100, are in separate radio contact with the GPS ground station 112, and receive the auxiliary ranging codes 116. The GPS ground station 112 and the bus 100 are in the same general location. The GPS ground station 112 might be positioned, for example, to cover the principal highway, such as the road 102, used by the bus 100. Alternatively, the GPS ground station 112 may be located to serve an entire metropolitan area with buses in the metropolitan area communicating with the GPS ground station 112 using the radio control links 115. The GPS ground station 112 receives the same GPS ranging signals 113 from the GPS satellites 114 that are received by the bus 100. Based on the calculated propagation delay at a given instant for the GPS ranging signals 113, the remote location 110 may compute the predicted position of the GPS ground station 112 using a known GPS code and carrier ranging and triangular calculation methods. Because the remote location 110 has the true and accurate location of the GPS ground station 112, the remote location 110 may very precisely determine propagation delays caused by ionospheric and atmospheric anomalies encountered by the GPS ranging signals 113.

Because the GPS ground station 112 is in the same general vicinity as the bus 100, the GPS ranging signals 113 that are received at the bus 100 should encounter the same propagation delays as the GPS ranging signals 113 that are received at the GPS ground station 112. Then, the instantaneous propagation delay information (the auxiliary ranging codes 116) may be communicated by the radio control links 115 to the bus 100, enabling the BLD 40 in the bus 100 to correct ranging calculations based on received GPS radio signals 113. This correction eliminates position information uncertainty at the bus 100. Using DGPS and carrier phase ranging, very accurate location information can be derived for the bus 100 and propagation correction information can be broadcast on the radio control link 115 using, for example, a signal of known frequency that may be monitored by all buses, such as the bus 100, in the vicinity of the GPS ground station 112.

The radio control link 115 from the GPS ground station 112 may also be used to command processing equipment in the bus 100 to use particular GPS ranging calculation methods. The radio control link 115 connecting the bus 100 to the GPS ground station 112 may be a full-duplex communication link that permits bi-directional communication between the GPS ground station 112 and the bus 100. Using the radio control link 115, status information may be transmitted from the GPS ground station 112 to the bus 100 and from the bus 100 back to the GPS ground station 112. Each bus may transmit a unique identification code to the GPS ground station 112. For example, each bus 100 in the vicinity of the GPS ground station 112 may transmit precise location, velocity and acceleration vectors to the remote location 110 using the GPS ground station 112. To facilitate optimum routing of the bus 100, and for other control and monitoring purposes, the remote location 110 may store in a database 118, locations of known obstacles (i.e., dynamic obstacle information including geographic location and time reference information), such as traffic jams, special events, road construction, and accidents that could impede the travel of the bus 100. This dynamic obstacle information, combined with real-time bus location information, can be used by the remote location to send alternate route information to the bus 100. Such real-time bus routing can be used to keep the bus 100 on schedule and allow the bus 100 to still make all its required stops.

The bus 100 may compute its own precise attitude, with respect to X, Y, and Z reference planes using conventional technology. The attitude of the bus 100 on the road 102 may be detected by using multiple GPS antennae mounted on the extremities of the bus 100 and then comparing carrier phase differences of GPS signals 113 simultaneously received at the bus 100 using conventional technology. Relative to a desired path of travel or relative to true or magnetic north, the precise deviation of the longitudinal or transverse axis of the bus 100 may be precisely measured along with the acceleration forces about these axis. These inputs may be sent to the computer 12 (see FIG. 1) or a specialized GPS processor, where the inputs are analyzed and evaluated along with a multitude of other inputs to provide tracking and control of the bus 100. Using this system, operators at the remote location 110 may recognize whether the bus 100 is stationary, moving along its intended path on the road 102, skidding or spinning, for example, and what corrective action is needed to counteract whatever unusual attitude the bus 100 may need to regain control.

Communication between the bus 100 and the GPS ground station 112 may be implemented using multiple access communication methods including frequency division multiple access (FDMA), timed division multiple access (TDMA), or code division multiple access (CDMA) in a manner to permit simultaneous communication with and between a multiplicity of buses, and, at the same time, conserve available frequency spectrum for such communications. Broadcast signals from individual buses 100 to the GPS ground station 112 permits simultaneous communication with and between a multiplicity of buses 100 using such radio signals.

In an embodiment, the BLD 40 may include a GPS receiver, a GPS transceiver, radar/lidar, and other scanning subsystems in a single, low cost, very large scale integrated (VLSI) circuit. The same is also true of other sub-systems used on the bus 100, including the computer 12.

As illustrated in FIG. **3*b*, the BLD 40 may be implemented using control circuit 33 to interconnect and route various signals between and among the illustrated subsystems. These components may be in addition to, or take the place of components shown in FIG. 1. A GPS receiver 32 is used to receive GPS radio signals 113. A GPS transceiver 34 is used to transmit and receive over the radio control link 115 between the bus 100 and the GPS ground station 112. The transceiver 26 receives and transmits auxiliary control signals and messages from multiple sources including other buses. The GPS receiver 32, the GPS transceiver 34, and the transceiver 26 include necessary modems and signal processing circuitry to interface with the control circuit 33. As described above, the GPS transceiver 34, as well as the transceiver 26, may be implemented using frequency division, time division or code division multiple access techniques and methods as appropriate for simultaneous communication between and among multiple buses and GPS ground stations. In an alternate embodiment, not shown, the GPS transreceiver 34 also may be a cellular radio linked to the communications satellite 132 using conventional technology. Additionally, the bus 100 may have several GPS receivers 32 positioned on the extremities of the bus 100** for use in determining bus attitude relative to a reference plane and direction using conventional phase comparison technology.

In addition to, or as part of the computer 12 of FIG. 1, a GPS ranging computer 36 receives GPS signals from the GPS receiver 32 to compute bus attitude and position, and velocity and acceleration vectors for the bus 100. The GPS ranging signals 113 are received from multiple GPS satellites 114 by the GPS receiver 32 for processing by the G.P.S.

ranging computer 36. The G.P.S. transceiver 34 receives G.P.S. correction signals from the G.P.S. ground station 112 to implement differential G.P.S. calculations using the G.P.S. ranging computer 36. Such differential calculations involve removal of uncertainty in propagation delays encountered by the GPS ranging signals 113.

Figure 3C:
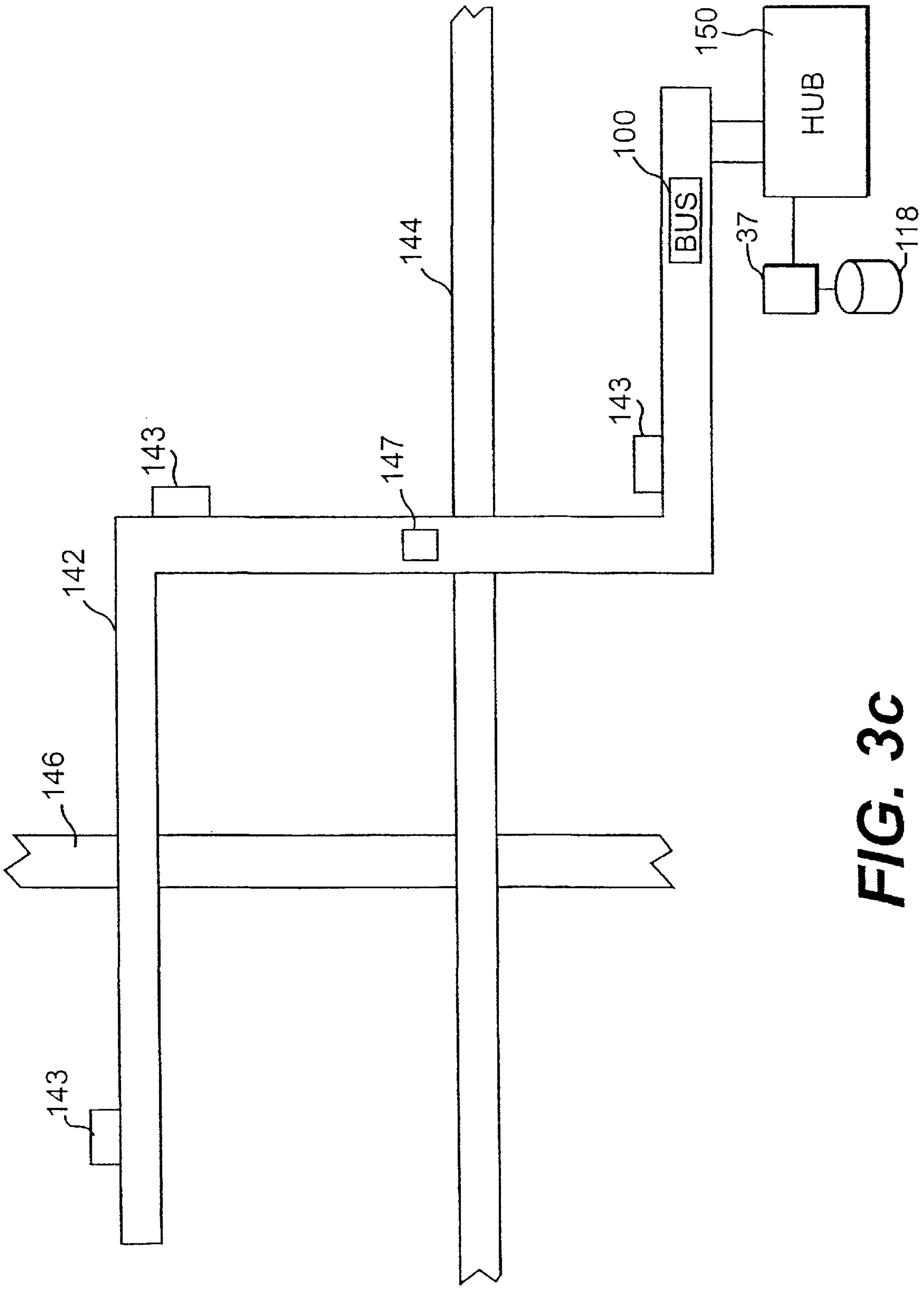
FIG. 3*c* illustrates an operation of the systems and components of FIGS. 1–3*b;*

FIG. 3*c* illustrates an operation of the systems and components of FIGS. 1–3*b*. The bus 100 may be part of a metropolitan transit system that provides daily commuter bus service. On a given day, the bus 100 departs from a remote location (e.g., a local hub 150) and travels over a route 142, making three stops at bus stops 143 to pick up and let off passengers. The bus 100 is scheduled to complete the route 142 in a specific time that includes a wait at each of the bus stops 143. Intersecting the route 142 are two-way streets 144 and 146. Also shown on the route 142 is an obstacle 147 that completely blocks access over the route 142. The obstacle 147 may be road construction on the route 142, a traffic accident that occurred shortly after departure of the bus 100 from the hub 150, or any other impediment to travel of the bus 100.

The bus 100 is equipped with the BLD 40 that permits GPS ranging to determine the bus location in real time, and to provide the real-time bus location information to the hub 150. The bus 100 and the hub 150 may also employ DGPS to enhance bus location accuracy. Because the obstacle 147 blocks the route 142, the bus 100 must be rerouted. The hub 150 receives obstacle information, and stores the information in the database 118. Using fuzzy logic or similar techniques, processors 37 at the hub 150 may determine that the bus 100 cannot complete its normal travel plan for that time and day. The processors 37 may then determine that the bus 100 must reroute along the streets 144 and 146. The reroute information may be passed to the bus 100 using the radio control link 115, or other communications network (FIG. 3*a*). The reroute information may be displayed on the bus as a representation on a GPS-based map that highlights the new route, shows the location of the obstacle, and either computes a required speed to remain on schedule, or provides an indication of the expected delay in reaching all the stops 143 based on the reroute plan. The reroute information may be shown on the driver interface 25 (FIG. 1).

Using bus location information provided by the bus 100 to the hub 150, the processors 37 at the hub 150 may determine that the bus 100 will not complete the route 142 in time to allow the bus 100 to travel over its next scheduled route. This determination may be based on computing remaining travel time using nominal bus speed over the route 142, the length of the route. 142, and nominal stop times at the bus stops 143. The processors 37 may receive a continuous, or near-continuous stream of bus position information from the bus 100. This bus location information allows the processors 37 to continually update the expected route completion time for the bus 100 over the route 142. Using this information, the processors 37 may provide an alert to operators at the hub 150 that indicates that another bus should be called out of standby to cover for the bus 100.

Using the GPS system, the hub 150 may determine other conditions of the bus 100. For example, the processors may monitor a length of time the bus 100 remains in a stationary condition while on the route 142. The processors may determine the stationary condition of the bus 100 based on GPS ranging that shows the bus 100 is in a same position over time. The stationary condition may also be determined based on signals sent to the hub 150 from the bus 100 that report the output of certain sensors, such as a speedometer, accelerometers, and other instruments. The bus 100 may be stationary because of traffic lights along the route 142, while picking up and off loading passengers, or because of a traffic jam, for example. A lengthy stationary period may indicate that the bus 100 has encountered a mechanical or electrical fault, has been involved in an accident, or that something has happened to the bus driver. The processors at the hub 150 may be programmed to monitor bus stationary periods and to provide an alert if a specified maximum time is exceeded.

A television camera having a wide angle lens may be mounted at the front of the bus such as the front end of the roof or bumper to scan the road ahead of the bus at an angle encompassing the sides of the road and intersecting roads. The analog signal output of camera is digitized in an A/D convertor and passed directly to and through a video preprocessor and to the control circuit 33 to an image field analyzing computer may be implemented as part of the computer 12 and may be programmed using neural networks and artificial intelligence as well as fuzzy logic algorithms to identify objects on the road ahead such as other vehicles, pedestrians, barriers and dividers, turns in the road, and signs and symbols, and generate identification codes, and detect distances from such objects by their size (and shape) and provide codes indicating same for use by a decision control computer, which may be incorporated as an element of the computer 12 shown in FIG. 1. The decision control computer generates coded control signals that are applied through the control circuit 33 or are directly passed to various warning and bus operating devices such as a braking servo, a steering servo or drive(s), and accelerator servo; a synthetic speech signal generator, which sends trains of indicating and warning digital speech signals to a digital-analog converter connected to a speaker driver; a display that may be a heads-up display or part of the driver interface 25 (FIG. 1); a head light controller for flashing the head lights, a warning light control for flashing. external and/or internal warning lights; and a horn control.

The image field analyzing computer may use images provided by the above described television camera along with high speed image processing to detect various hazards in dynamic image fields with changing scenes, moving objects and multiple objects, more than one of which may be a potential hazard. Wide angle vision and the ability to analyze both right and left side image fields and image fields behind the bus may also be used. The imaging system may detects hazards, and may also estimate distances based on image data for input to the decision control computer.

While the optimization of bus routing described above has referenced use of a local bus operating center, or hub, such optimization is not so limited. In an embodiment, bus position information and obstacle position information may be suppled to a more remote location, such as the service center 120 shown in FIG. 3*a*, and all bus optimization actions may be completed at the service center 120.

In addition to optimizing allocation of buses based on dynamic obstacle information and current bus position information, bus resource allocation optimization may take into account operating and maintenance history of the bus. For example, a bus may be due for an extensive engine overhaul or may suffer an unexpected engine failure. The environment shown in FIG. 3*a* can accommodate such events. In addition, by receiving real-time or slightly delayed performance data from bus components, the processors, such as the processor 37, at the hub 150, may predict that a specific bus is likely to go out of service earlier then expected. In such a case, the processor 37 may issue an alert and may prompt operators at the hub 150 to make additional buses available. The systems and components needed to monitor bus performance are described below. additional buses available. The systems and components needed to monitor bus performance are described below.

Figure 4:
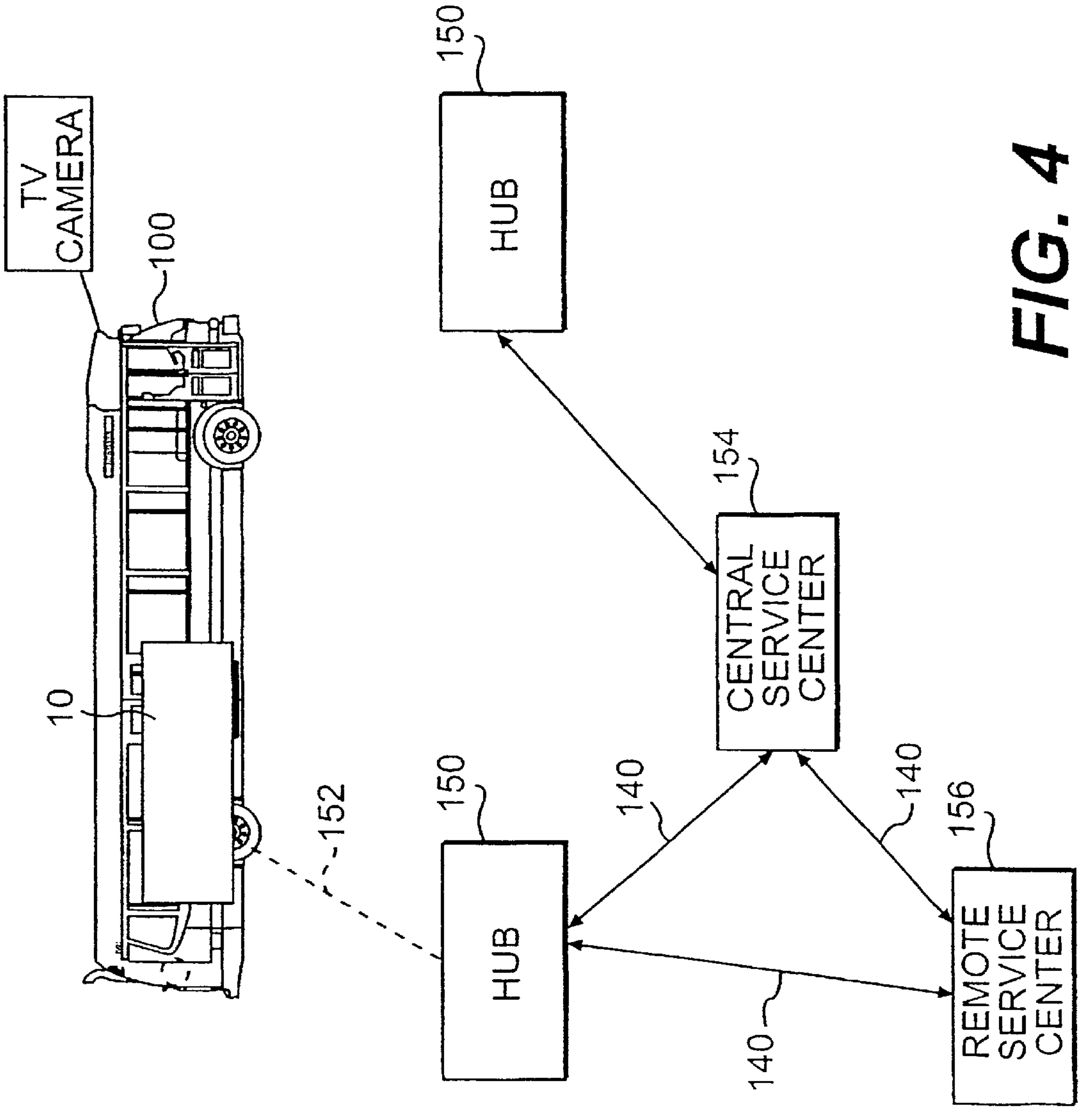
FIG. 4 is a block diagram of an alternative environment that uses the system of FIG. 1.

FIG. 4 is a block diagram of an alternate environment for communicating with the bus 100. The local hub 150 receives wireless communications from the bus 100 and transmits wireless communications to the bus 100. The local hub 150 may communicate with a number of buses, including the bus 100. The local hub 150 may communicate with a large number of buses. For example, the hub 150 may communicate with as many as 256 or more buses. Additional local hubs may be included in the environment to increase the number of buses to be controlled. For example, in a large urban transit system, one or more local hubs may be established at each local transit authority bus center. Each such bus center may be responsible for dispatching, operating and maintaining hundreds of commuter buses, or more.

Local hubs, such as the local hub 150, may communicate with a central service center 154, which may be established for the urban transit system. Communications between the local hubs and the central service center 154 may be by a wired communications network, such as the PSTN. The local hubs may also communicate directly with a remote service center, such as a service center 156 established at the bus manufacturer's facility, for example.

Using either of the environments shown in FIGS. 3*a* or 4, a remote location may communicate with a bus control system, such as the system 10 shown in FIG. 1, to access data stored in a database on a bus, and to send data to the bus control system. For example, the remote location may access the database 22 to determine operating conditions of the bus engine, transmission and brake system, status of the bus lighting system, position of doors, destination of the bus, bus speed, and other bus data. The data thus obtained may be used for remote diagnostics and troubleshooting, including determining what parts and/or tools may be needed to repair a bus. The environments may also be used to determine the geographical location (latitude and longitude, for example) of the bus. Such bus location information may be provided by incorporation of a GPS system, such as the BLD 40 shown in FIG. 3*b*, in the system 10. The remote location may also communicate with the bus to control specific bus functions. For example, the remote location may shut down the bus engine, change the indicated destination, close a door, or turn on the bus headlights. The remote location may also update the software used by the computer 12 by sending a revised program over the communications network.

In addition to remote access of the bus data, the system 10 (see FIG. 1) allows a local technician to interface on-site with the computer 12 and the database 22. In particular, the technician may use the system 10 to perform complex diagnostics of devices or components connected to the data bus 16. Using a wired or wireless interface to the computer 12, the technician may obtain current or recorded data relating to bus operations. For example, the technician may access the database 22 to determine engine oil pressure over the previous hour. The technician may then use this information to determine a trend in the operation of the engine. Thus, the system 10 may be used for both preventive and corrective maintenance.

Figure 5:
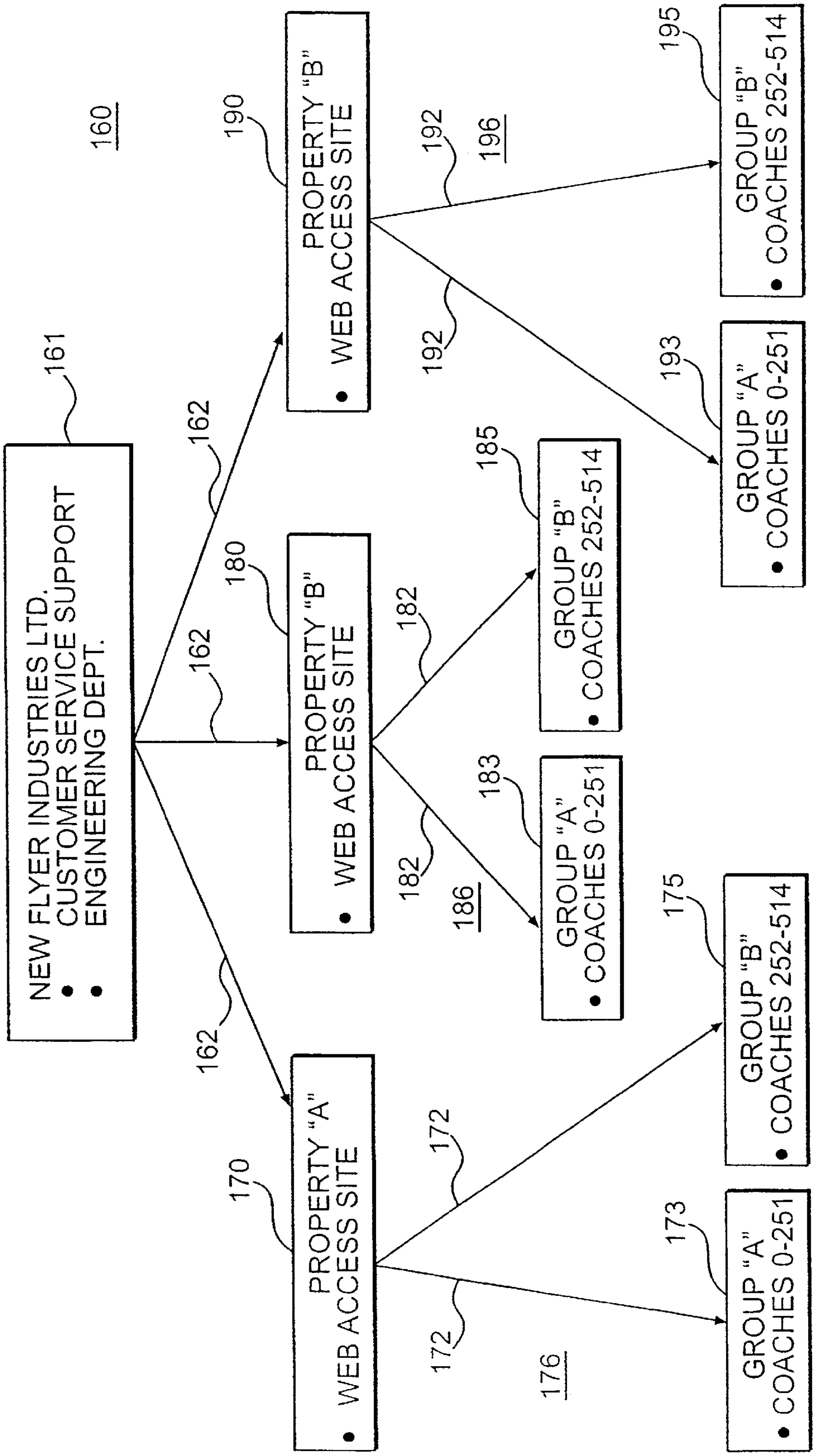
FIG. 5 is a block diagram of yet another environment that uses the system of FIG. 1.

FIG. 5 illustrates yet another environment 160 that may use the bus system of FIG. 1. The environment 160 includes a manufacturer's facility 161 that manufactures vehicles, such as transits buses. The facility 161 includes a customer service support department and an engineering department. The customer support department may include access to technical advice, repair parts and documentation. The engineering department may receive information from local bus operators, trend information regarding performance of the buses, and bus operating data. The engineering department may use these data to make design changes, and to assist the customer service department.

Using a communications network 162, the facility 161 may be coupled to one or more Internet web sites that are associated with local bus operating centers, or hubs. The web sites may employ standard Internet file servers to store and manipulate data. The local bus operating centers may located anywhere in the world. In FIG. 5, three local bus operating centers, namely the centers 176, 186 and 196 are shown. The three centers may be part of a single transit system, and may be located within one metropolitan area. Alternatively, the local bus operating centers may be located in different metropolitan areas. In the example shown, the local bus operating center 176 includes two groups of buses. Group A 173 includes buses 0–251 and Group B 175 includes buses 252–514. However, the local bus operating center may operate more than two groups of buses. Individual buses in the groups 173 and 175 provide information to, and may receive information from a web site 170 that is run by, or for, the benefit of the bus operating center 176. Other local bus operating centers, such as the local bus operating centers 186 and 196, may operate one or more groups of buses, with each group of buses directly controlled by and reporting to local bus operating centers.

Communication between the individual buses and the local bus operating centers may be primarily by wireless means, such as cellular communications means. The buses may also communicate with the local bus operating centers by wired means when the buses arrive at the local bus operating centers and can be directly coupled to the local bus operating centers. The information provided by the buses may be gathered at the local bus operating centers, and then immediately, or periodically posted to the associated web sites. From the web sites, the bus information may be transmitted to the facility 161.

In operation, the system shown in FIG. 5 may require that individual buses provide real-time, near real-time and historical data to the center 161. Real-time data may include readouts from monitors installed on the buses. Examples of such monitored parameters include bus speed, position of entry and exit doors, application of parking brake. Near real-time information may include an amount of time (i.e., the elapsed time) the entry or exit doors are open, bus speed averaged over some interval, and other information that is delayed in transmission. Historical data may include a summary of engine oil pressure during operating time for a specific period, such as a day, for example.

Real-time and near real-time data may be supplied using wireless communications means, where the data are measured and collected on a bus, transmitted to a local center, such as the center 176, processed and transmitted to a web site such as the web site 170, and transmitted to the center 161. In this embodiment, the bus maintains constant or near constant communication with its local bus operating center. The data to be sent to the local bus operating center 176 may be transmitted continuously using techniques well known in the art. Alternatively, the local bus operating center 176 may periodically poll buses assigned to the local bus operating center 176 to retrieve data from the buses.

Historical data, such as a days worth of engine oil pressure readings (taken for example as average engine oil pressure, or oil pressure readings taken at intervals) may be transmitted to the web site 170 when the bus returns to the local bus operating center. Such historical data may be provided by direct wired connection between the bus and processors at the web site. Alternatively, the historical data may be provided using wireless means.

Figure 33A:
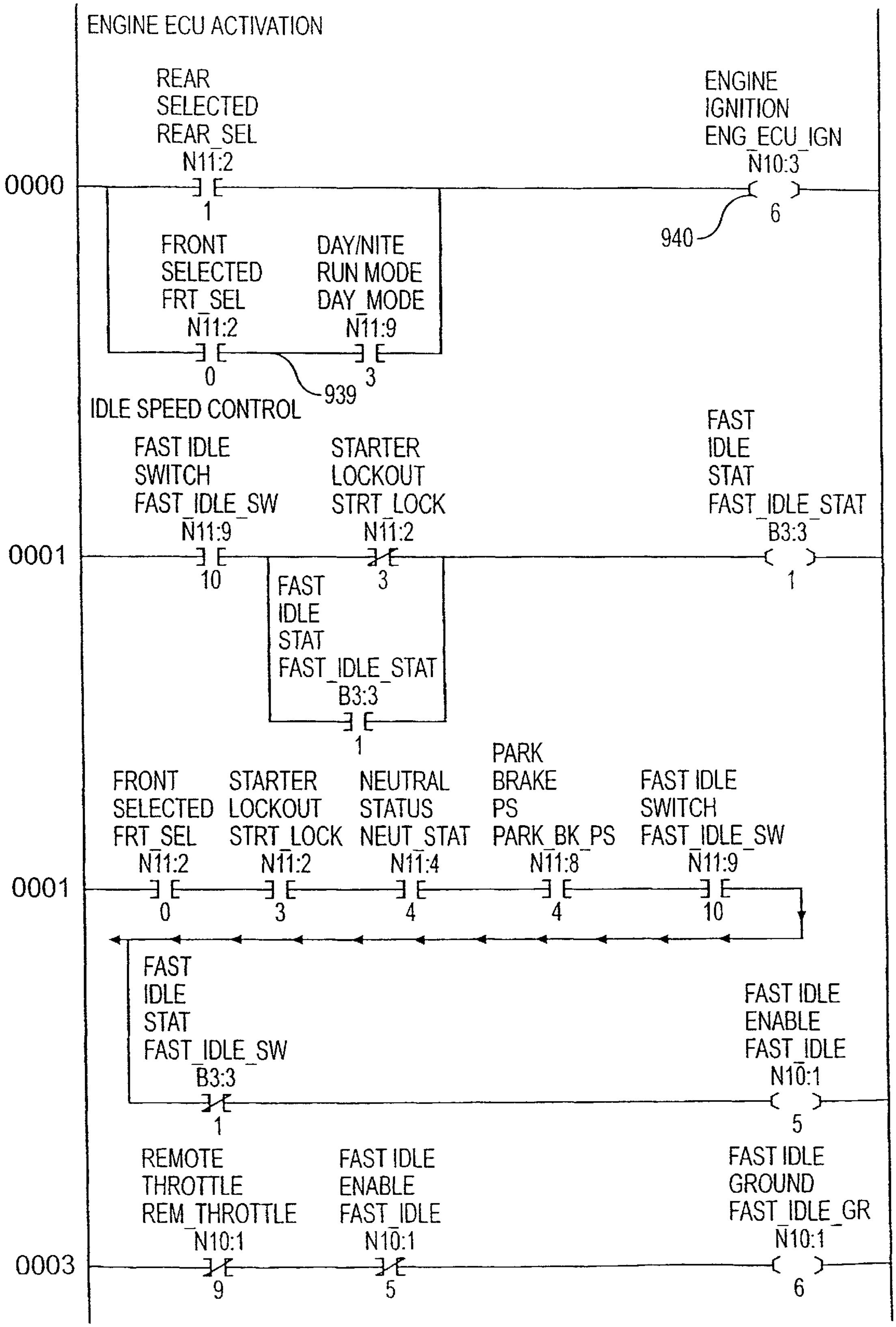
Figure 33B:
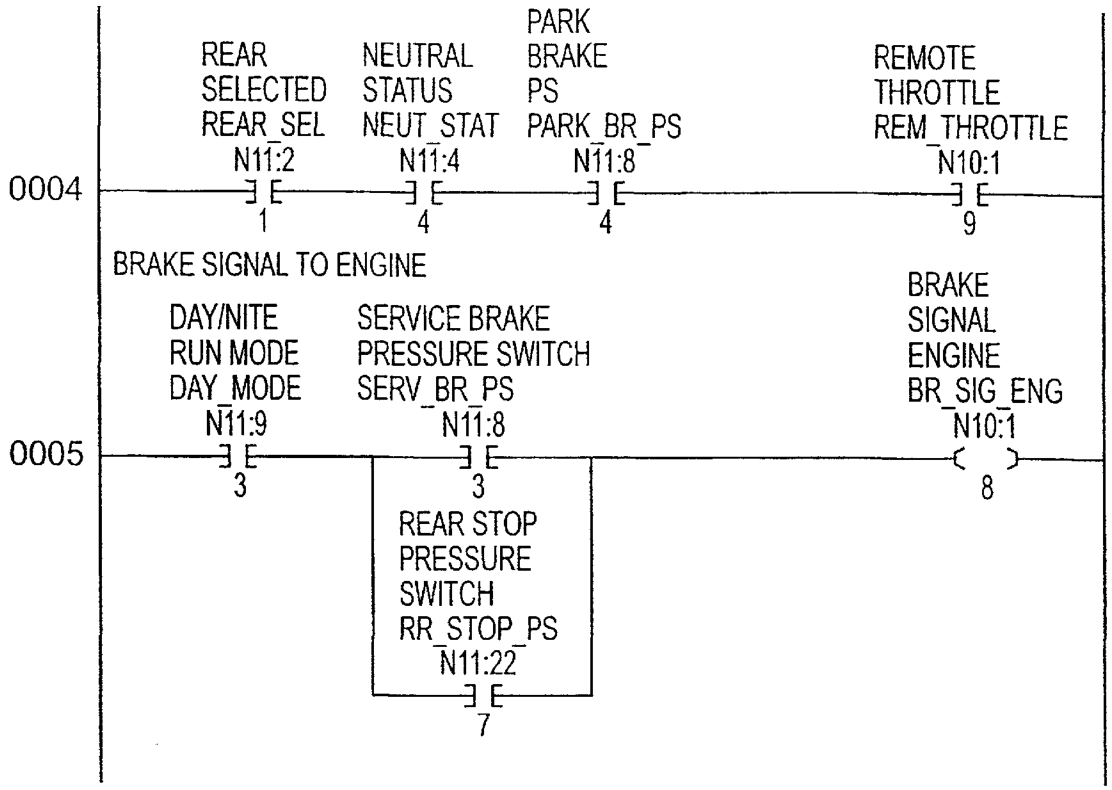
Figure 33C:
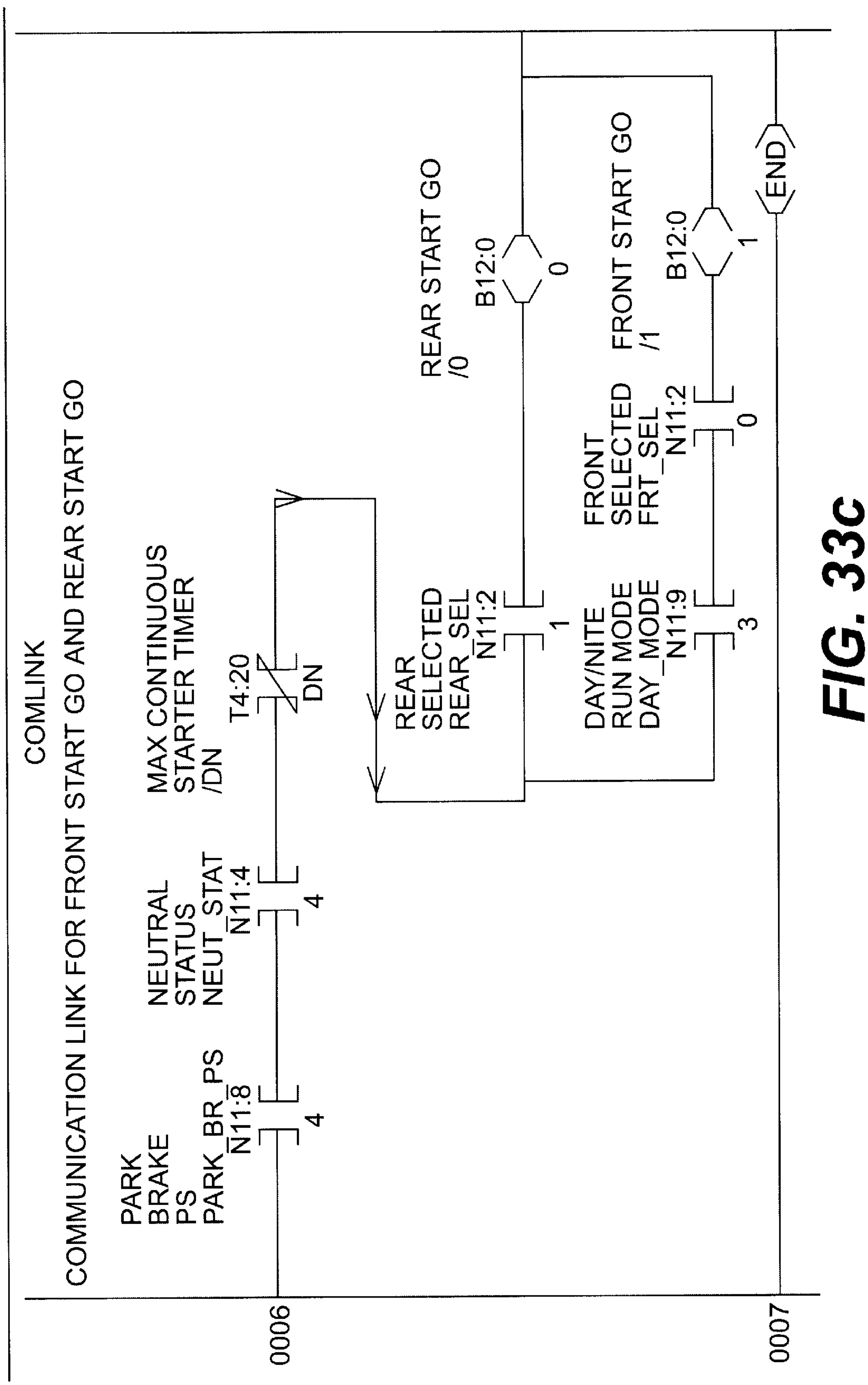
Figure 34A:
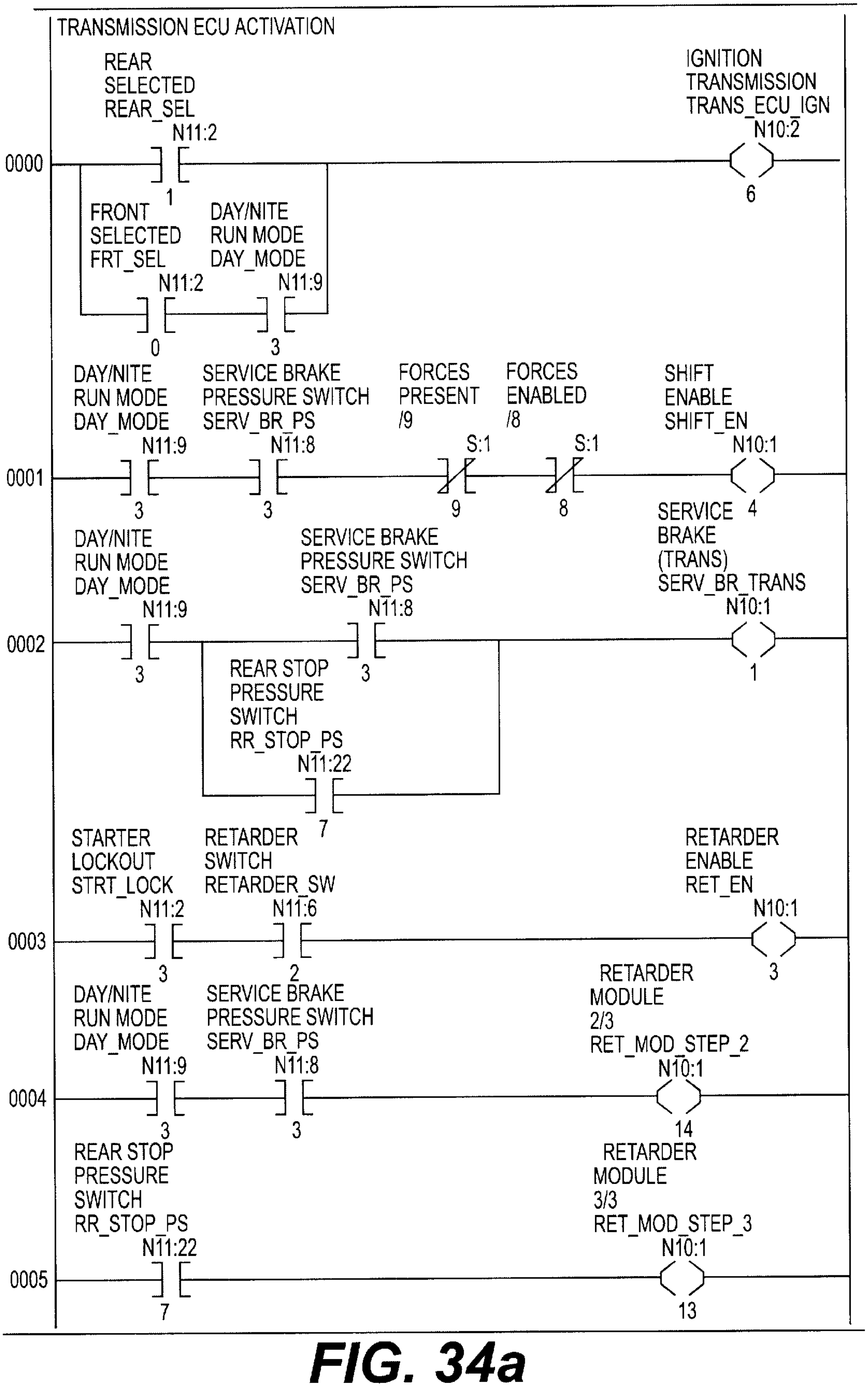
Figure 34B:
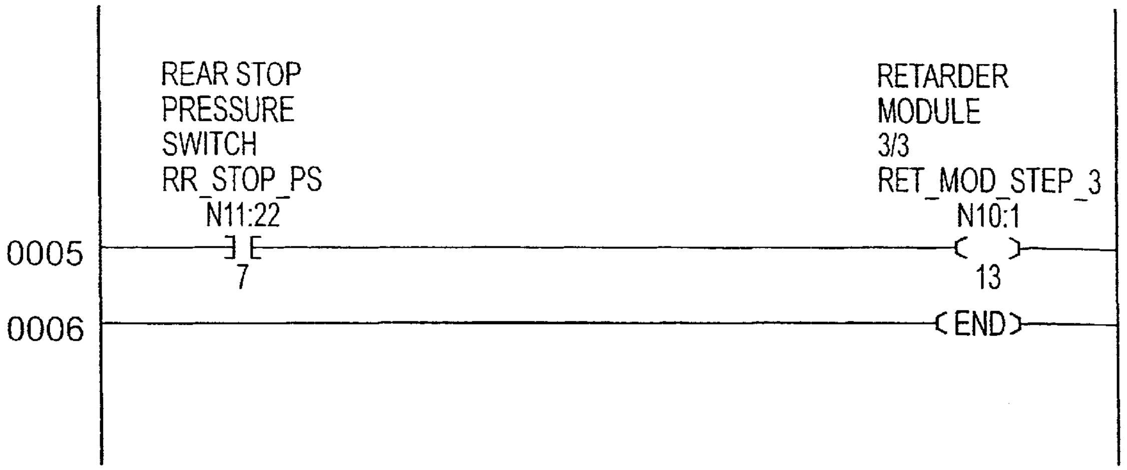
Figure 35A:
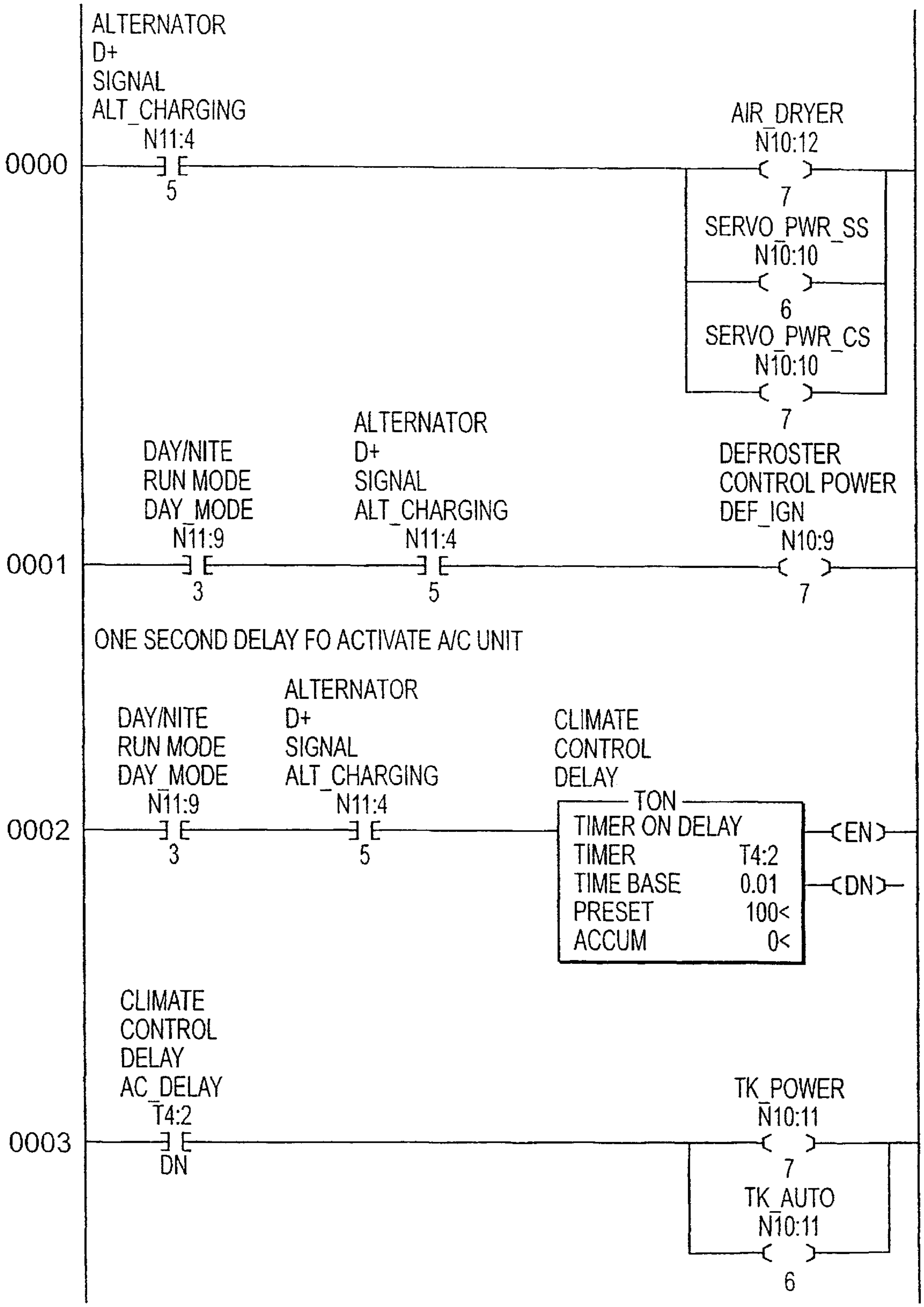
Figure 35B:
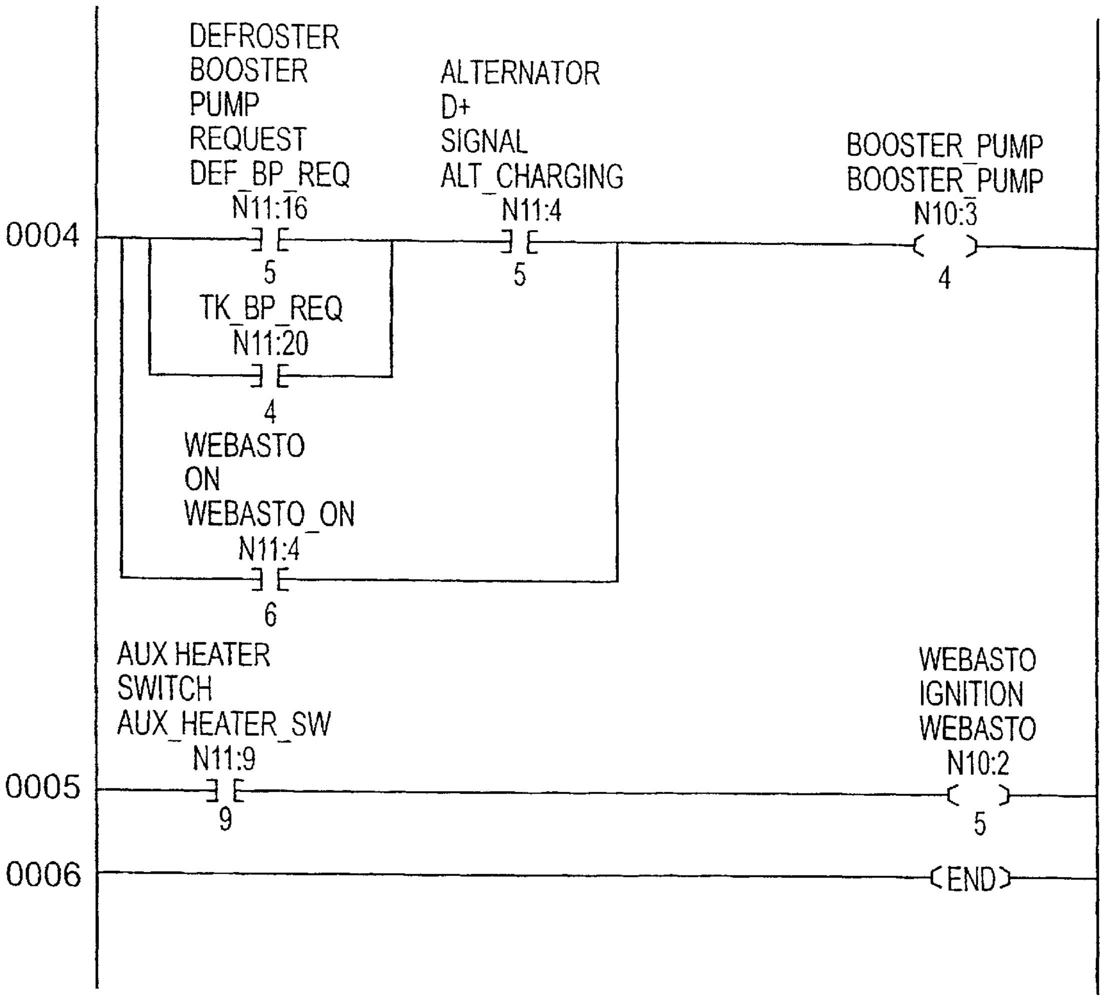
Figure 36A:
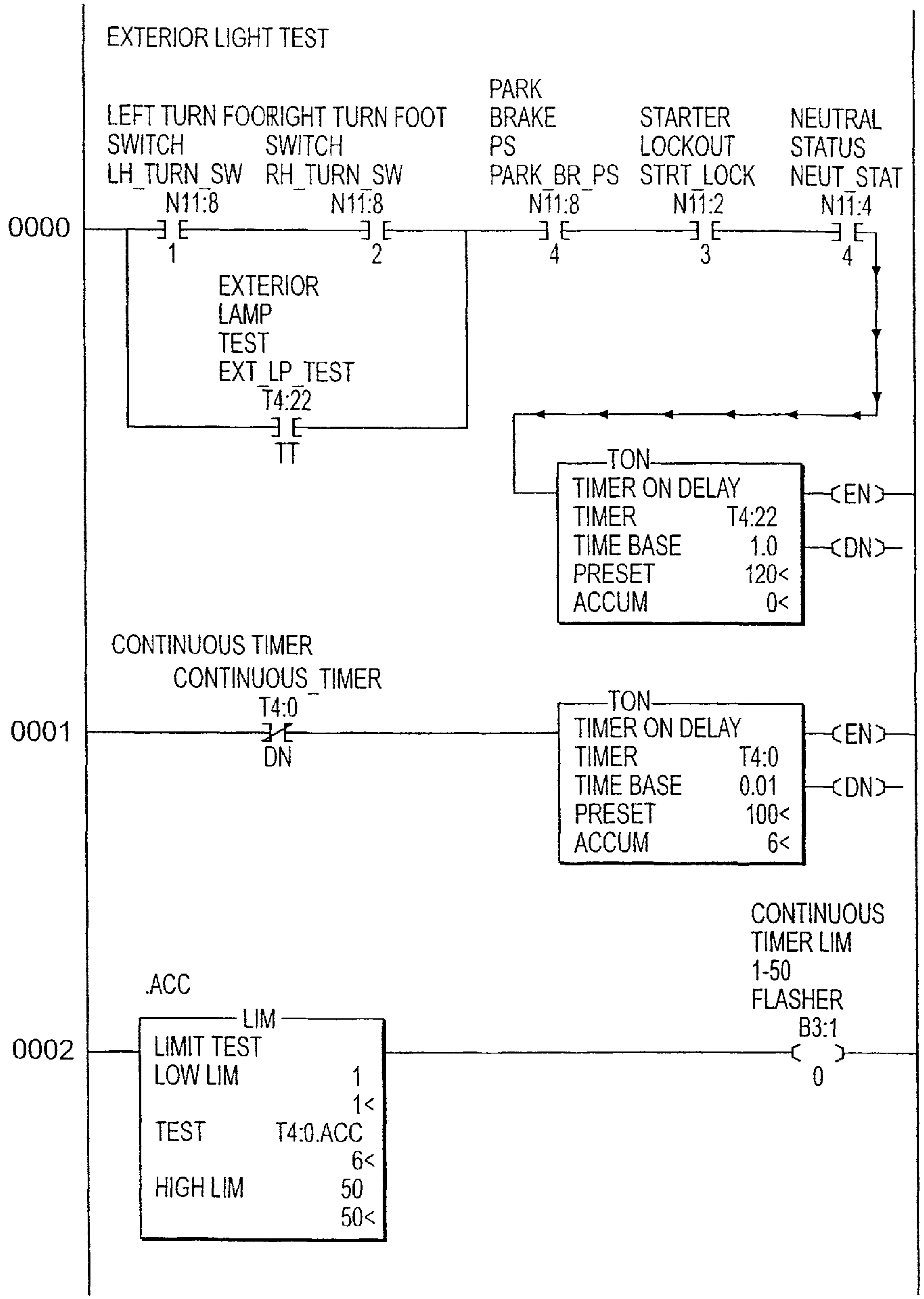
Figure 36B:
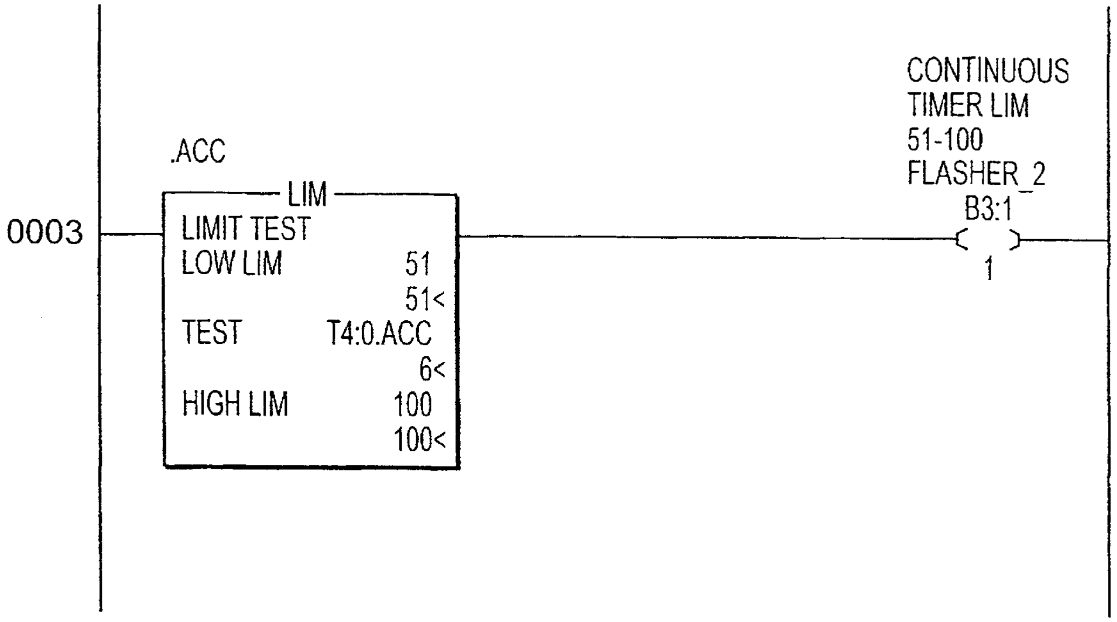
Figure 36C:
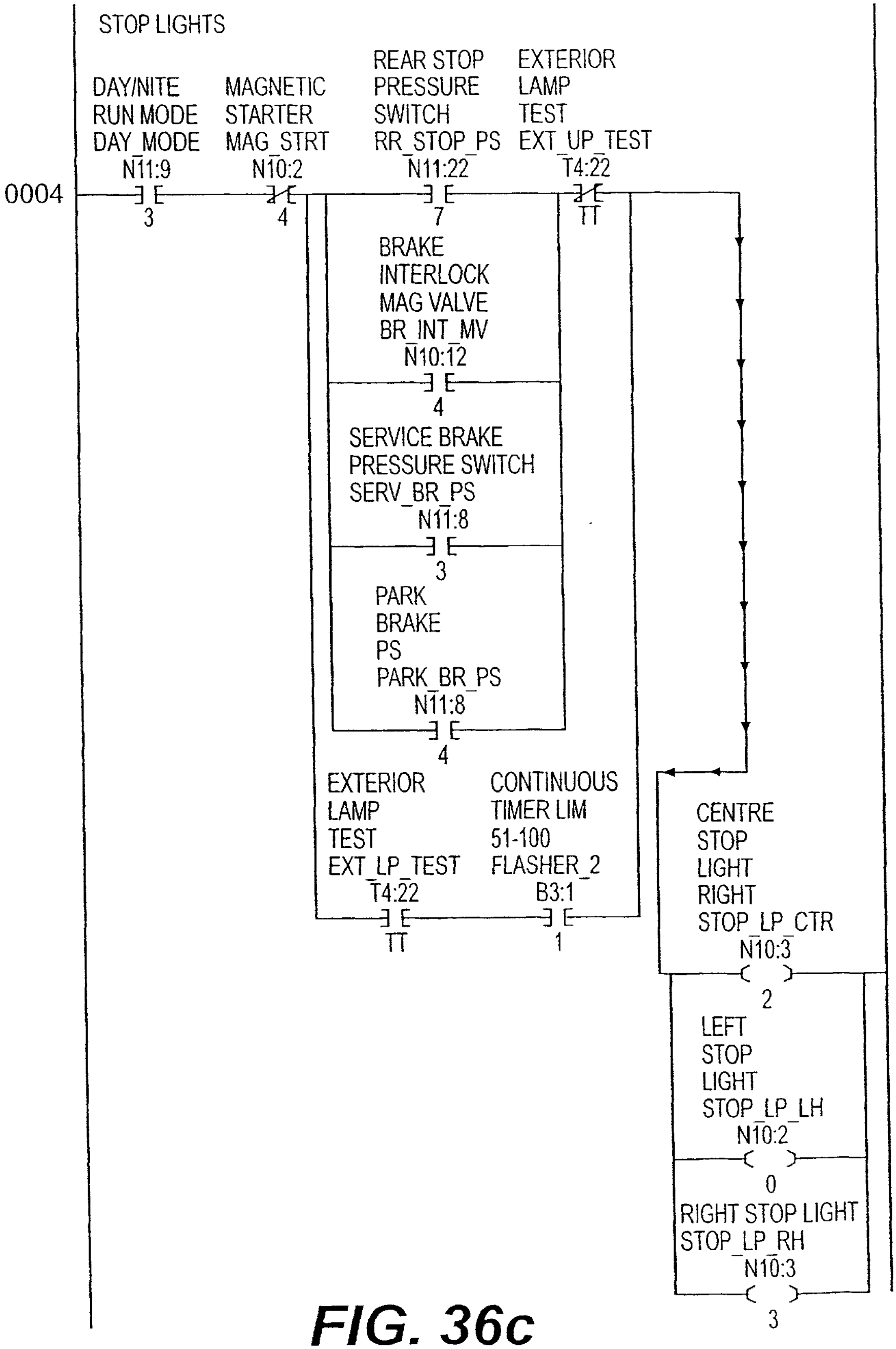
Figure 36D:
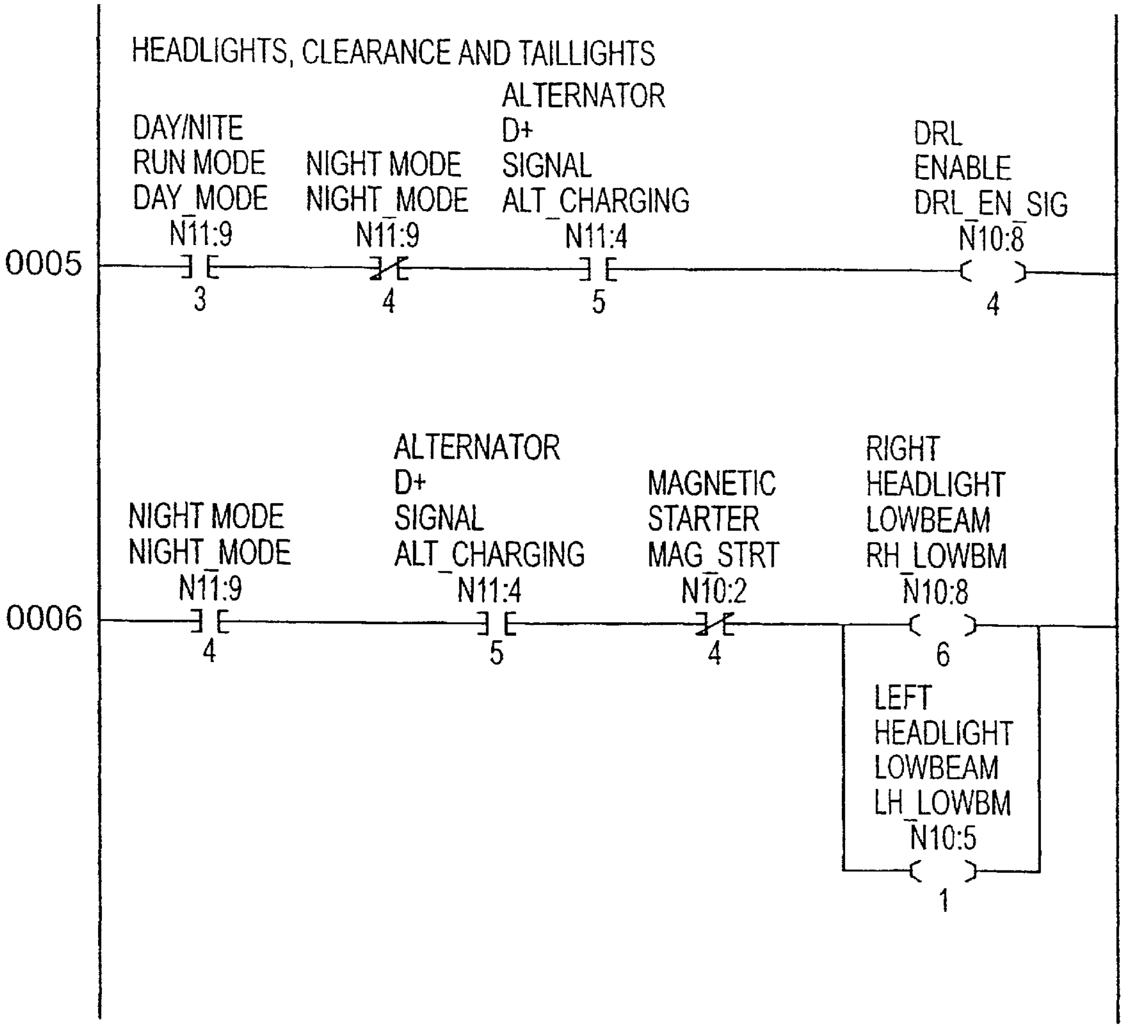
Figure 36E:
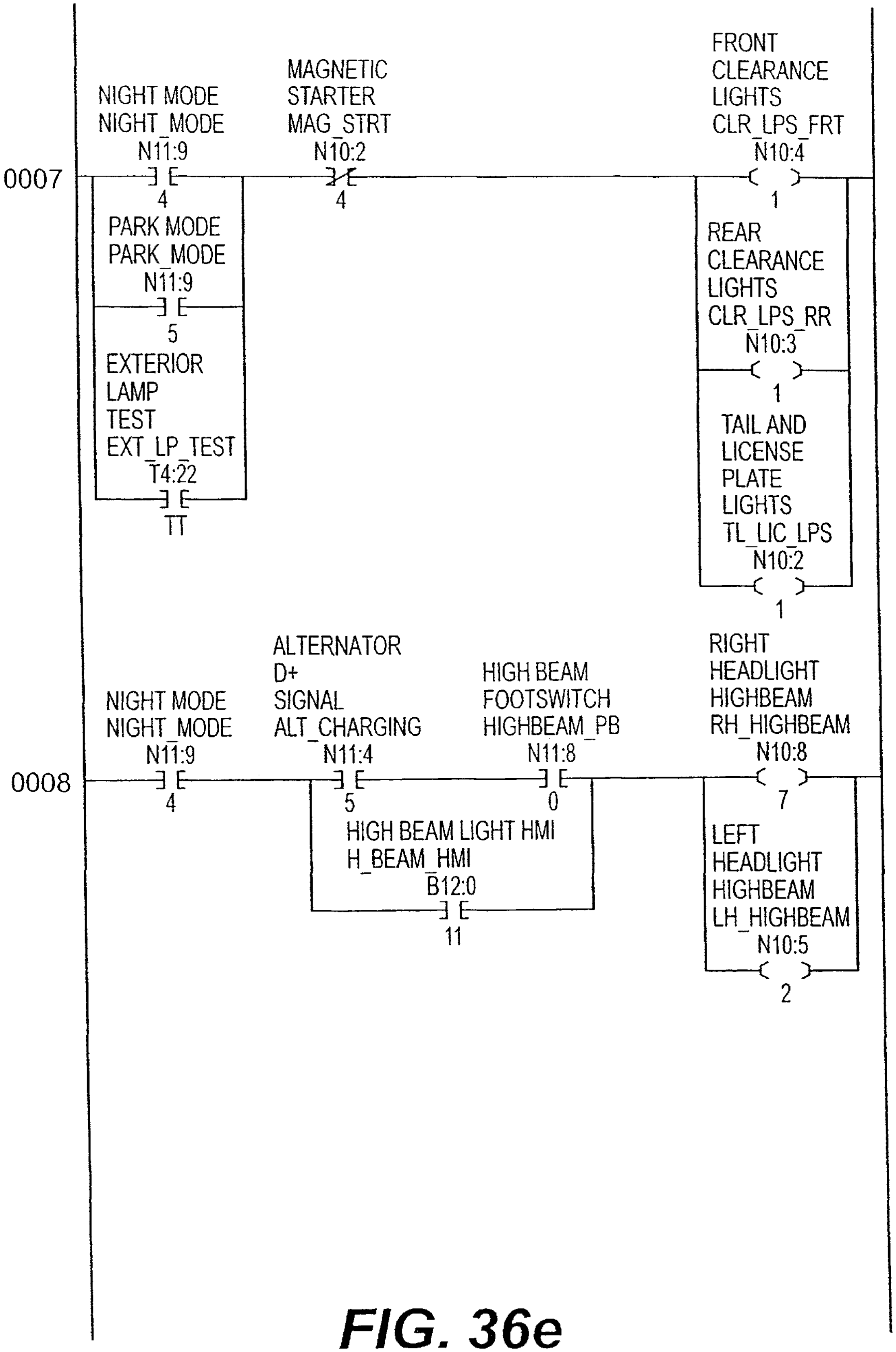
Figure 36F:
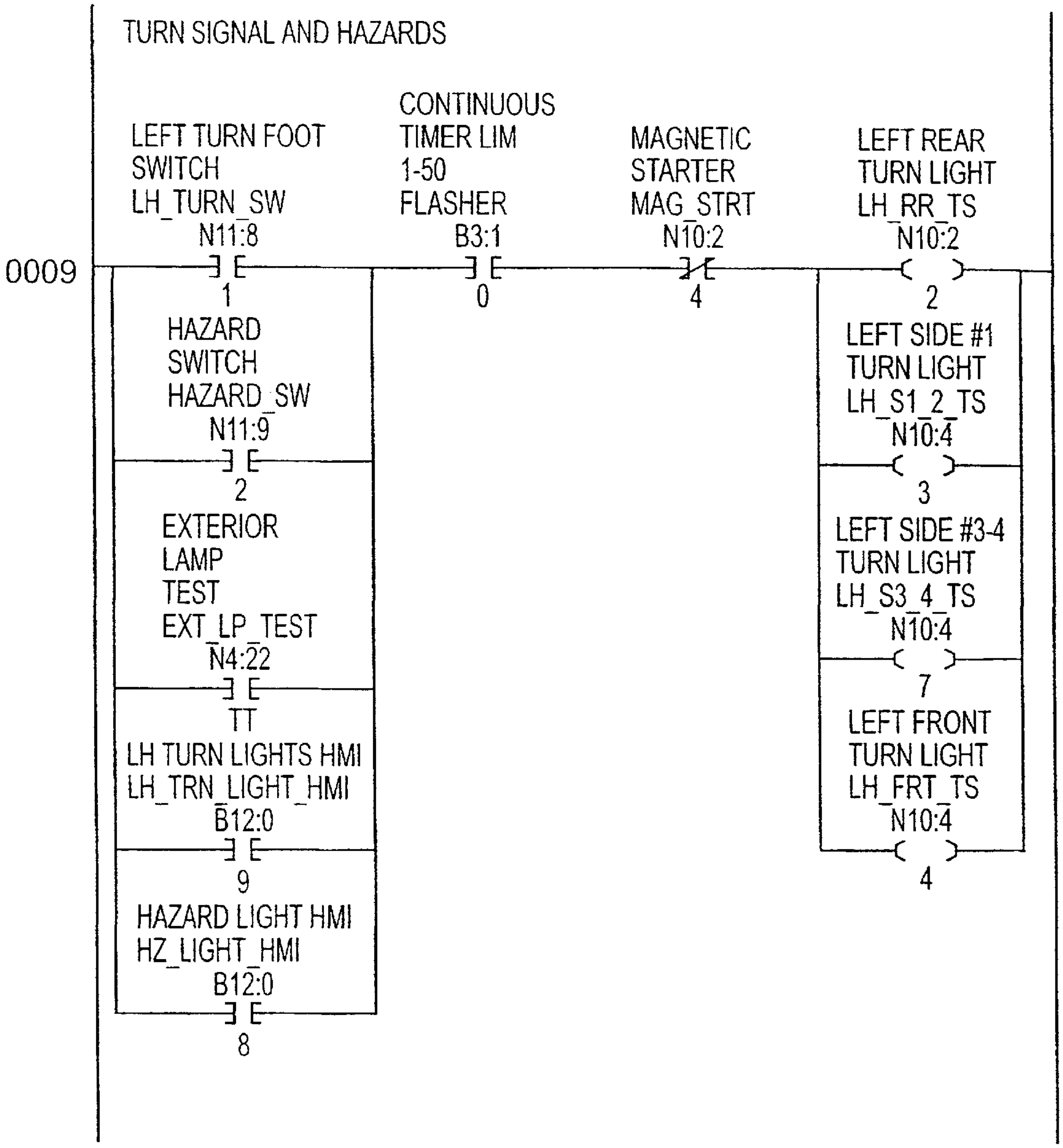
Figure 36G:
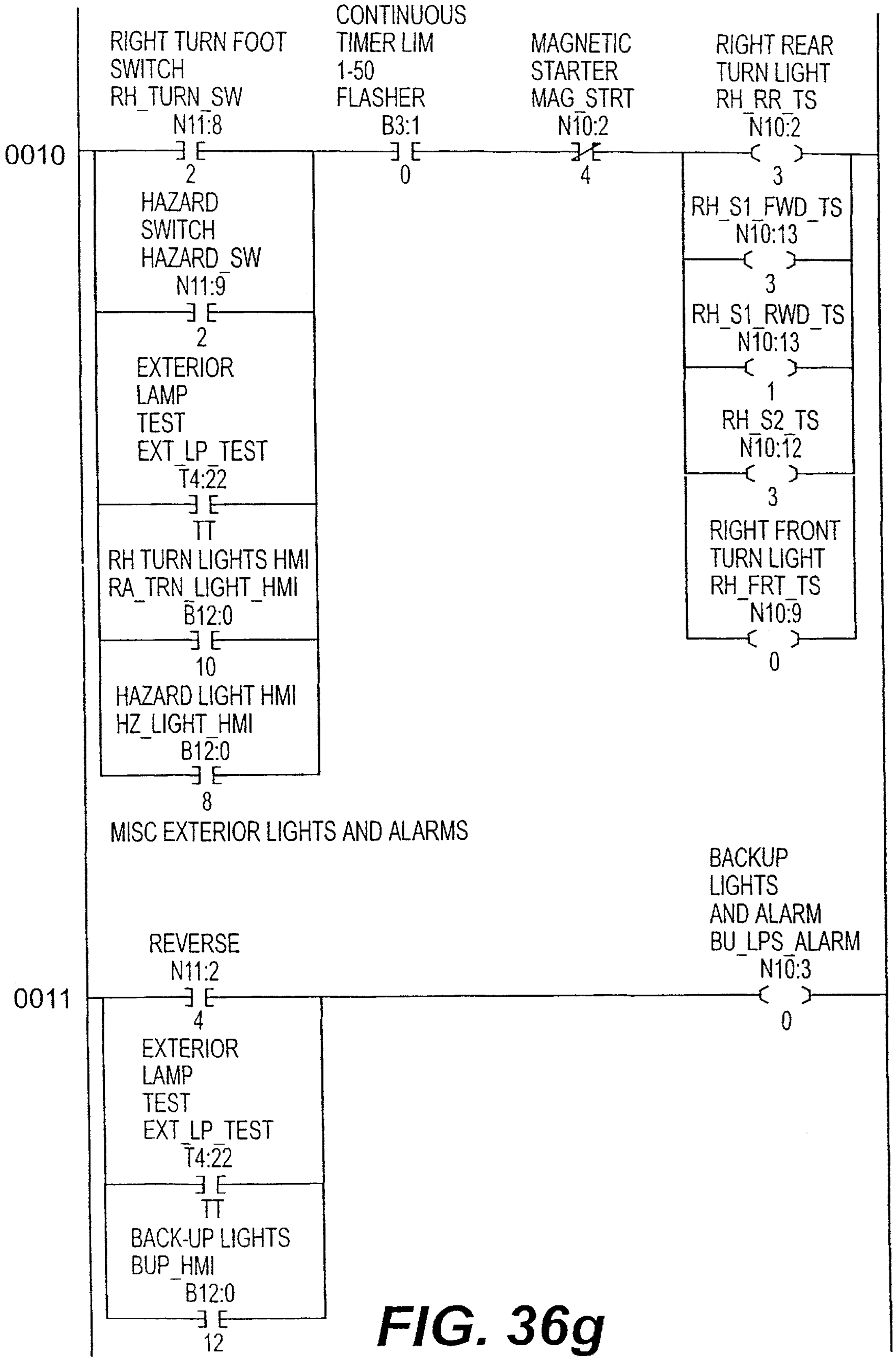
Figure 36H:
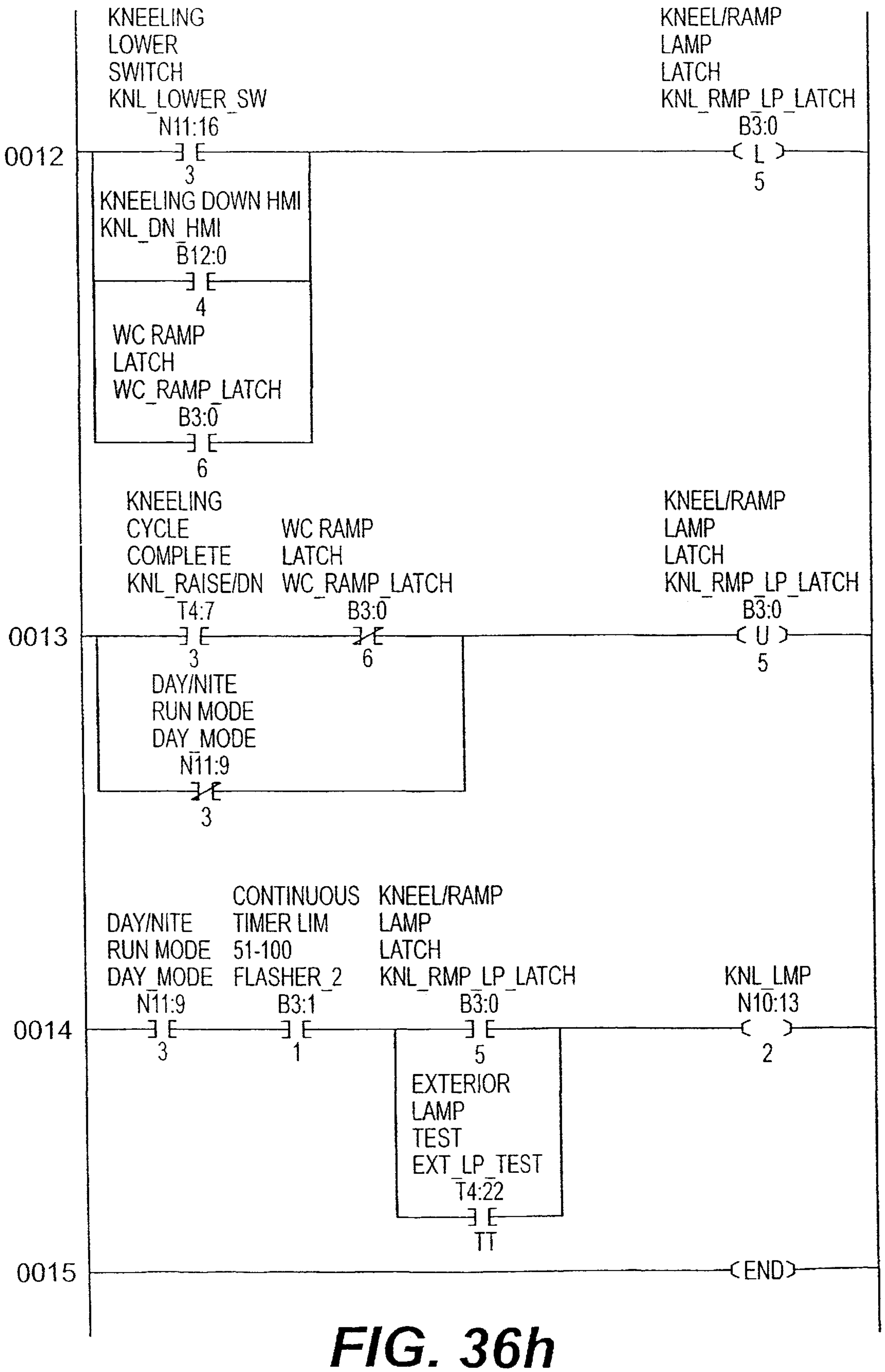
Figure 37A:
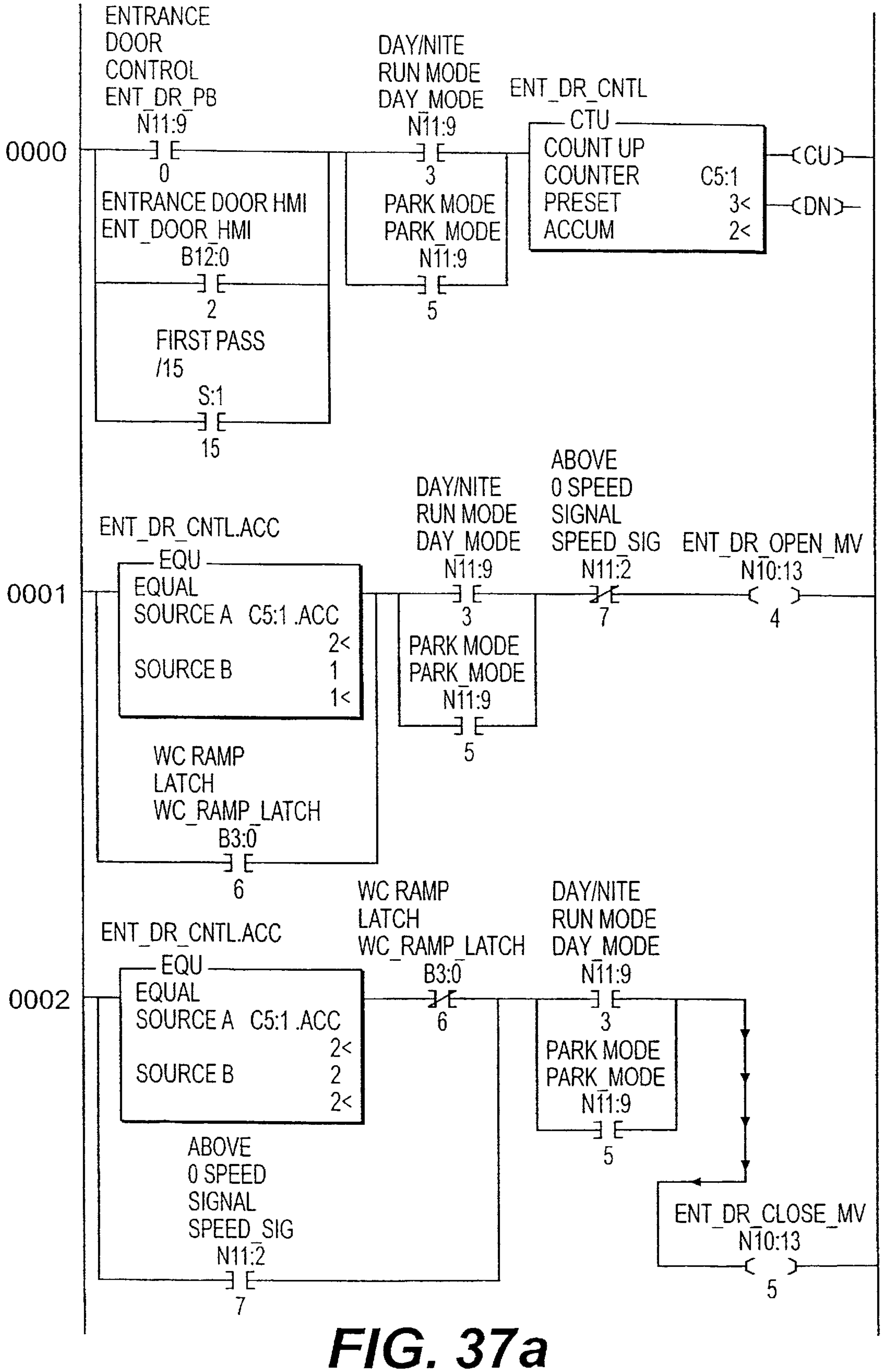
Figure 37B:
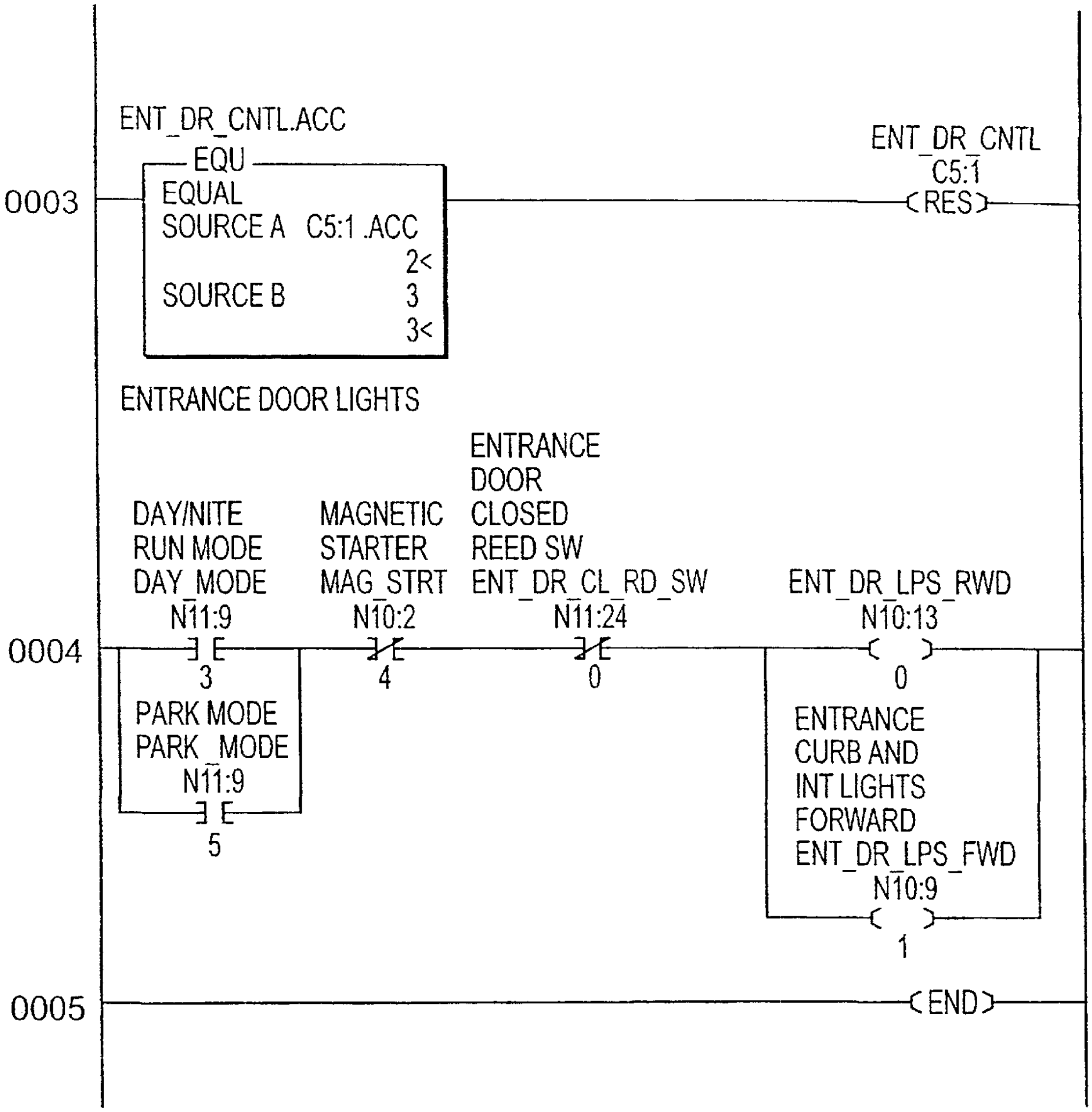
Figure 38A:
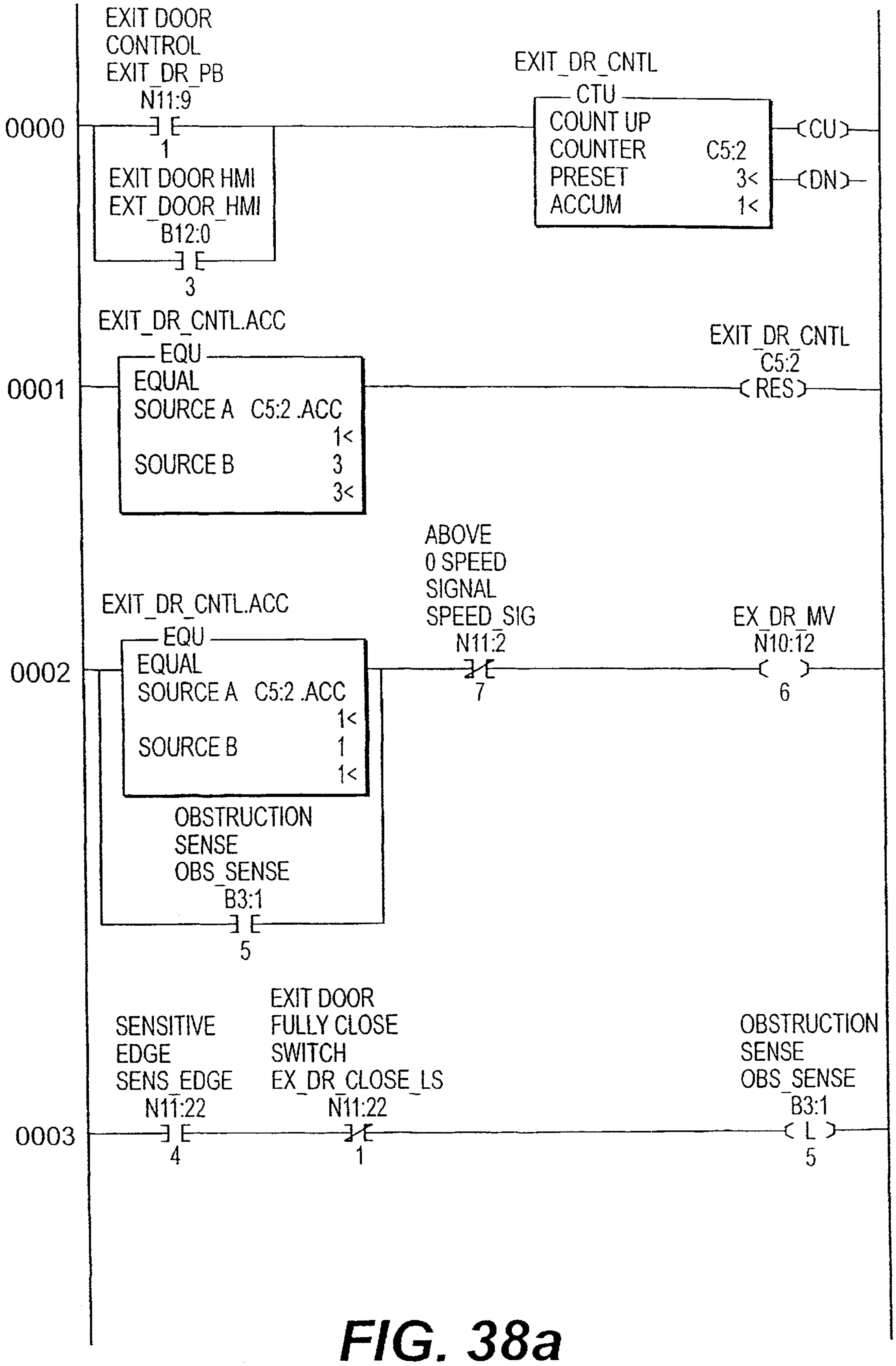
Figure 38B:
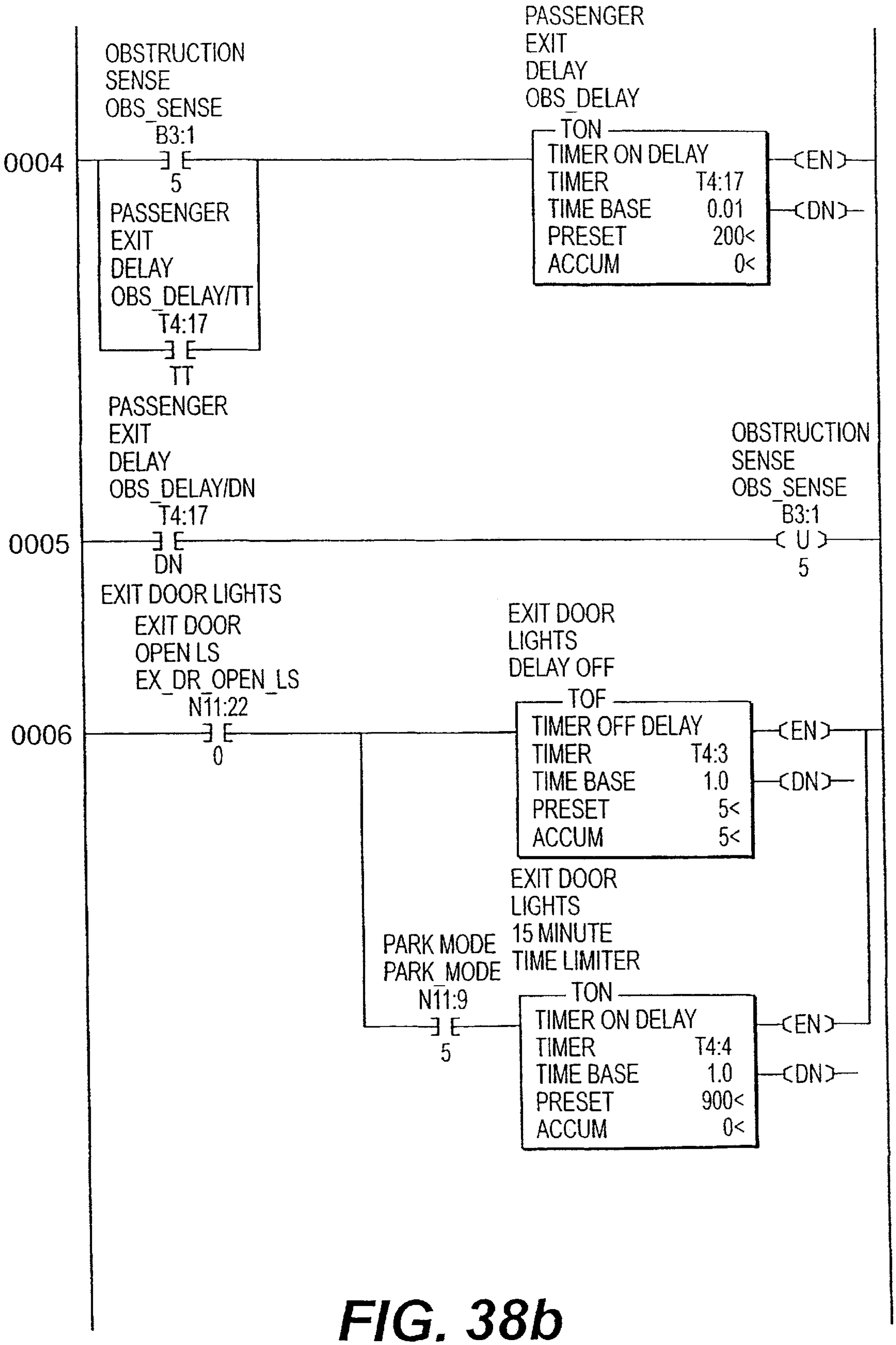
Figure 38C:
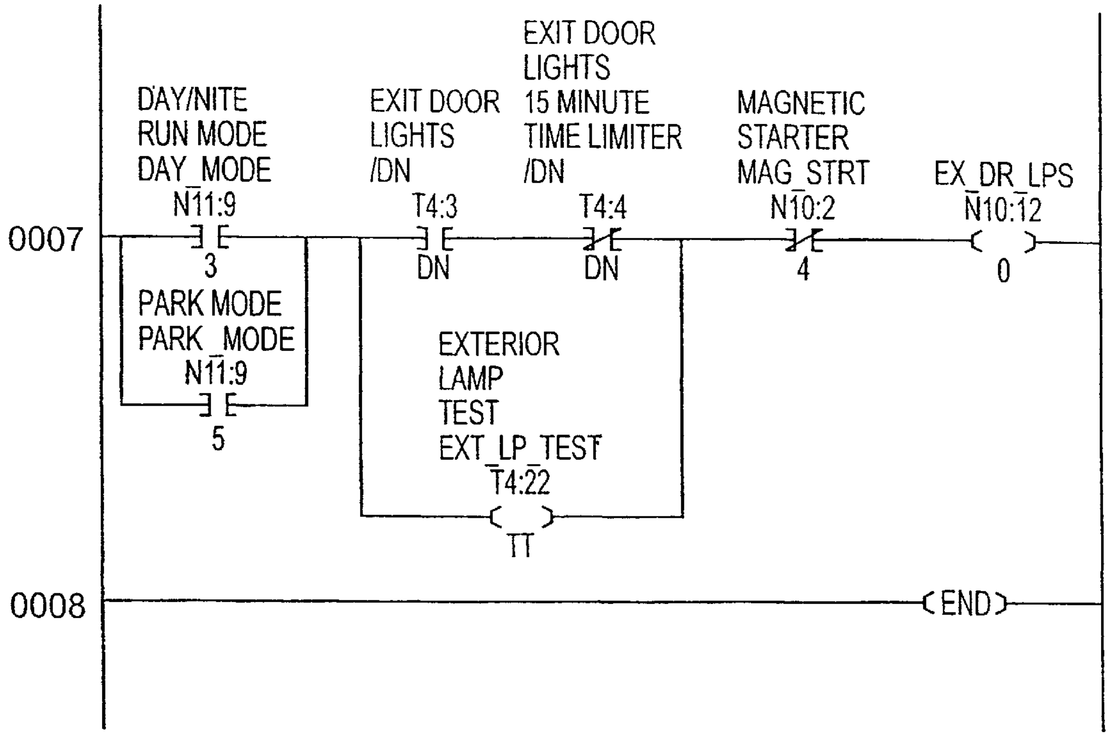
Figure 39A:
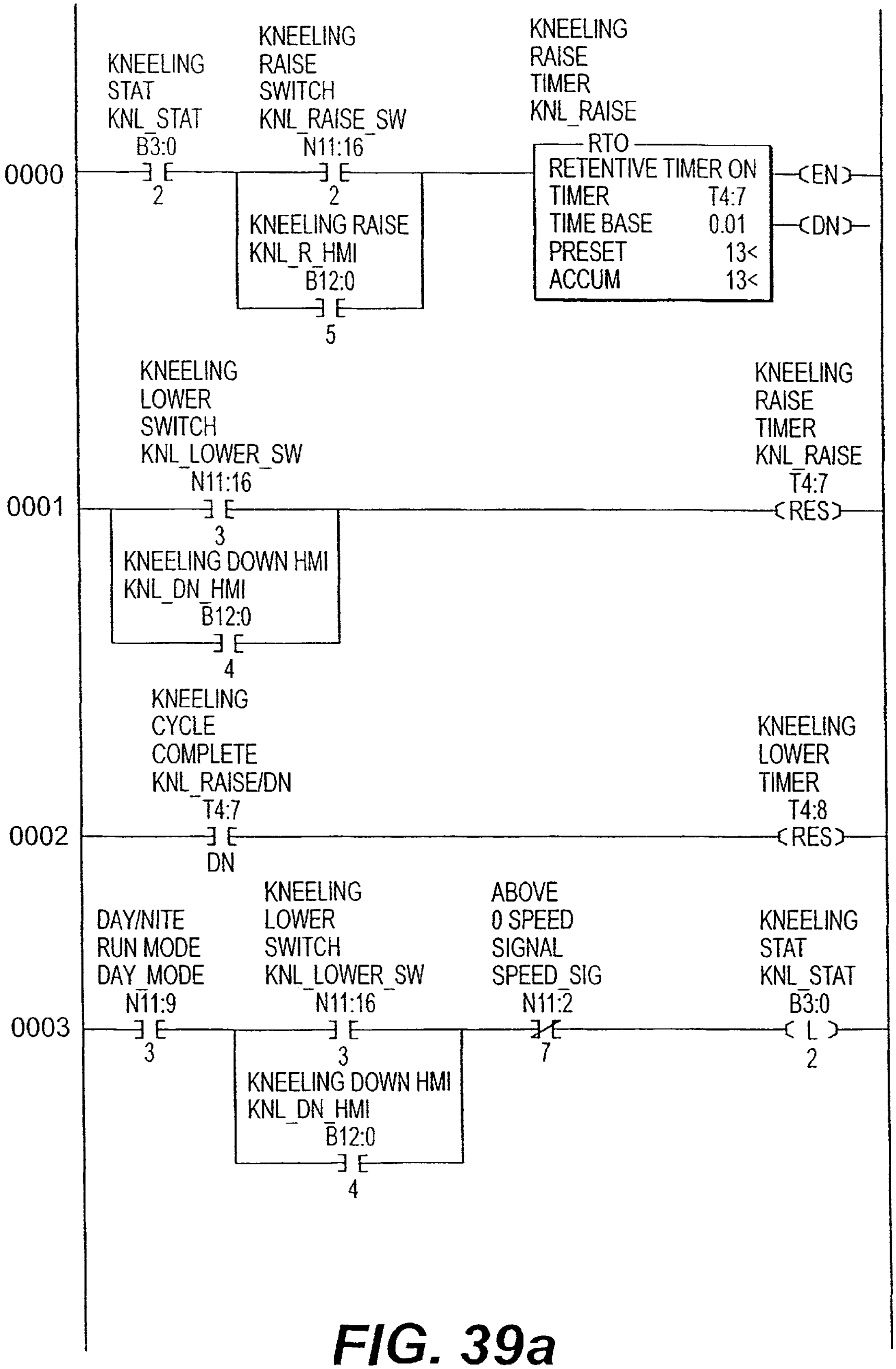
Figure 39B:
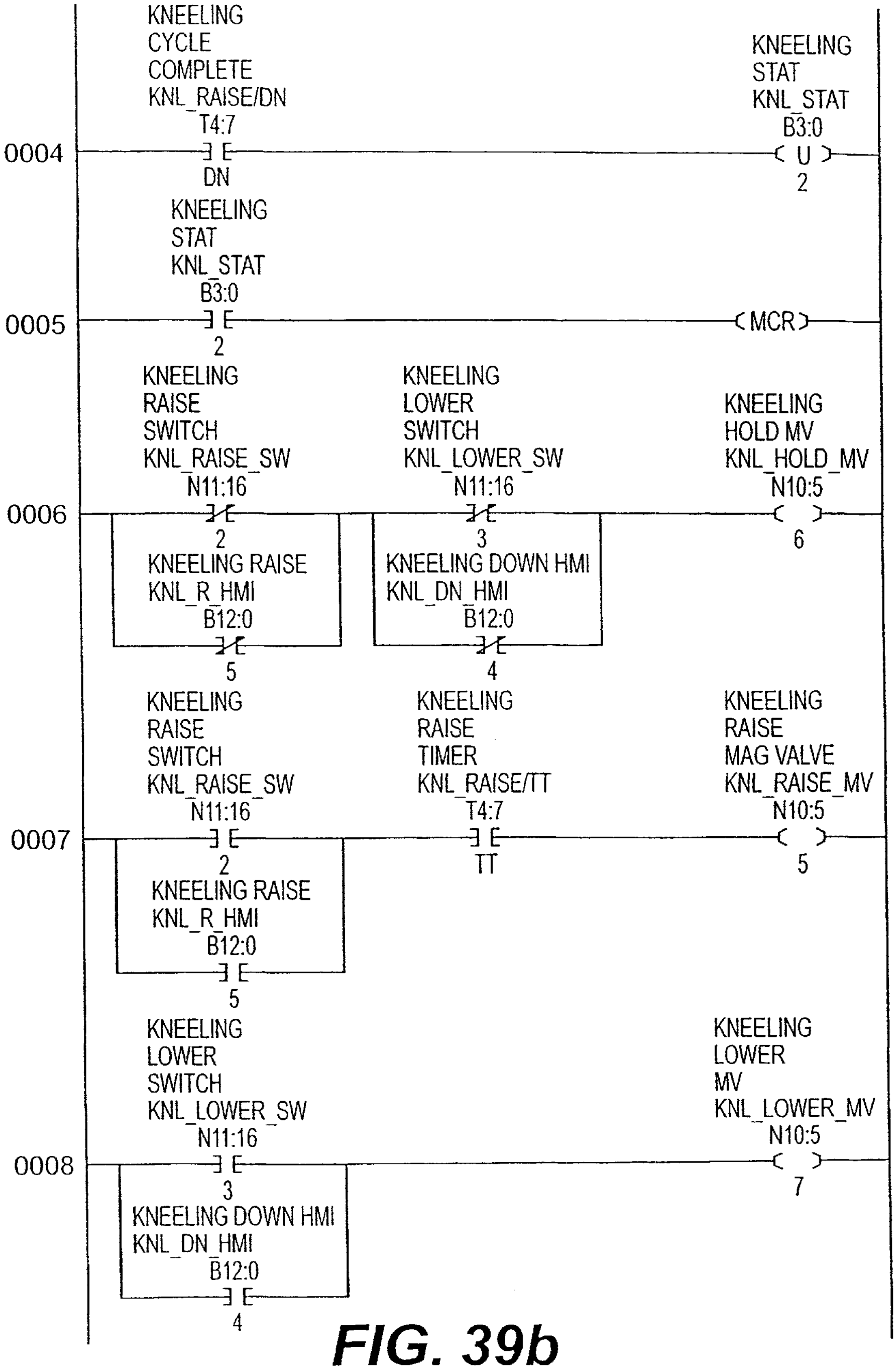
Figure 39C:
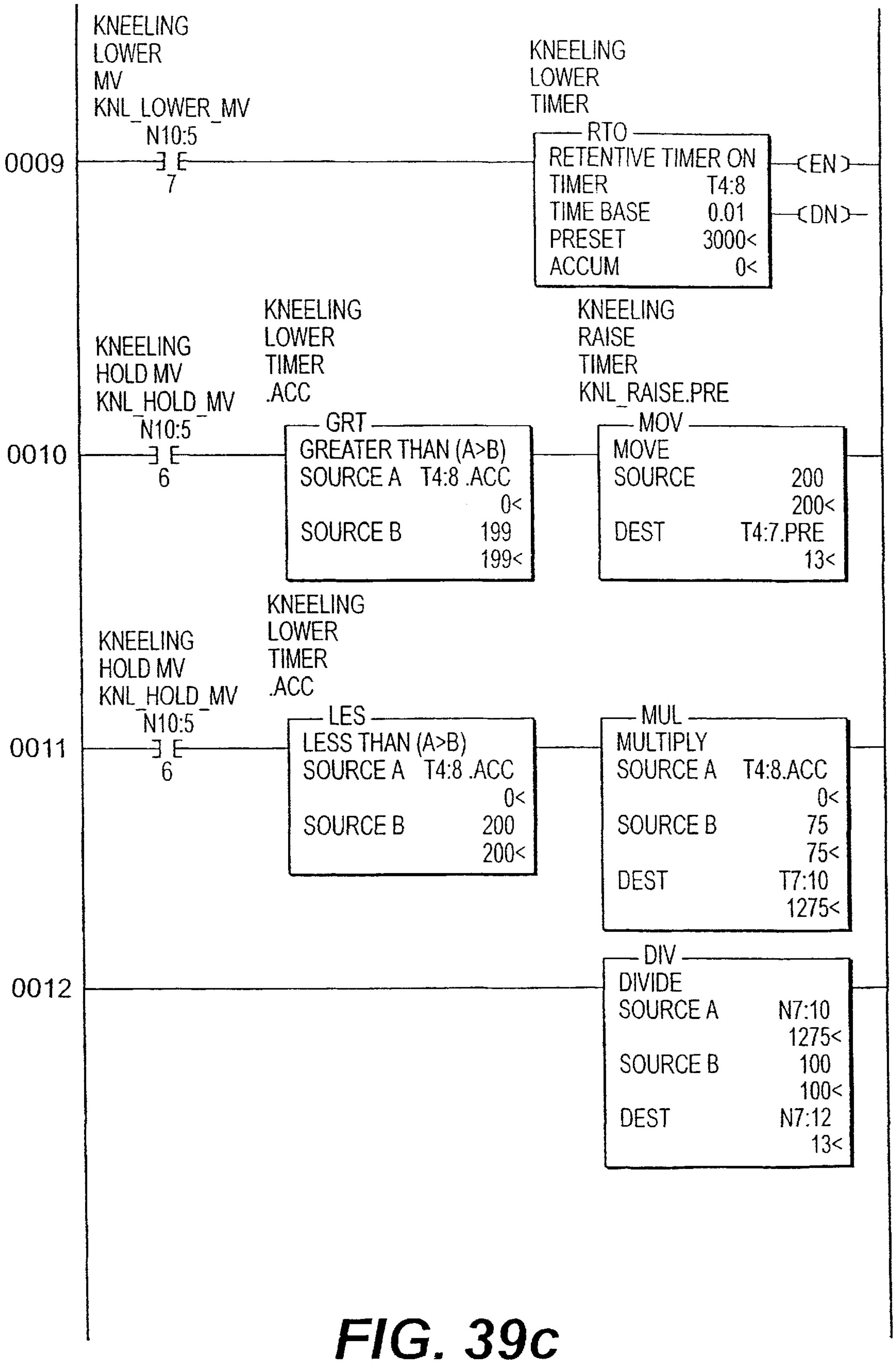
Figure 39D:
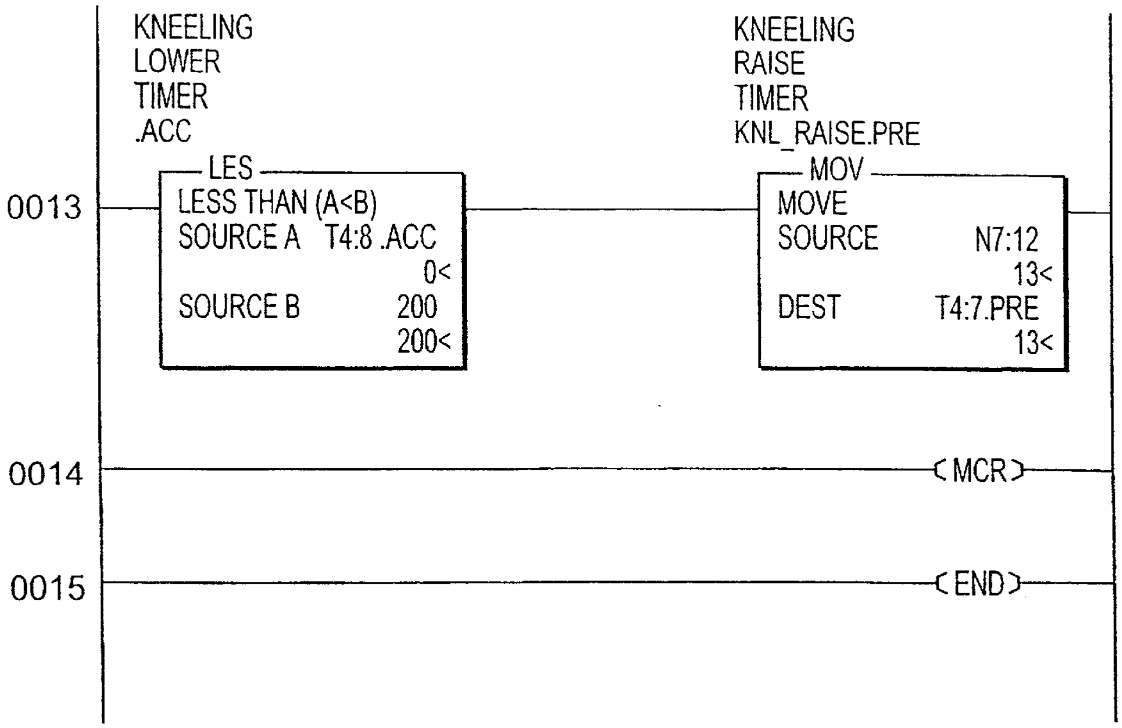
Figure 40A:
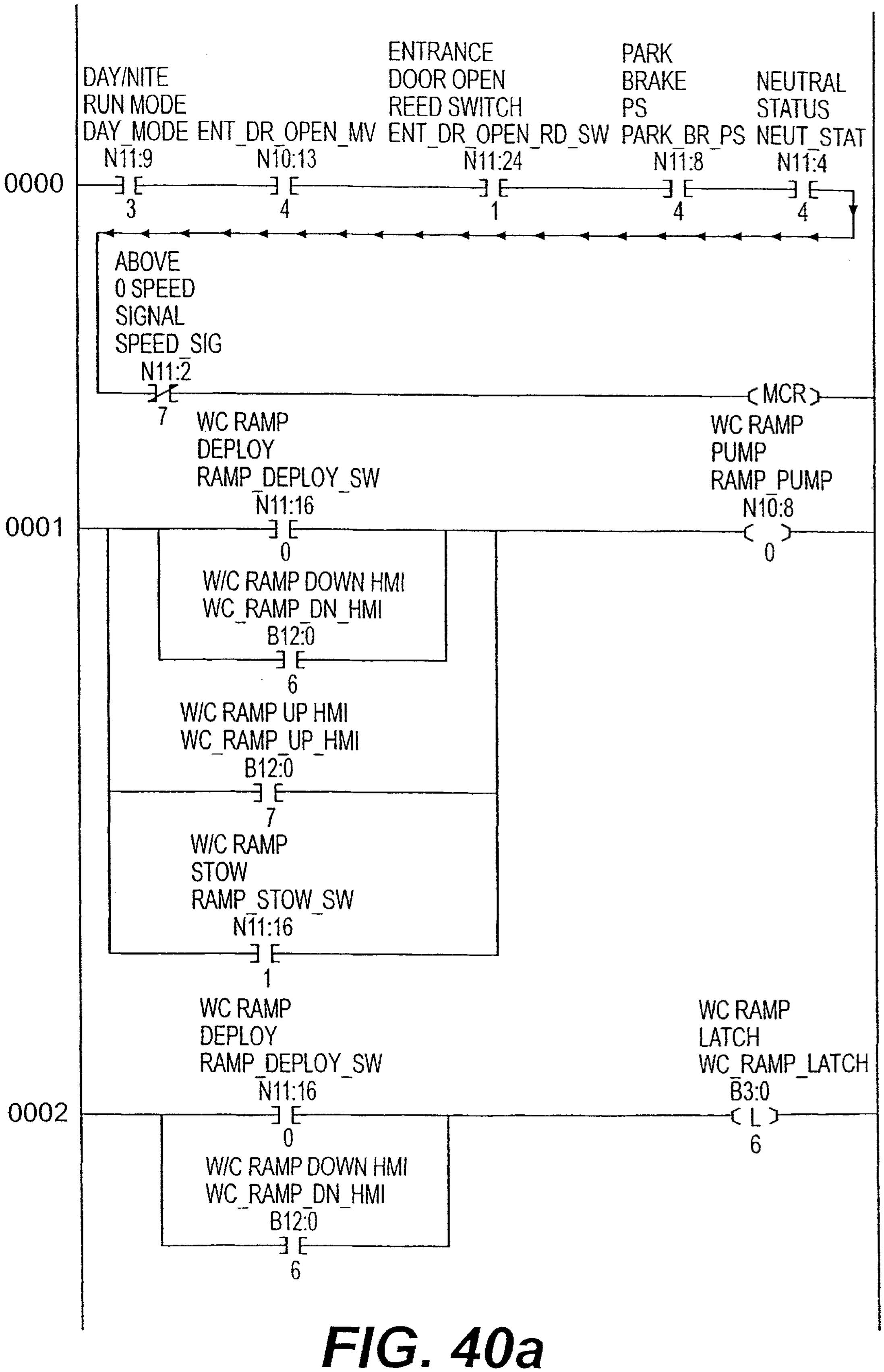
Figure 40B:
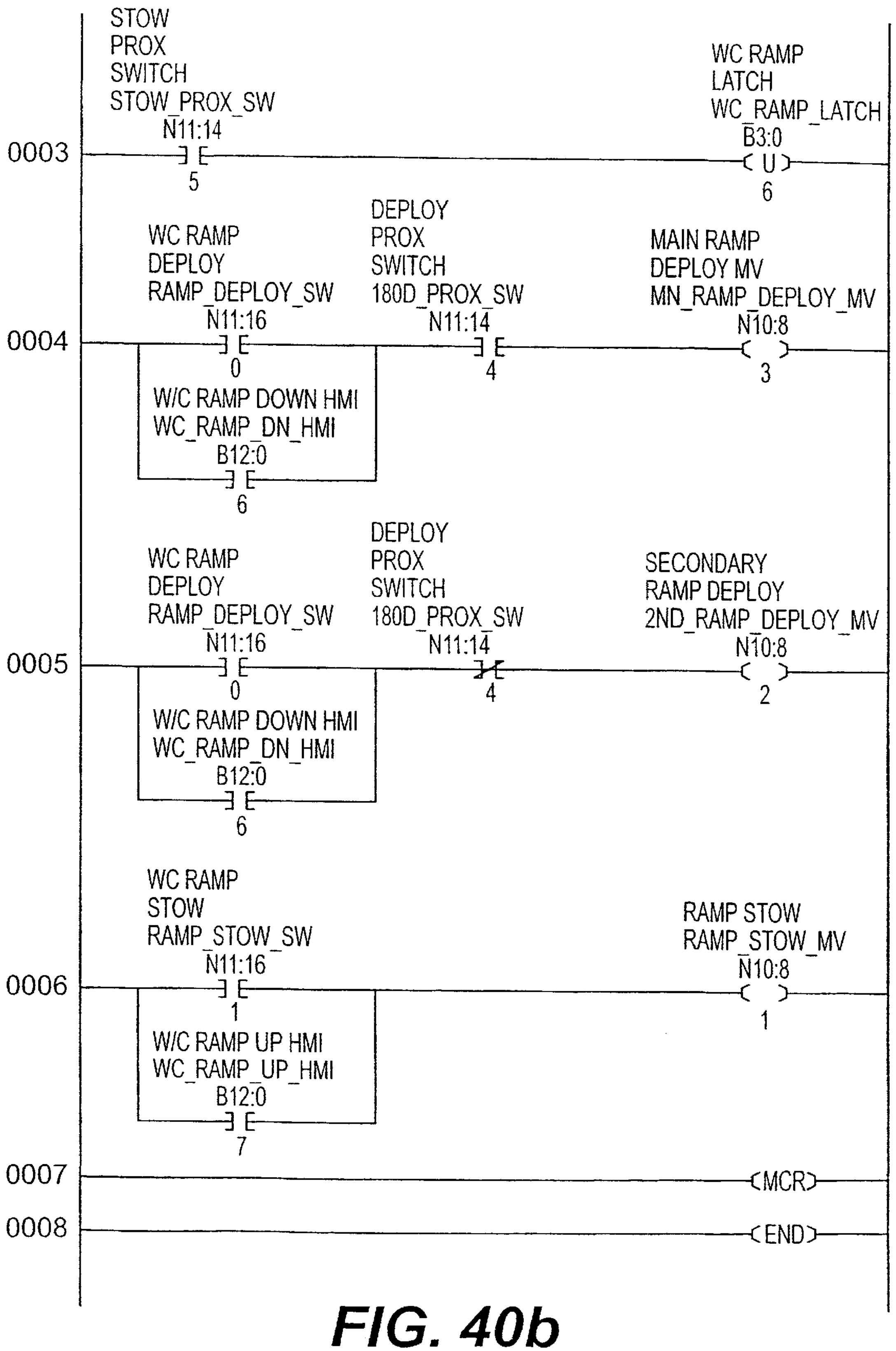
Figure 41A:
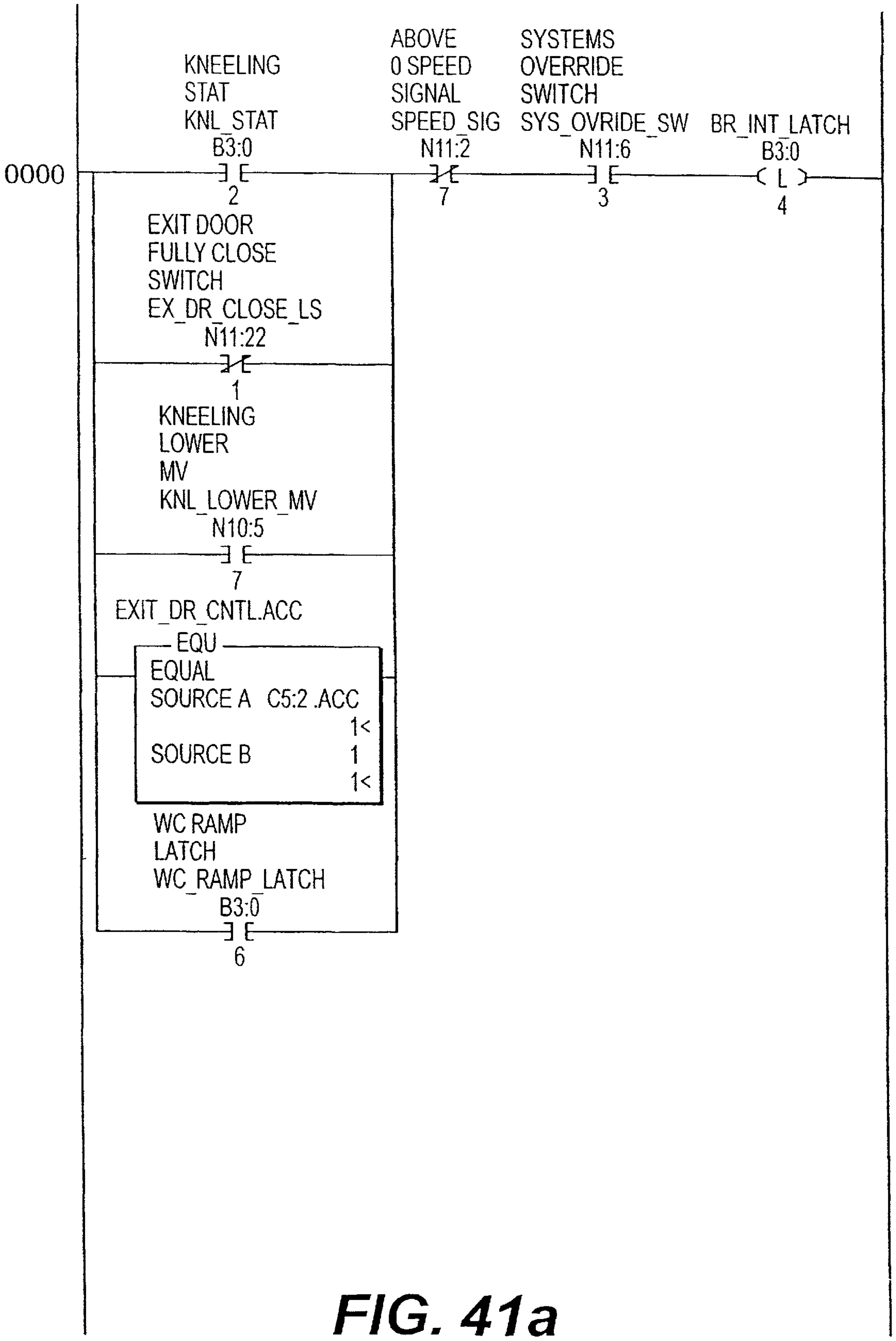
Figure 41B:
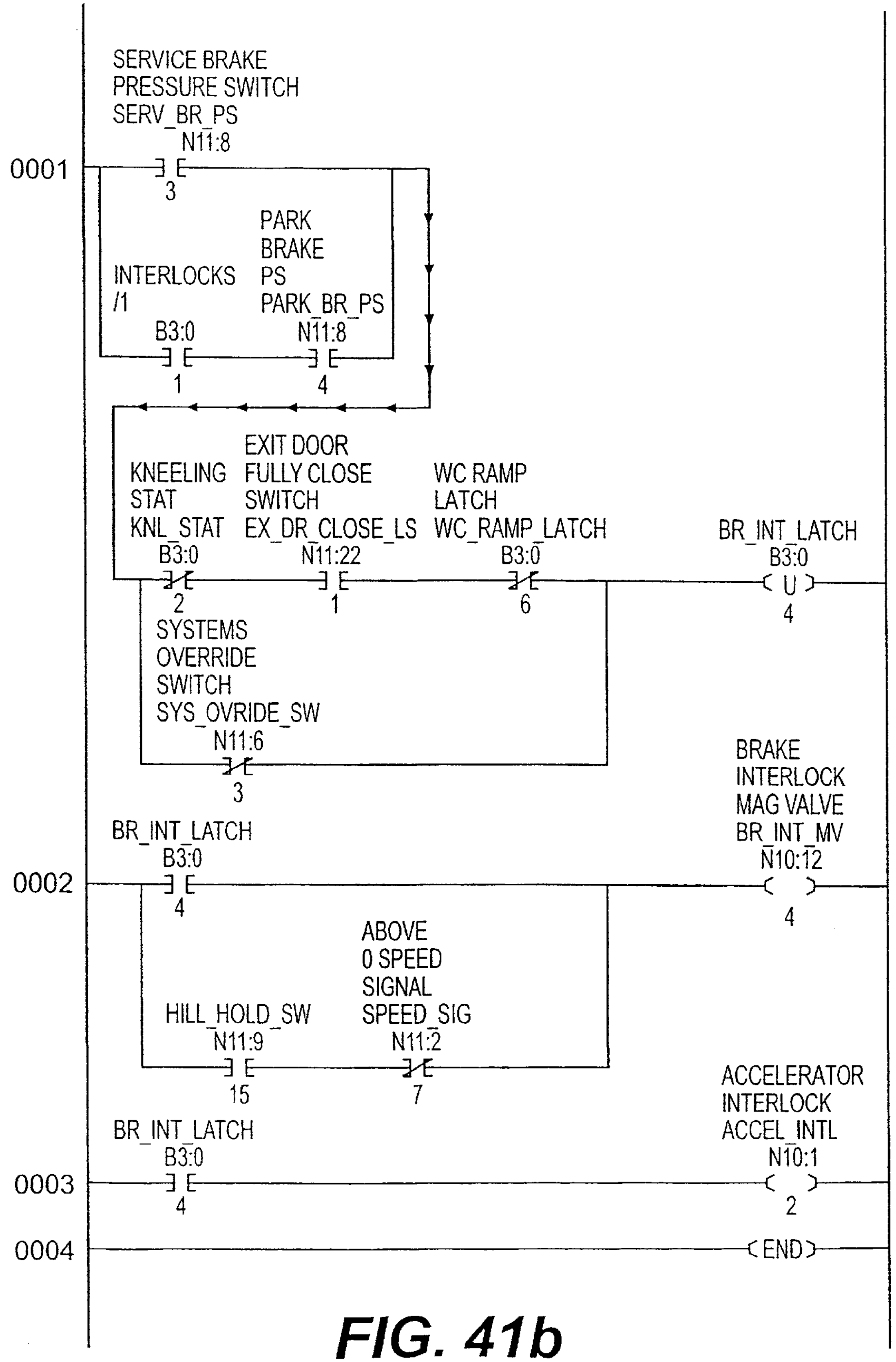
Figure 42A:
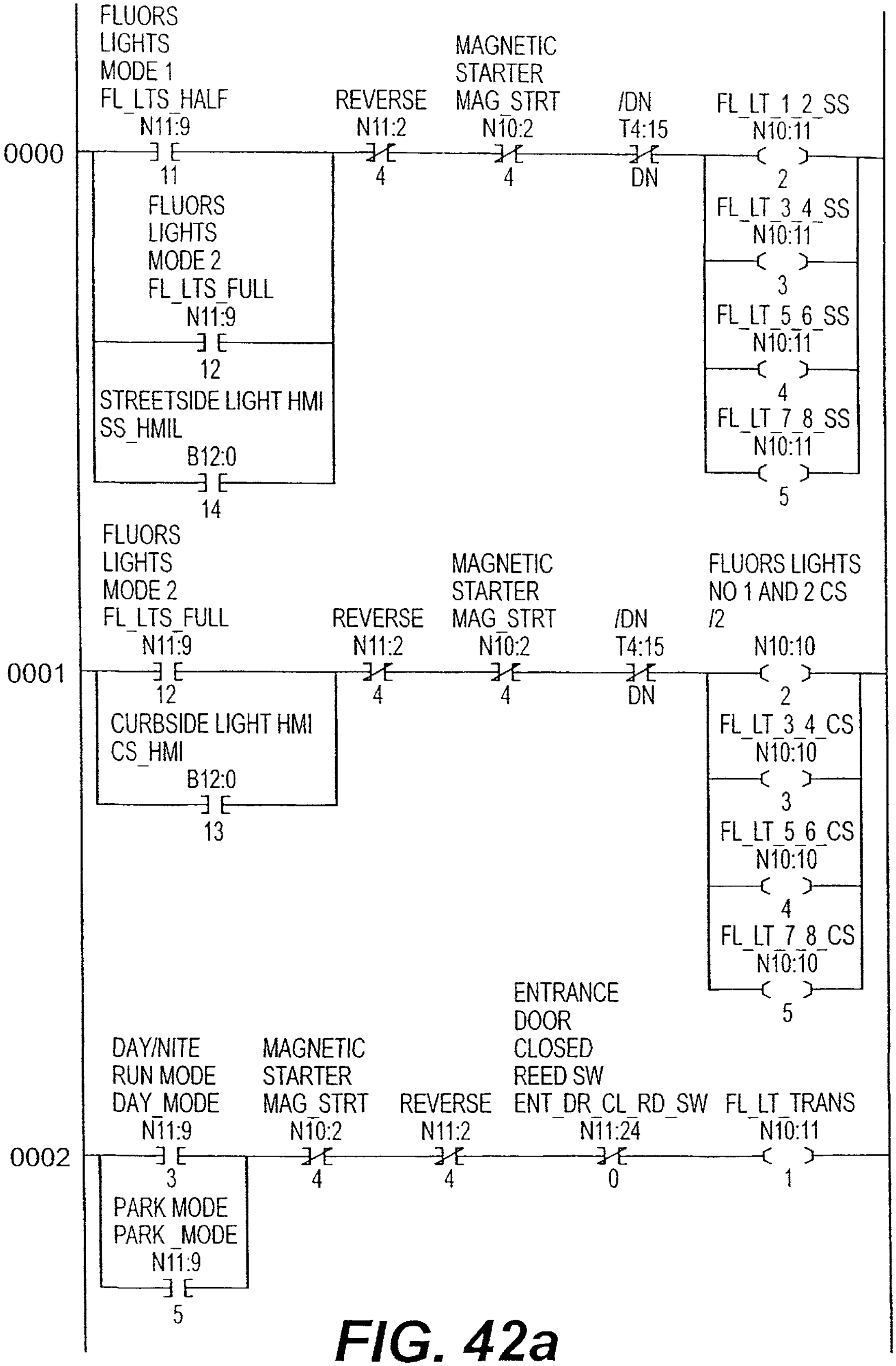
Figure 42B:
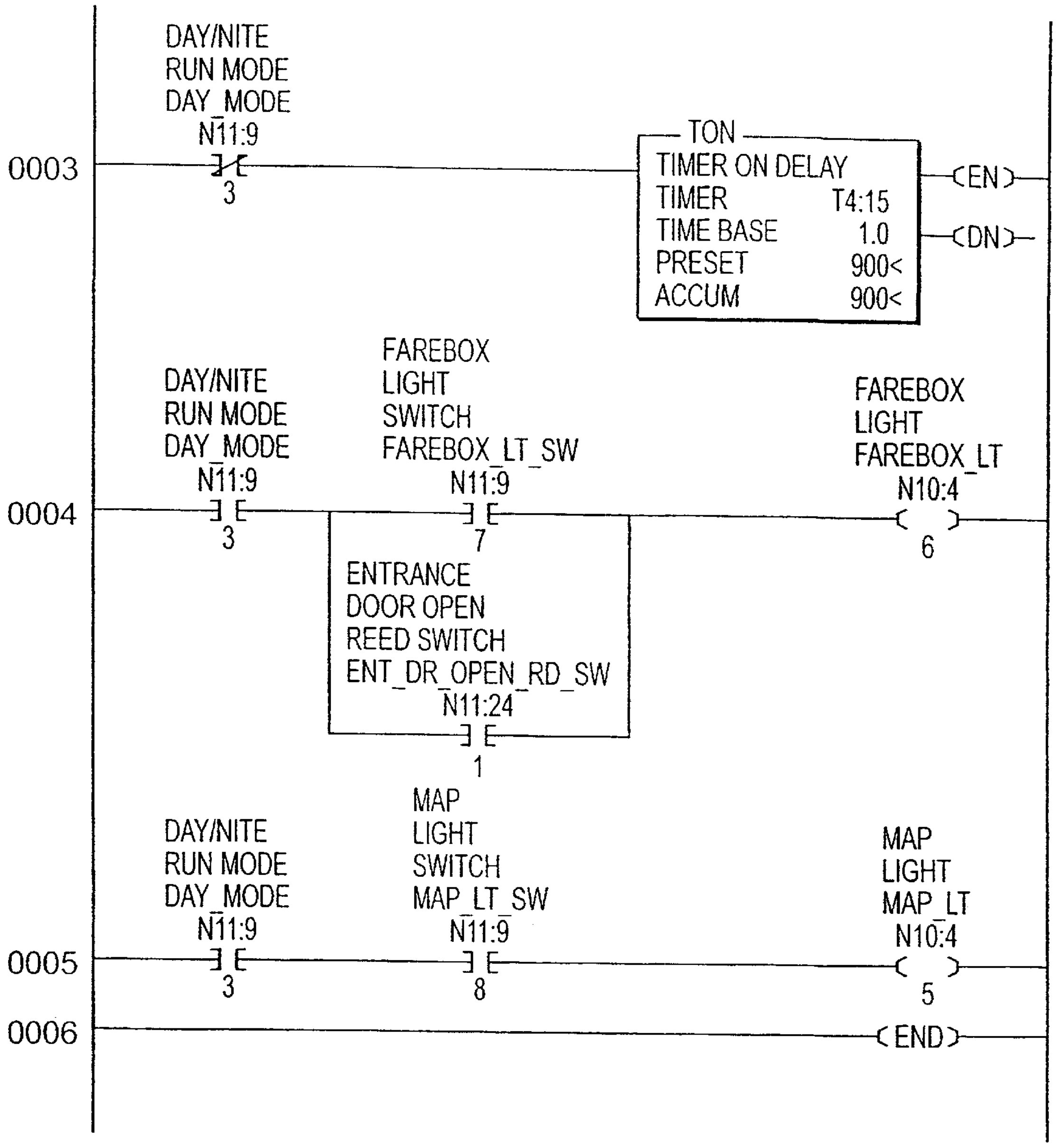
Figure 43A:
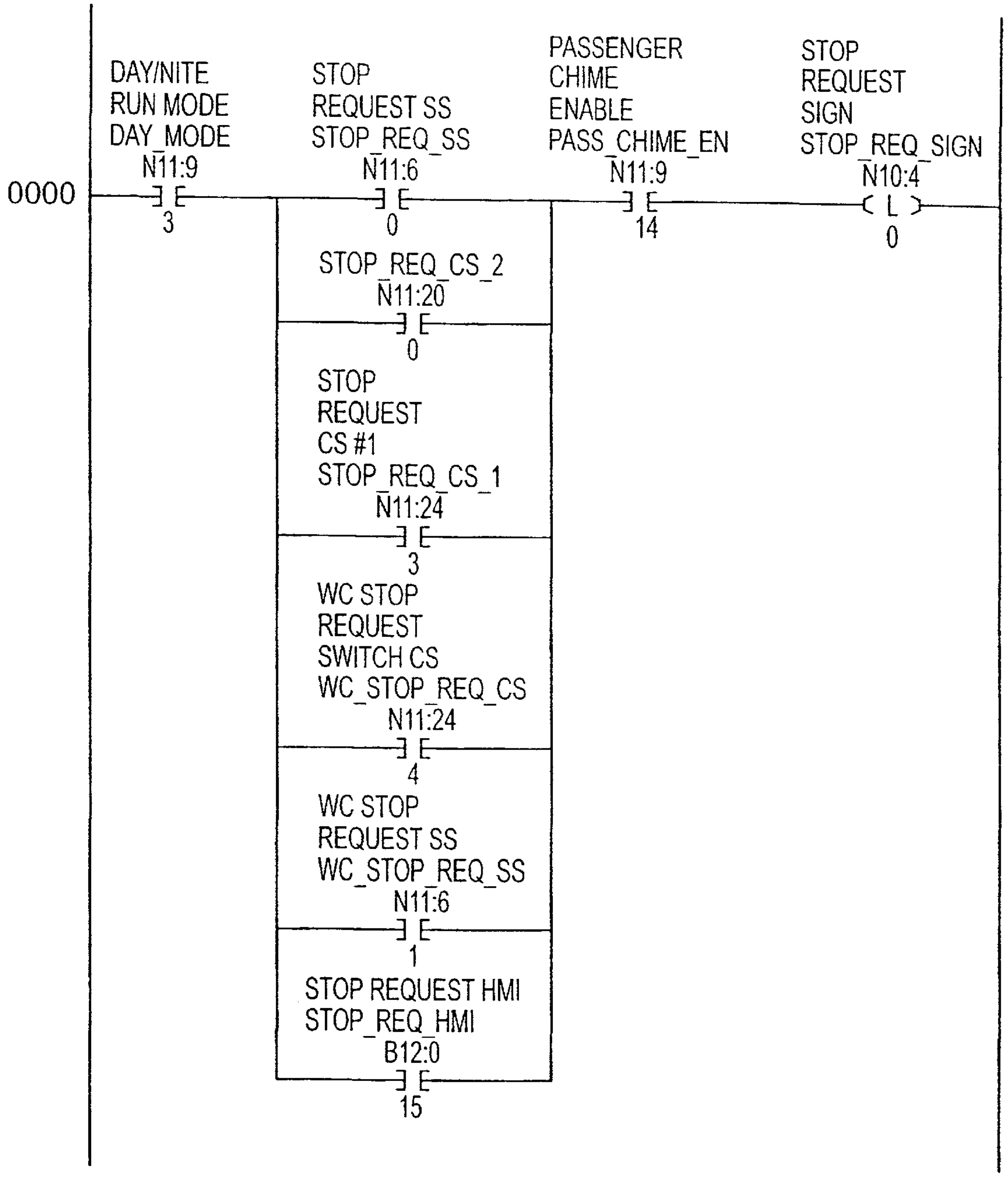
Figure 43B:
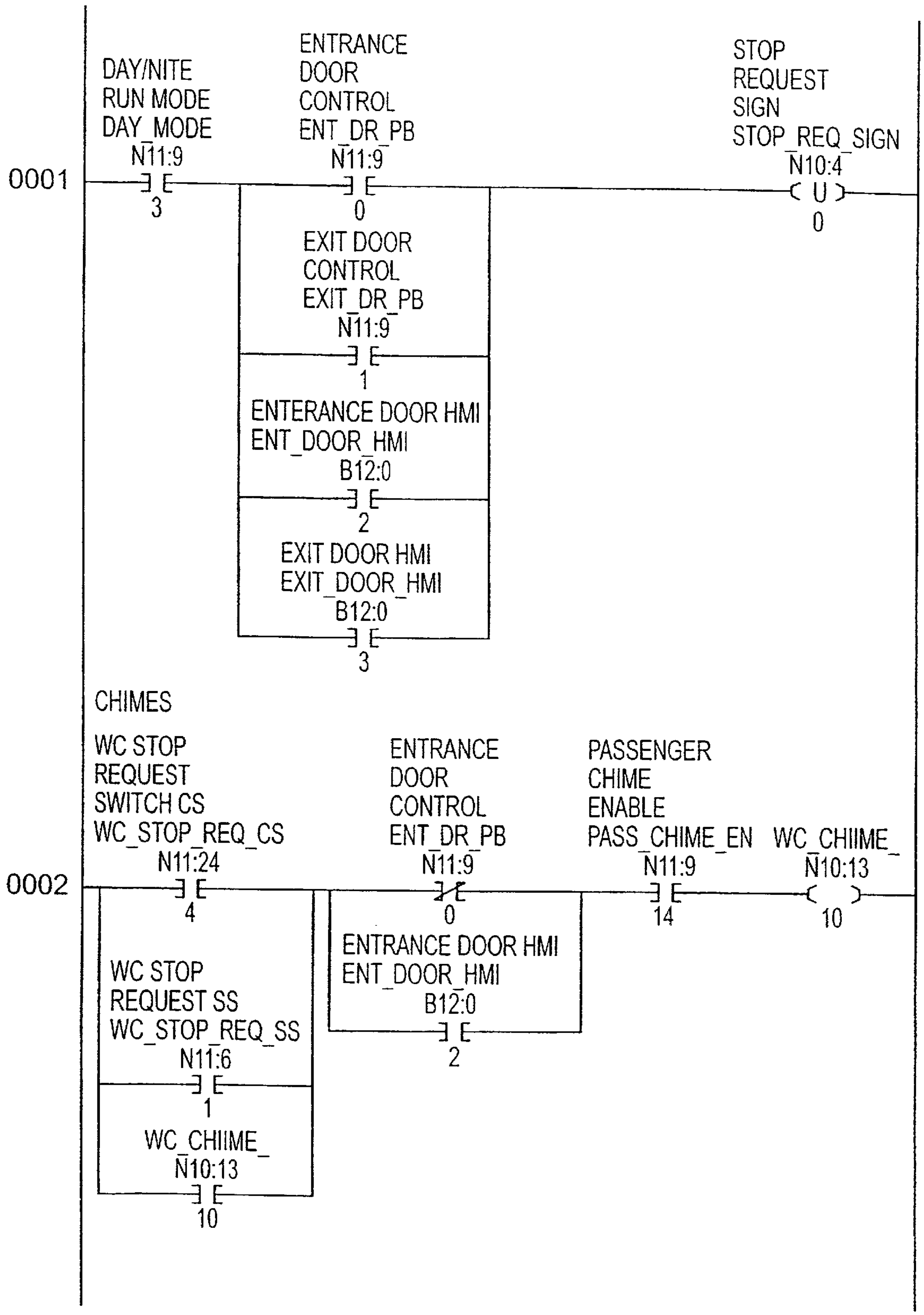
Figure 43C:
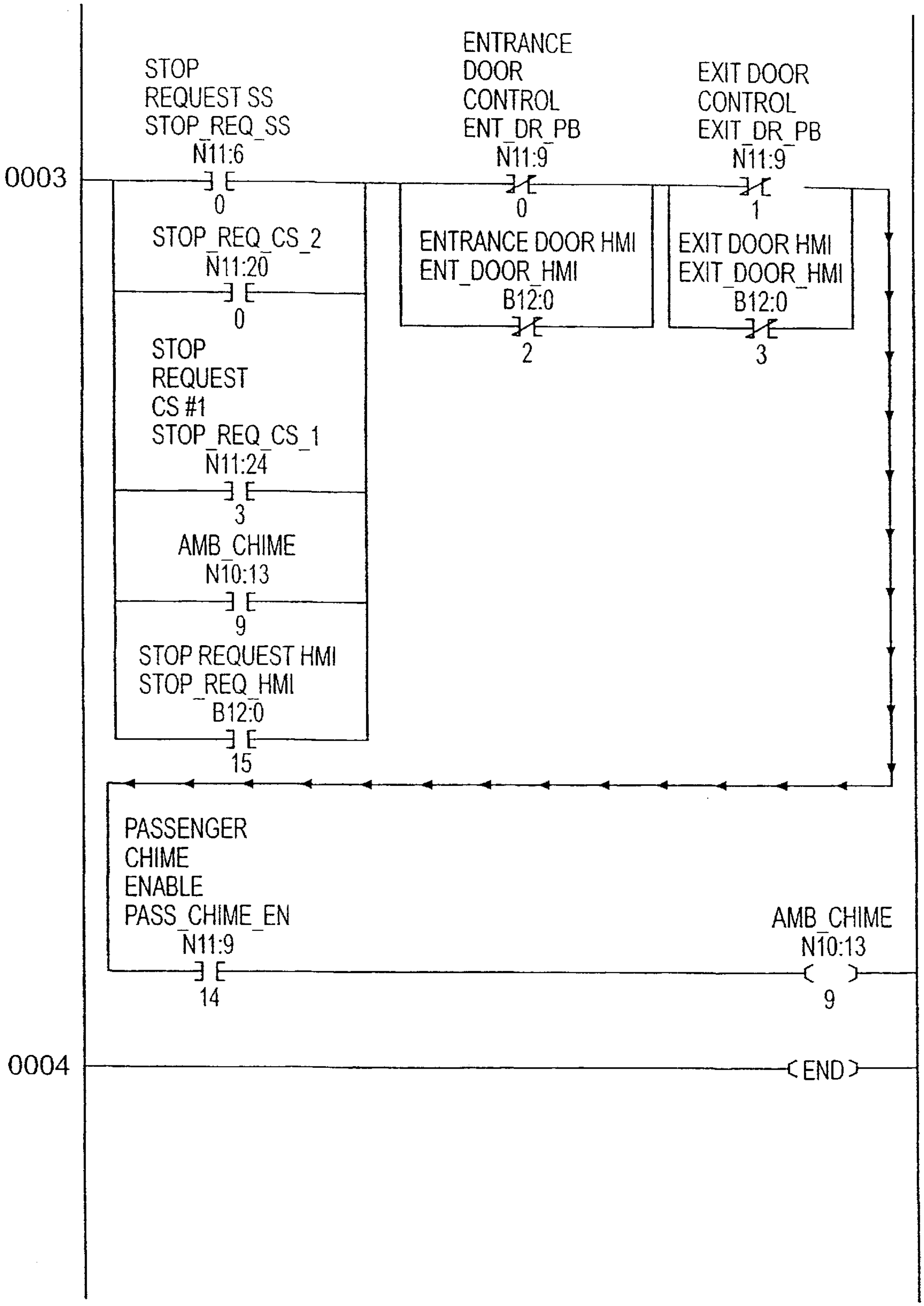
Figure 44A:
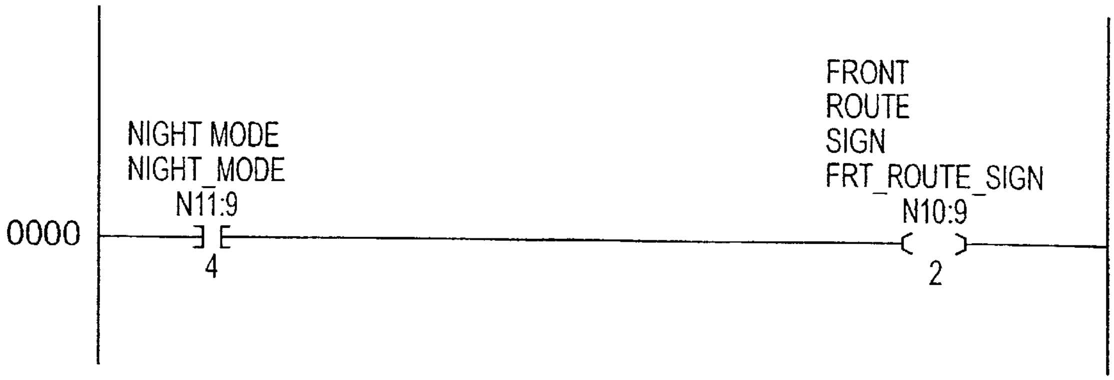
Figure 44B:
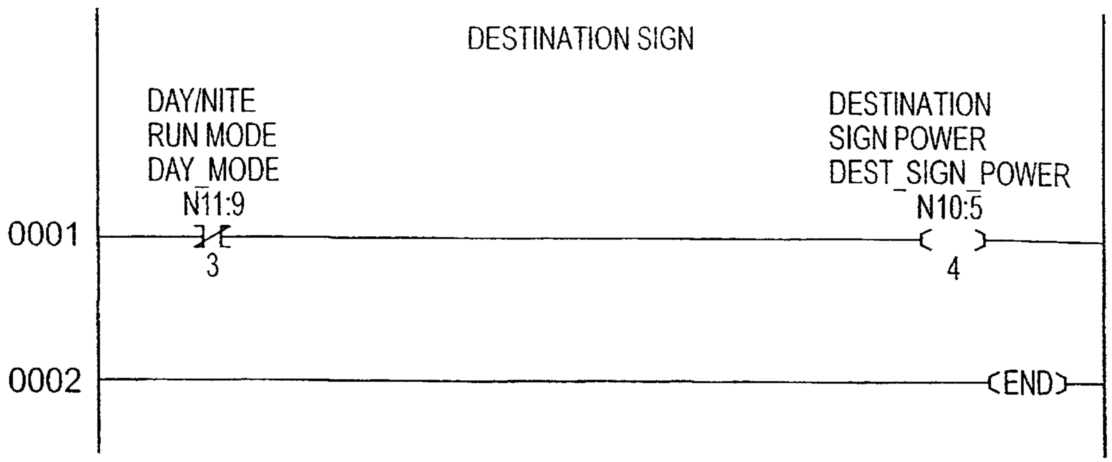
Figure 45:
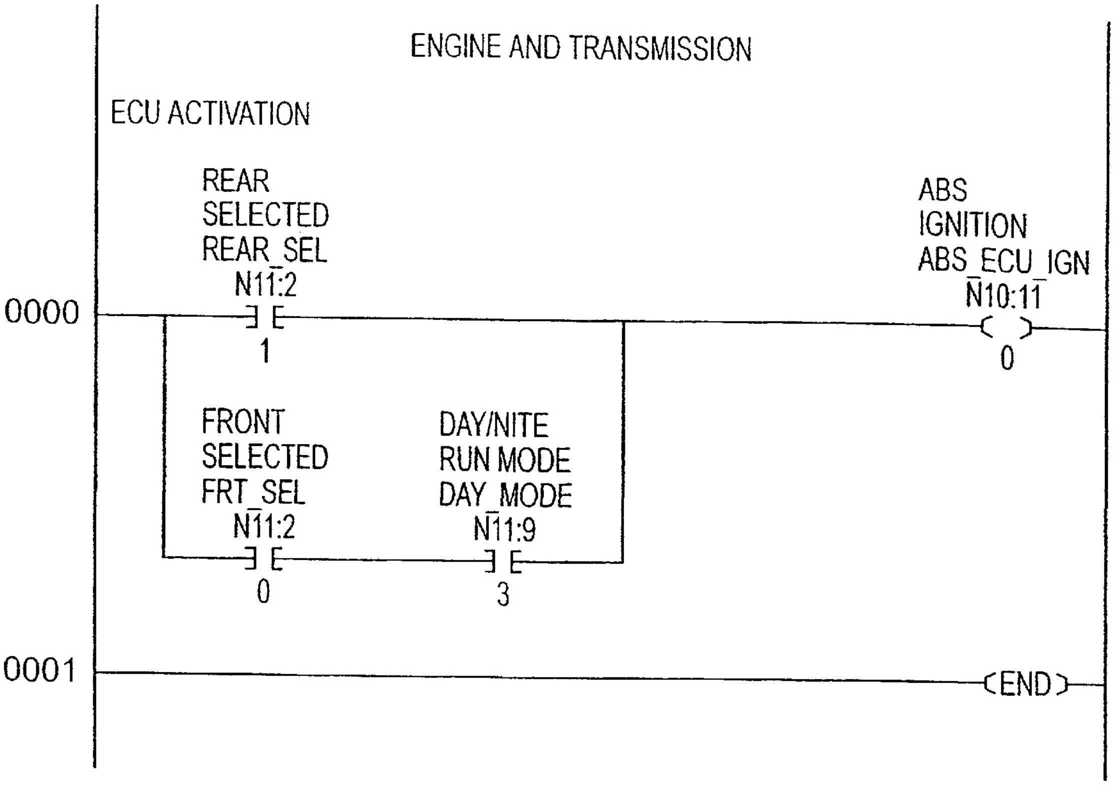
Figure 46A:
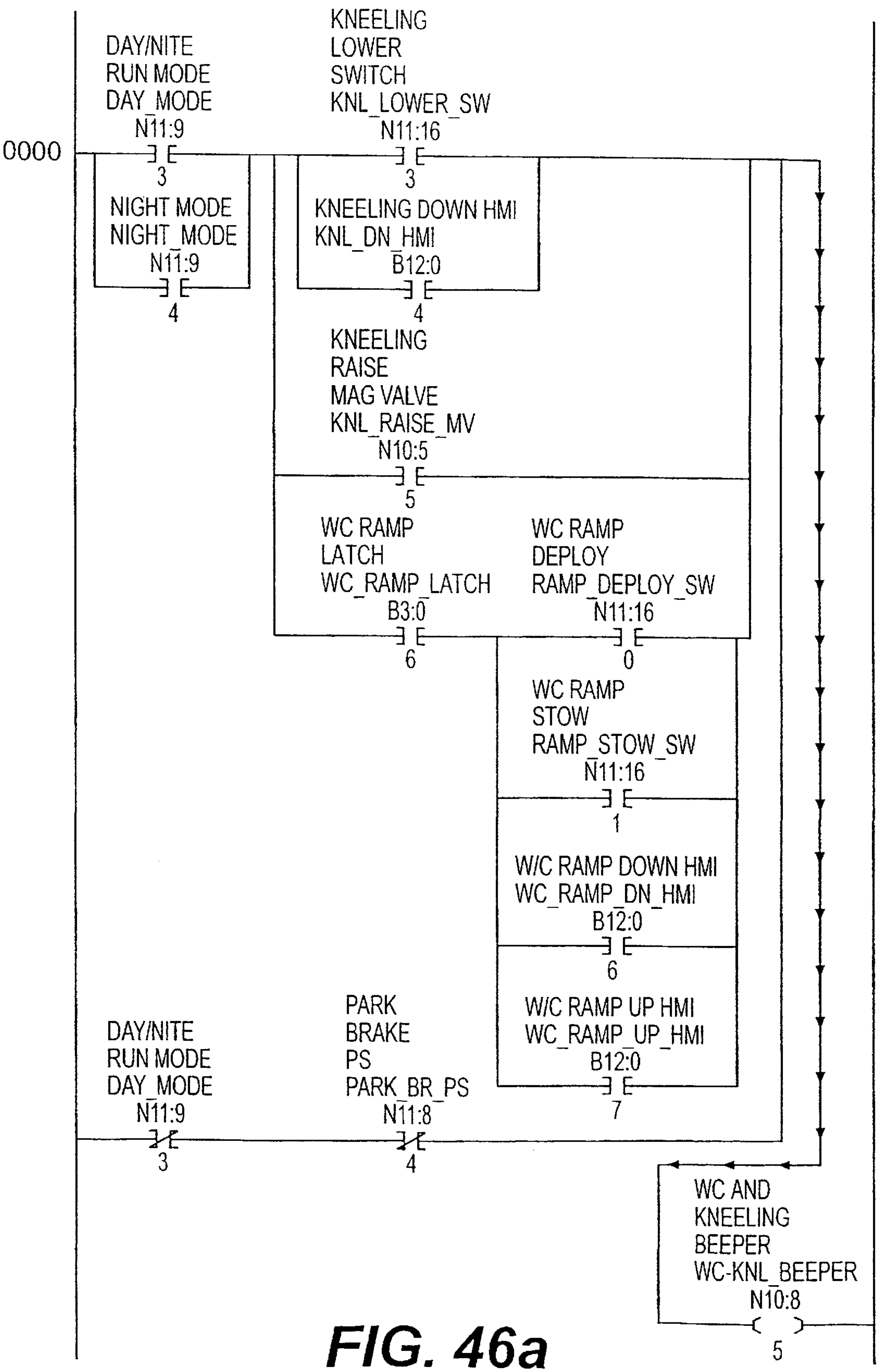
Figure 46B:
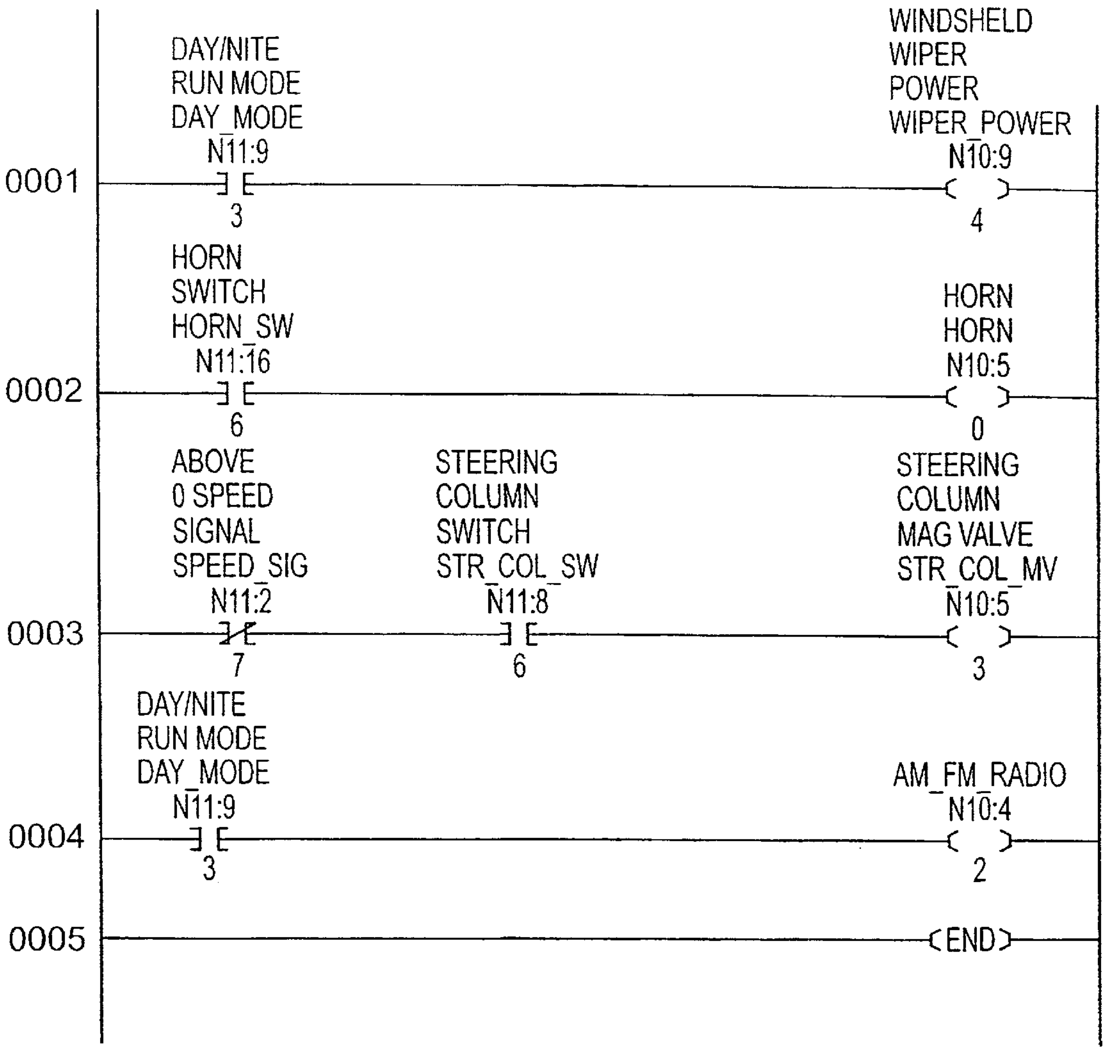
Figure 47A:
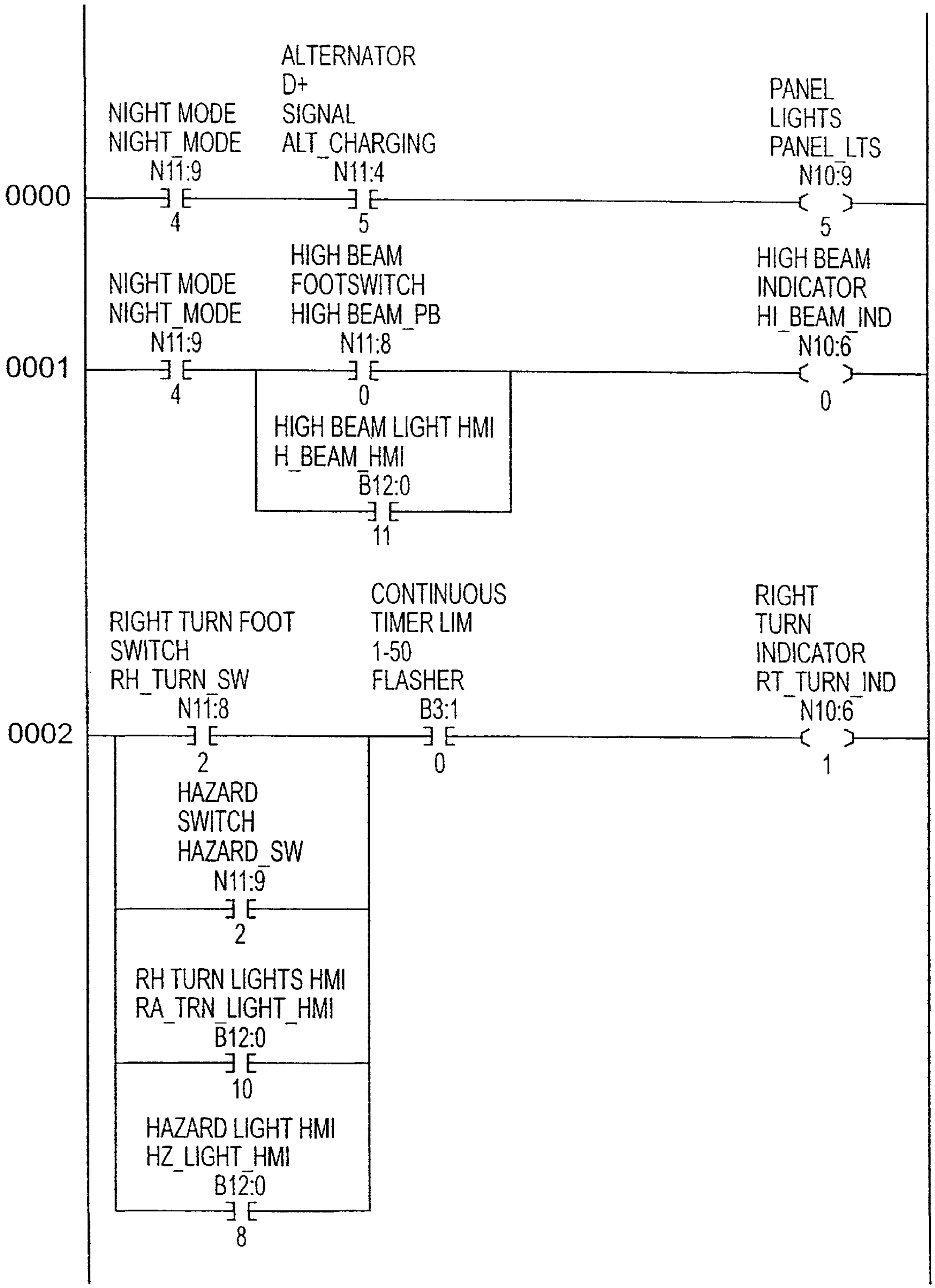
Figure 47B:
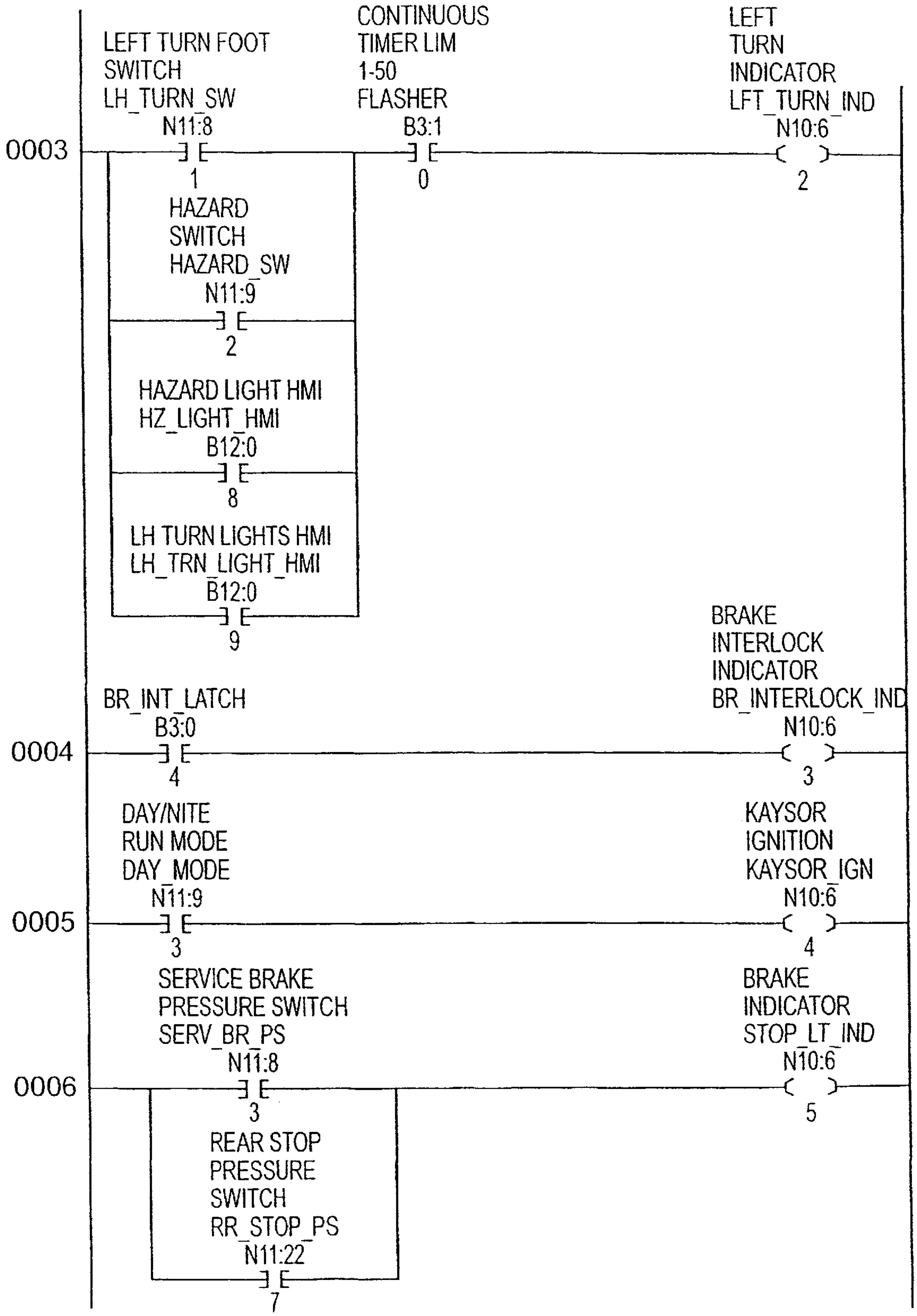
Figure 47C:
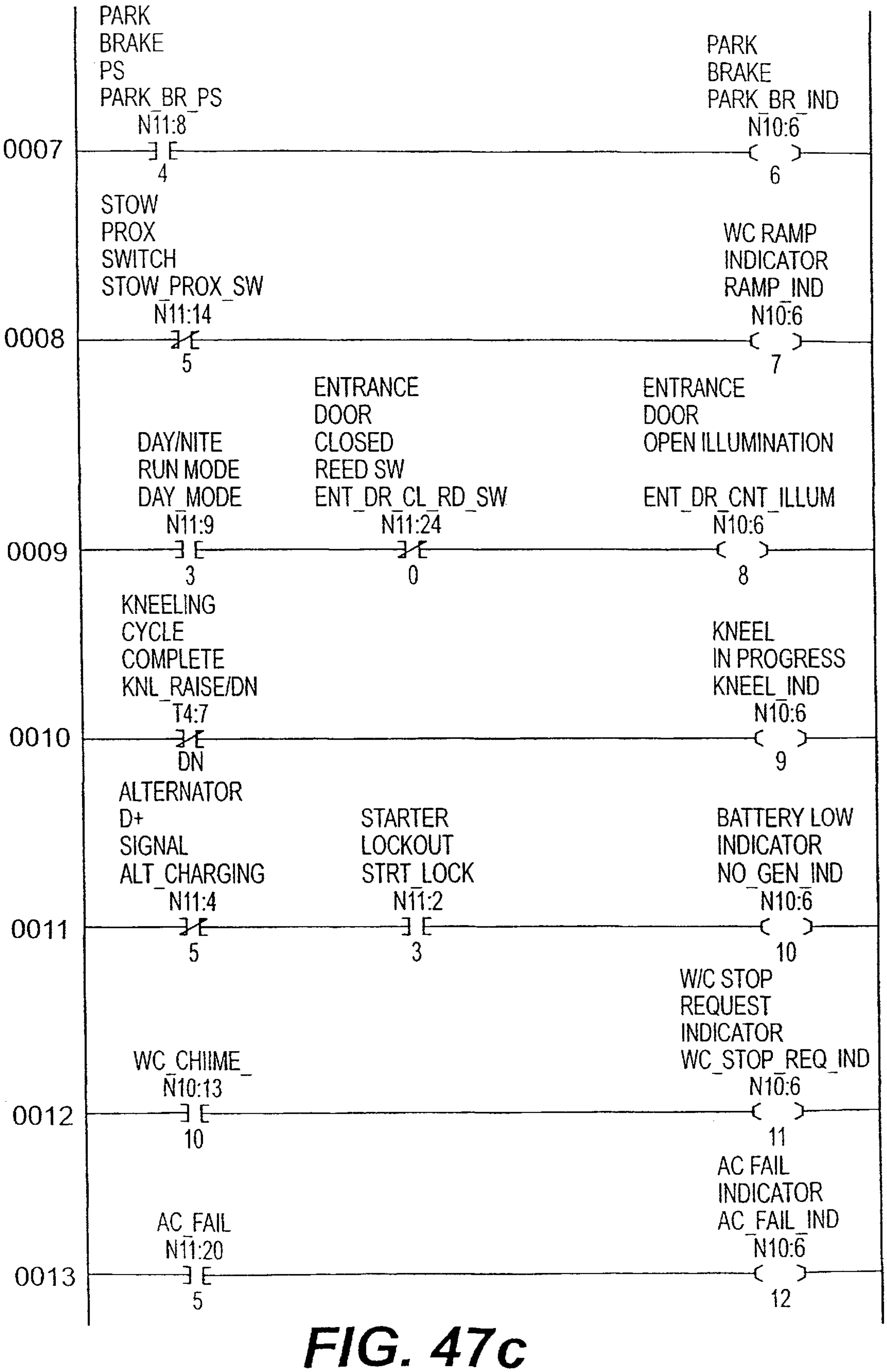
Figure 47D:
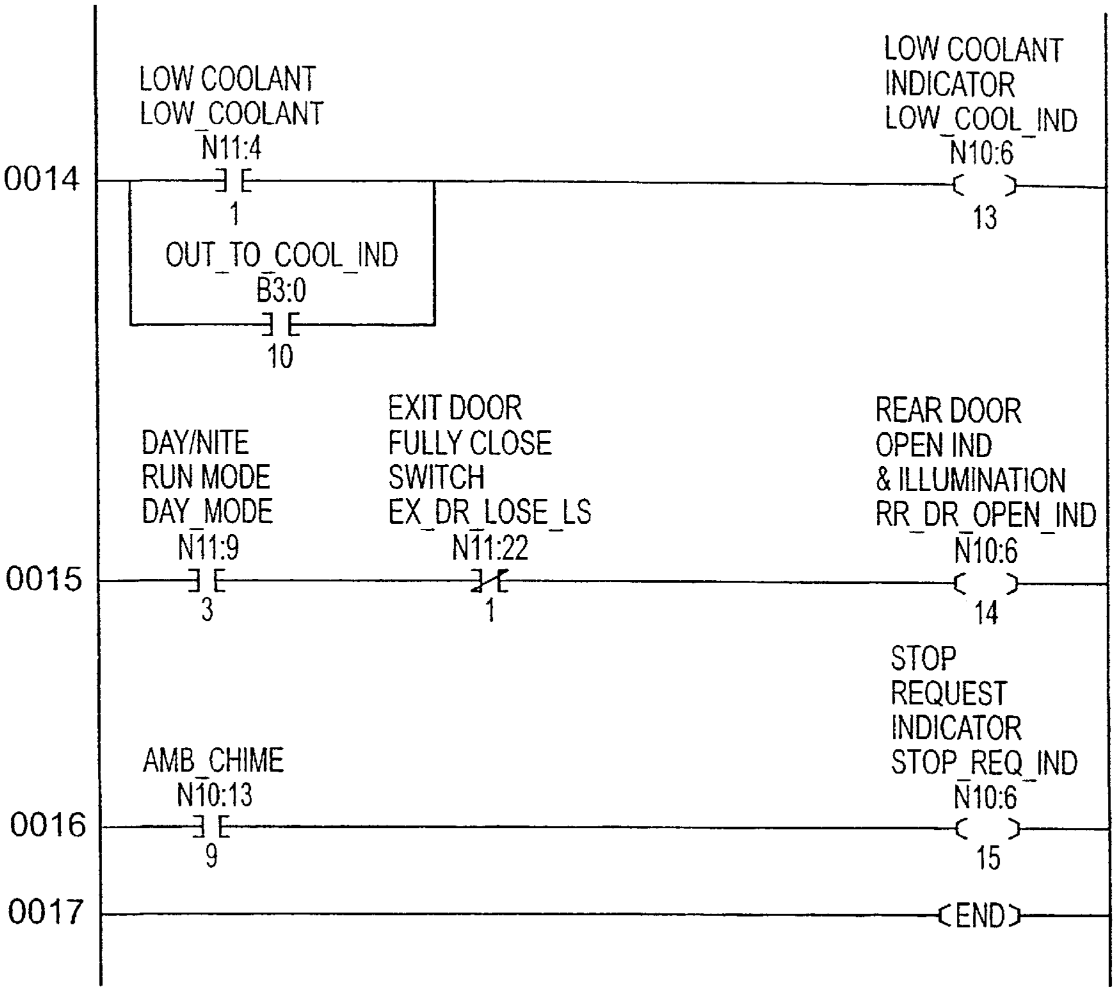
Figure 48:
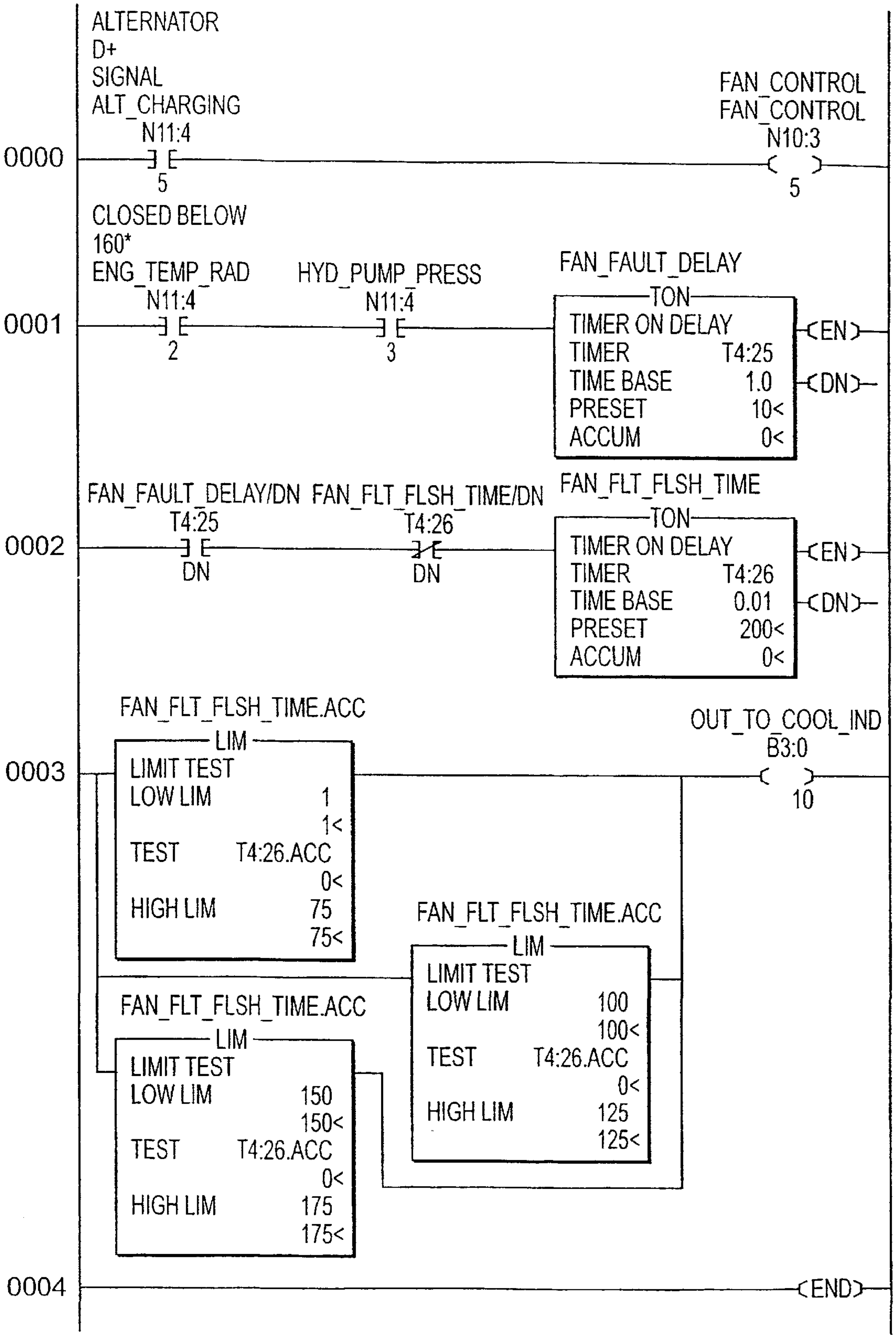

The system 160 may also be used to control operation of one or more buses. A technician or operator at either a local bus operating center, such as the center 176, or at the customer support center 161, may access a bus operating program, such as the bus control program 30 (see FIG. 1). The same technician can access bus operating data on a real-time or near real-time basis. Using the program 30, the technician may order send an engine STOP command to the bus 100 that causes a electrical switch in the engine run control system to open. Referring to FIG. 33*a*, for example, the technician can select a FRONT SELECTED FRT_SEL switch 939 (address N11:2) and, by clicking on with a pointing devices, such as a mouse, cause the switch 939 to open, which causes an ENGINE IGNITION ENG_ECU_IGN interlock 940 to open, stopping the engine of the bus 100. Such an operation might be warranted in an emergency such as a driver who has suffered a heart attack, for example. Access to other portions of the bus programming allows remotely located technicians to start, stop, or otherwise operate other components and systems on the bus 100.

In another embodiment, the system 160 may include multiple local bus operating centers or hubs that collect information from buses and that send control signals to the buses, and which in turn provide the collected information to, and receive control signals from an intermediate station between the hub and the customer support center 161. In yet another embodiment, the customer support center 161 may incorporate an central Internet web site, and each of the local operating bus centers may provide information to the central Internet web site. In still another embodiment, the buses may provide some or all of their collected data directly to the central Internet web site, and may receive control signals directly from the customer control center. Such direct communication with the customer control center may be by wireless means including cellular and PCS (personal communication services) systems.

Figure 6A:
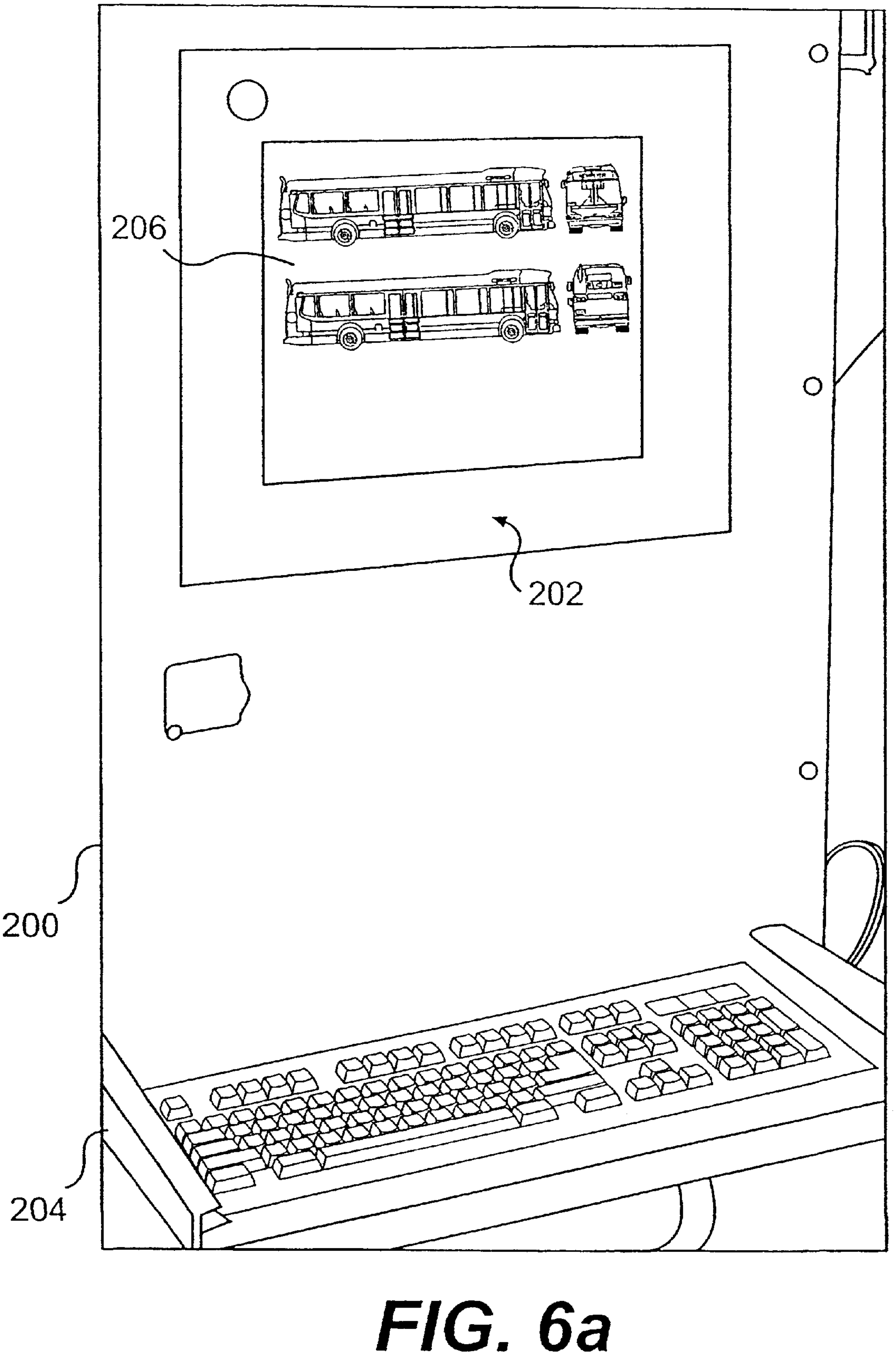
FIGS. 6*a* and 6*b* illustrate examples of interfaces used with the system of FIG. 1.
Figure 6B:
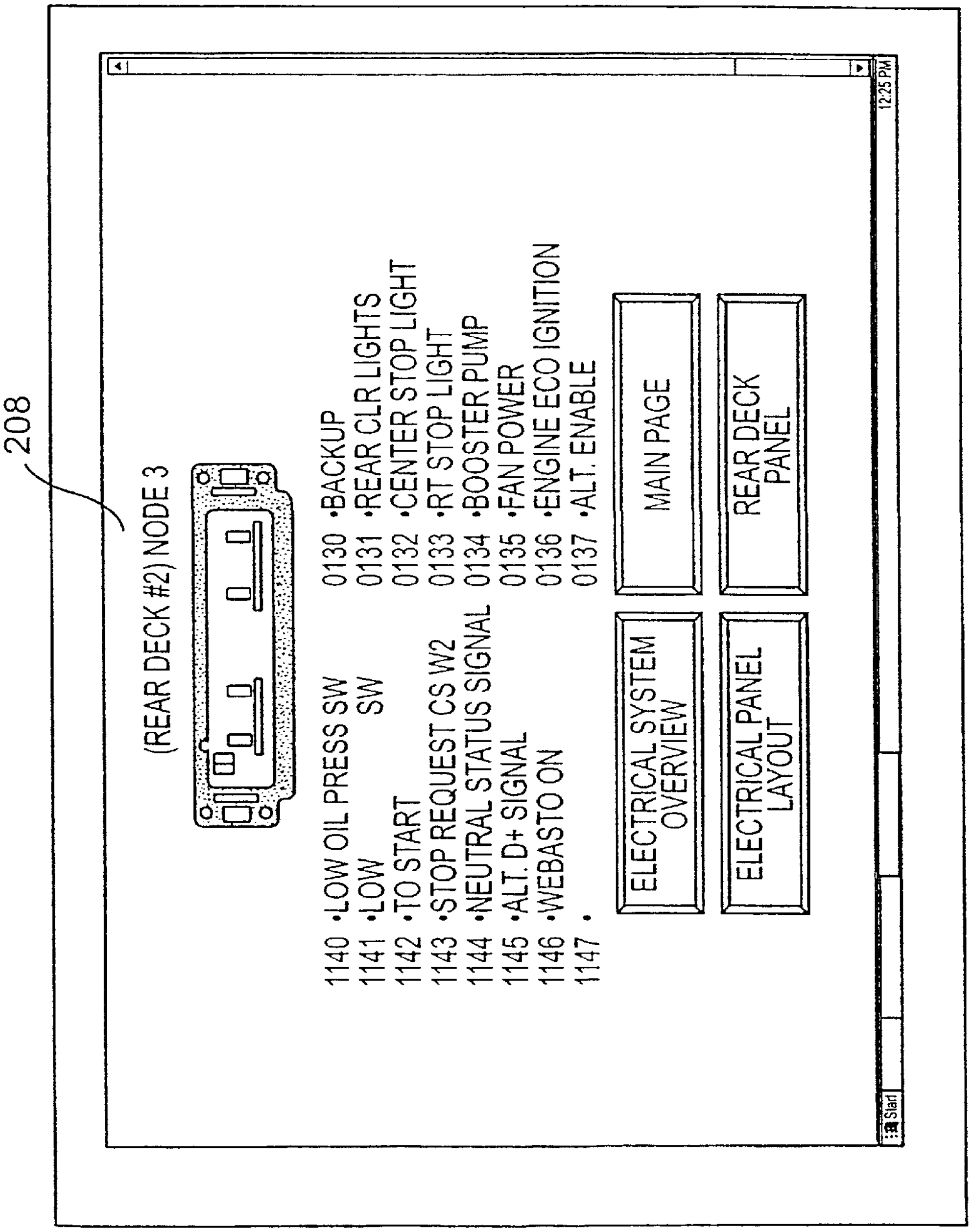

FIGS. 6*a* and 6*b* illustrate examples of the interface 24 (see FIG. 1) that may be used by a local technician to interact with the system 10 of FIG. 1. In FIG. 6*a*, the interface 24 includes a panel 200, which in turn includes a display portion 202 and a user input portion 204. The display portion 202 may be a liquid crystal display, for example. Alternatively, the display portion 202 may be any flat panel display or may be a CRT display. The user input portion 204 is shown as an alpha-numeric keyboard. Alternatively, the user input portion 204 may include a voice recognition module and one or more pointing devices such as a mouse, a touch pad, or a track ball. The display portion 202 and the user input portion 204 may also incorporate a touch sensitive screen. In FIG. 6*a*, the display portion 202 is shown with a graphical user interface (GUI) (or human to machine interface (HMI)) 206. The HMI 206 shows various views of a bus, such as the bus 100, and data related to the bus. The HMI 206 also incorporates interactive features and links to other data related to the bus.

FIG. 6*b* illustrates an HMI 208 displayed on the display portion 202. The HMI 208 shows database addresses, status, and descriptions of specific components of a sub-system of a bus.

The interface 24 shown in FIGS. 6*a* and 6*b* may be hardwired into the system 10, and the associated hardware devices, including the display portion 202 may be contained in a semi-permanent fashion in a housing that is built into the bus 100. Alternatively, the interface 24 may include a portable interfaces, such as a lap top computer, a personal data assistant (PDA), or a similar device. In this alternative embodiment, the interface 24 may communicate with the computer 12 by wired or wireless means. For example, the interface 24 may include a PDA that receives and transmits data between the computer 12 and the interface 24 using radio frequency signaling. When the interface 24 is portable, such interface may be installed in the bus 100, or may be brought to the bus 100 when on-site checks of the system 10 are desired.

Figure 7:
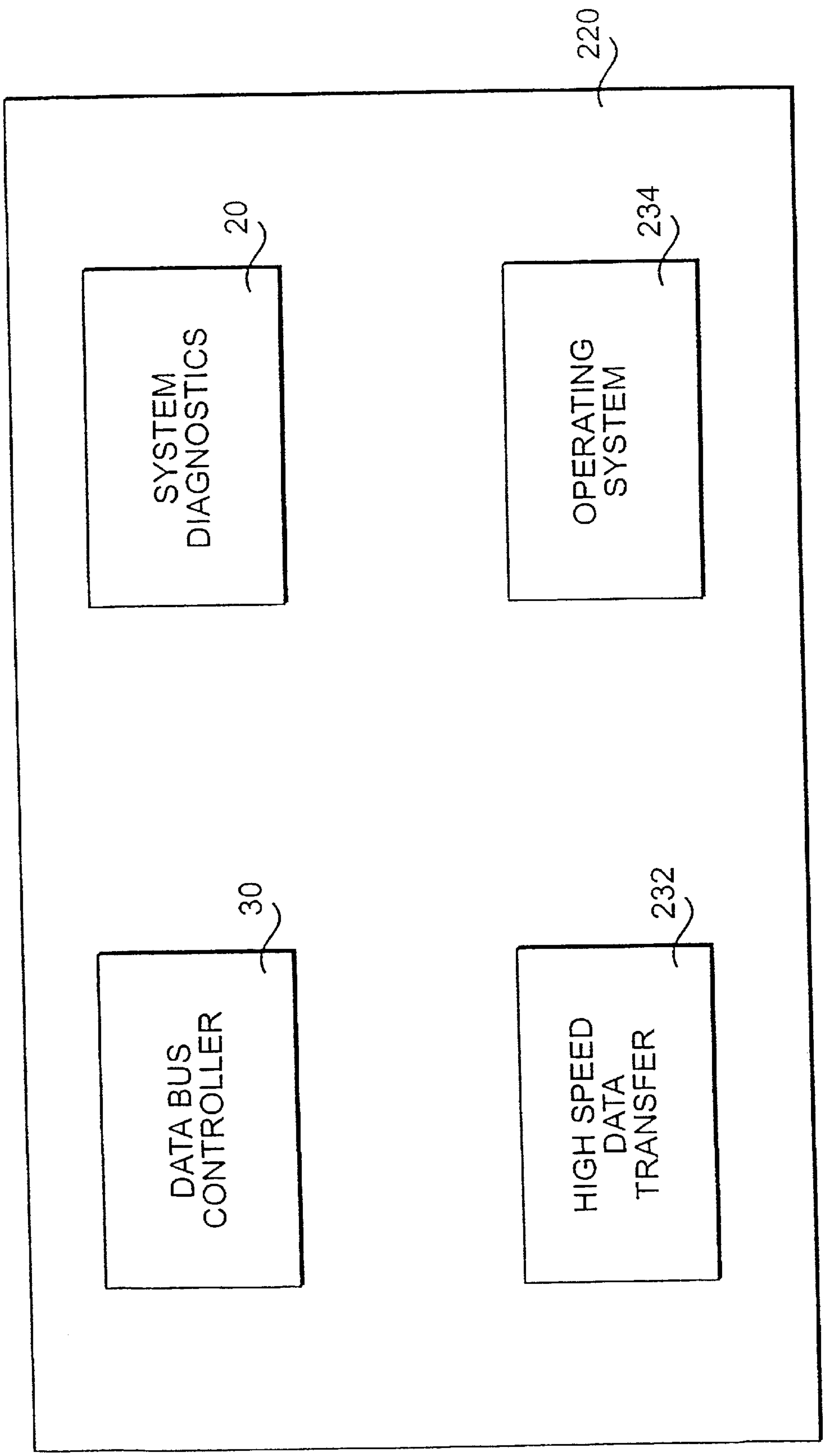
FIG. 7 s a block diagram of a software system operating on the system of FIG. 1.

FIG. 7 is a block diagram of a control software system 220 used to operate and diagnose the system 10 of FIG. 1. The software system 220 may be loaded on the computer 10, and periodically may be updated, either by on-site loading of revised software, or by transmission of programming changes using, for example, the communications networks 140 and 152 of FIG. 4. The software system 220 may include the diagnostics module 20 control module 30 shown in FIG. 1. The systems diagnostic module 20 may include separate diagnostics packages for the bus engine, transmission, anti-lock brake system (ABS), and electrical system. The system diagnostics module 20 may also include access to historical data stored in the database 22. The controller module 30 may include the software engine that executes the bus operating system. The operating system may include ladder programs that are described in more detail with reference to FIGS. 31*a*–48.

The data transfer module 232 includes the programming necessary to communicate data at high data rates between the computer 12 and the interface 24 or the remote location 110 (see FIGS. 1 and 3). The programming may include TCP/IP protocols and ethernet protocols, for example. The operating system module 234 includes the computer operating program. The computer operating program may be based on Windows NT, for example.

Figure 8:
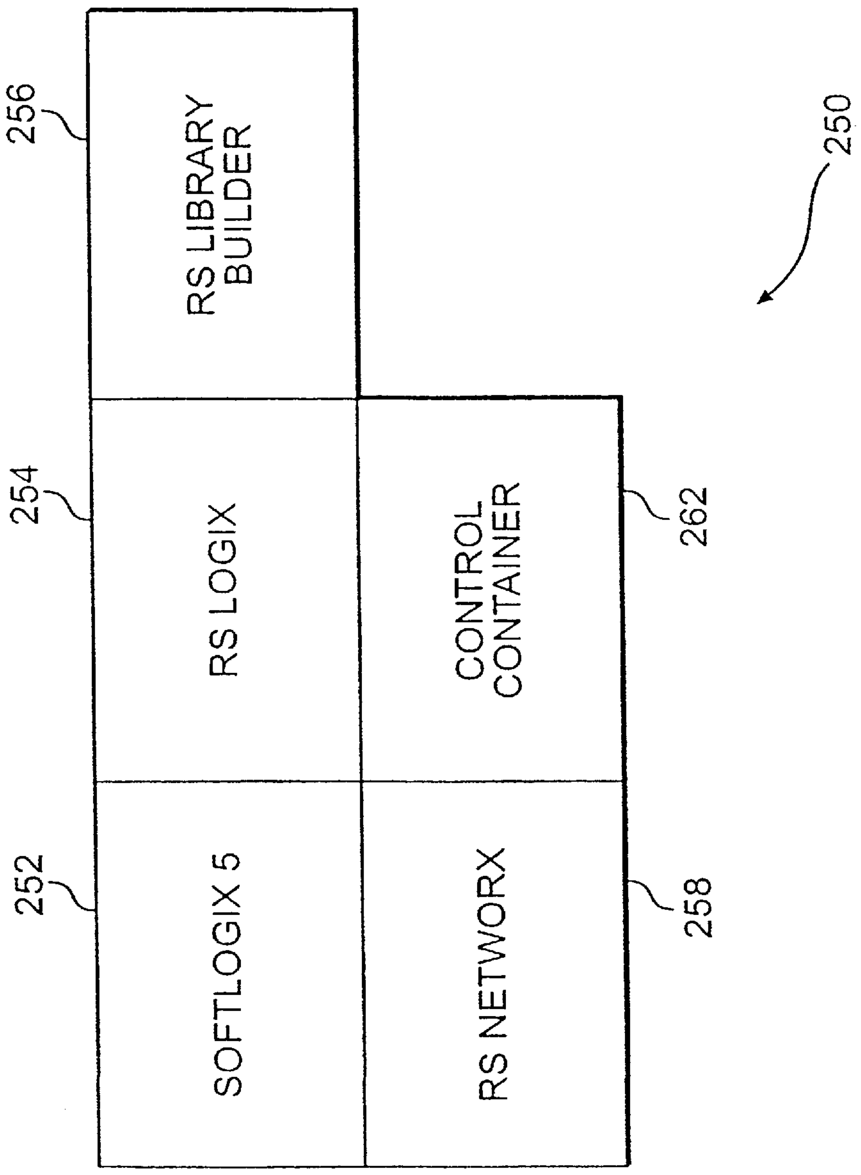
FIG. 8 is a block diagram of programming modules used to construct interfaces and programming for use with the system of FIG. 1.

FIG. 8 is a block diagram of a software system 250 that may be used to create the HMIs. The HMIs allow an on-site technician (i.e., a technician on the bus 100, for example), and a technician at a remote location, such as the central service center 156 of FIG. 4, to monitor and trouble shoot the bus 100 electrical, pneumatic, and mechanical systems. The software system 250 may also be used to create one or more ladder programs that are used for control and diagnostics of the bus.

Figure 9:
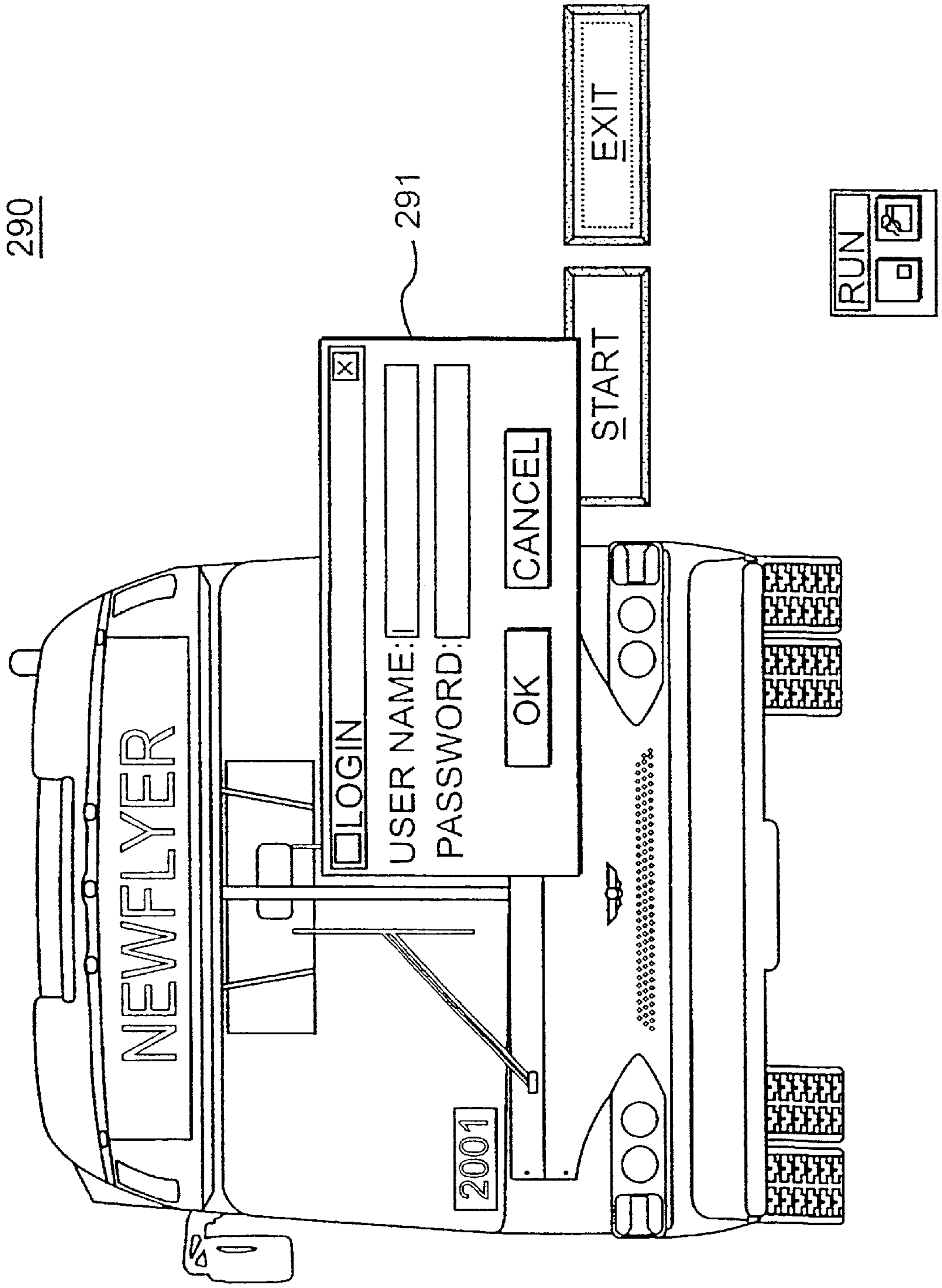
FIGS. 9–30 illustrate graphical human to machine interfaces that may be used with the system of FIG. 1.
Figure 10:
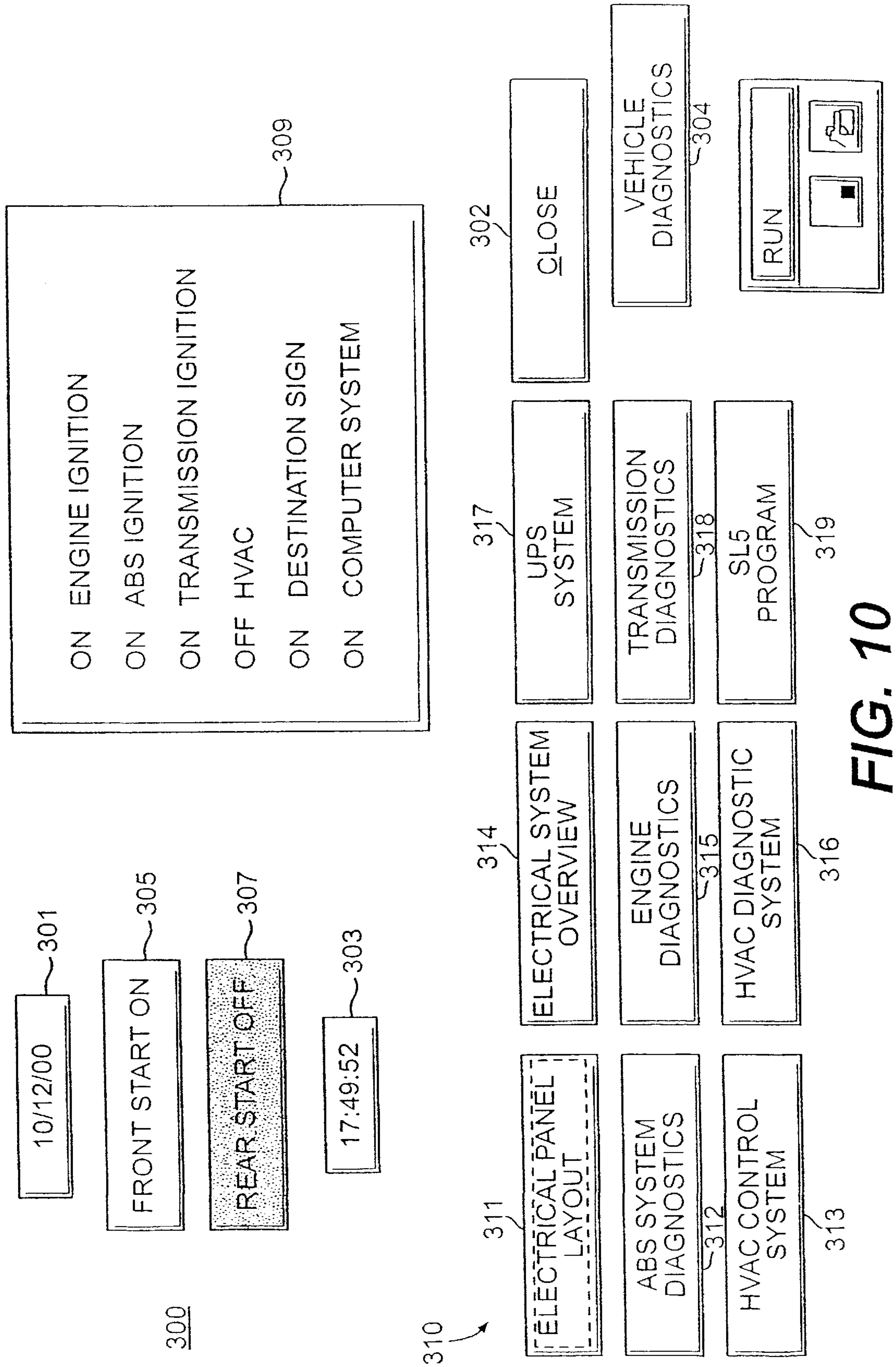

FIGS. 9–29 illustrate HMIs created using the programming of FIG. 8. In FIG. 9, an introductory page 290 is shown. The introductory page 290 includes a login page 291, which may include a user name entry block and a password block that are used to control access to further pages or HMIs. Upon successful login, a main page 300, illustrated in FIG. 10, is displayed. The main page 300 includes a date block 301 and a time block 303. A status section 309 allows the technician to quickly determine the status of the bus primary systems, such as the engine, transmission, brake (ABS), heating ventilation and air conditioning (HVAC), destination and computer control (CC) systems. As shown in FIG. 10, each of the bus primary systems has an associated ON or OFF light to indicate the system status. That is, depending on satisfying specific criteria in the ladder programming system, each primary system will have either an ON light or an OFF light lit. The ON light may indicate that all components in a primary system are operating correctly or are otherwise in condition to allow operation of the system. Conversely, the OFF light may indicate a problem with a component, or simply that the system or component is off or otherwise not in operation.

Also shown in FIG. 10 are front and rear start indicators. Specifically, the front start system includes a front start ON indication 305. The rear start system includes a rear start ON indication 307. When a front start is enabled, the front start ON indicator 303 may be activated and the rear start ON indicator may be deactivated. Finally, the main page 300 includes buttons, or links 310 to other pages and diagnostic software packages, and a close button 302 that is used to close operations accessible from the main page 300.

Figure 11:
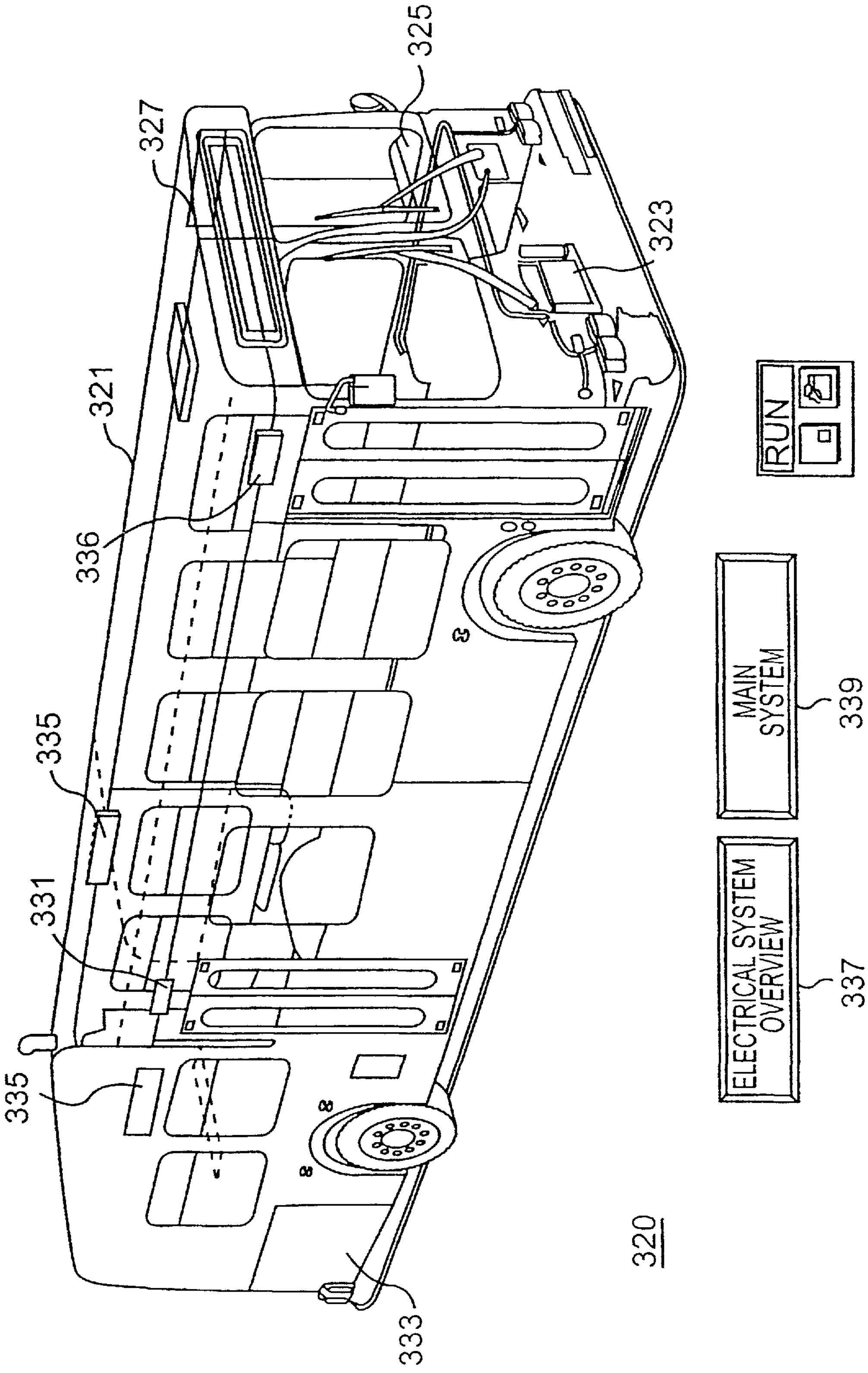

FIG. 11 illustrates an electrical panel page 320. The page 320 includes a view of the bus 100. The page 320 gives the technician an interactive view 321 of the bus electrical panels. From the page 320, the technician is able to view the bus doors open and close, the exterior lights flashing, wheel chair ramps operating, headlights operating and the destination sign working. The page 320 may also be used to verify operation of bus sub-systems including the destination sign, bus operating mode, state of interlocks and passenger (stop request) subsystems. The page 320 includes interactive features such as displays of various modules, that, when selected, link the technician to more information related to the modules. As shown, the view 321 includes a rear deck module 333, side modules 335, exit door module 331, entrance door module 336, side console module 325, front panel module 323 and driver's area panel module 327. The operation of these modules will be explained later in detail. Each of the panels or modules shown in FIG. 11 may be used to link to a page that displays more information about the panel or module. The technician may activate the link by selecting a desired panel or module using, for example, a mouse, and then activating the link by clicking on the mouse. The page 320 also includes a link 337 to an electrical system page and a link 339 to the main page 300. Other links, pull-down menus, and interactive and color graphics display elements may be included on the page 320.

Figure 12:
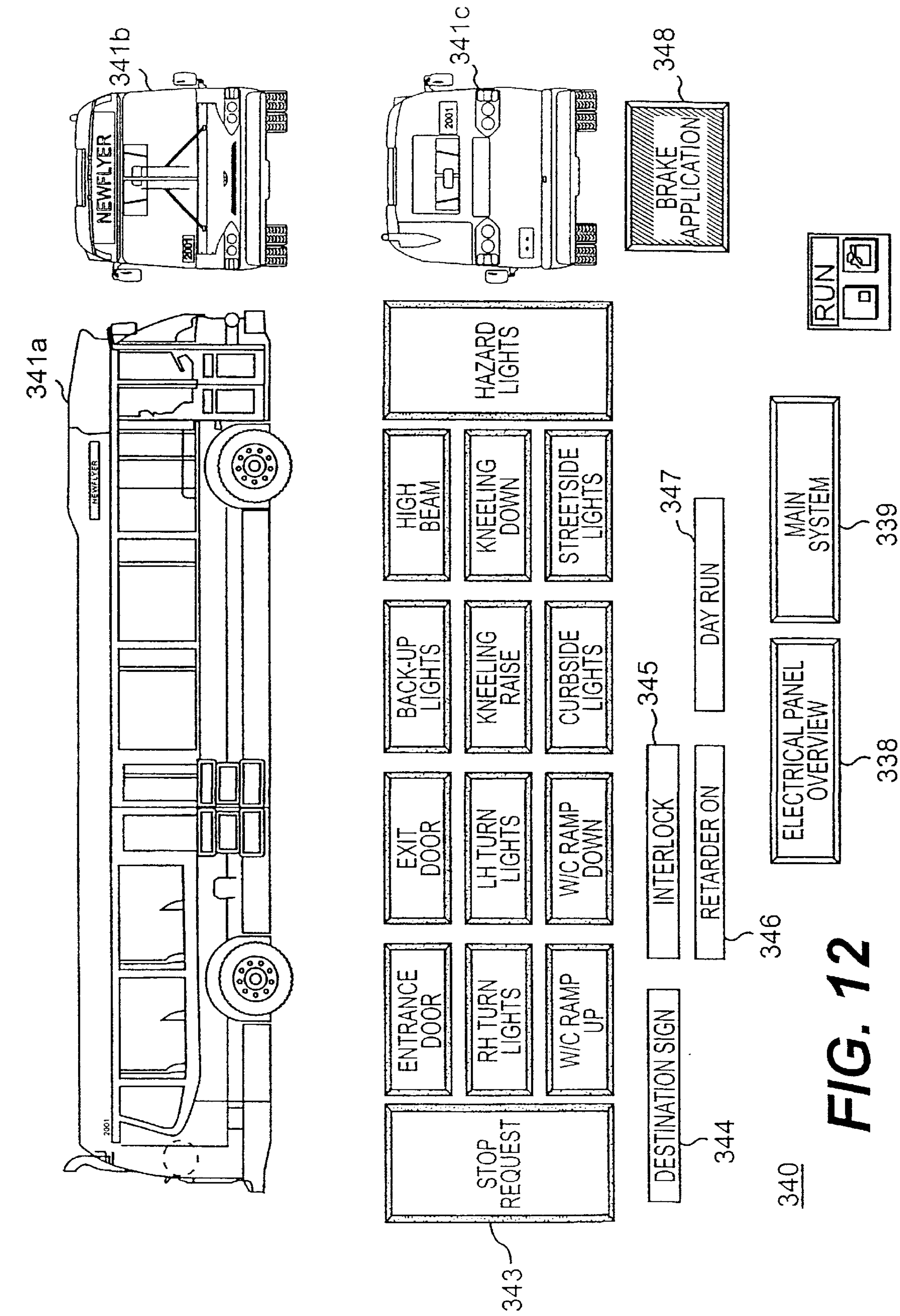

FIG. 12 illustrates a vehicle diagnostic page 340. The page 340 includes representations 341*a–c* of the bus 100. The representations 341*a–c* may include interactive features that show various changes in the bus 100 during operation or diagnostic testing. For example, the representation 341 a may show the entrance door as open when the actual entrance door is opened on the bus 100, either during operation of the bus 100, or during diagnostic testing of the bus 100. Similarly, the representation 341*c* may show the left turn signal blinking when the left turn signal is activated on the bus 100.

The page 340 also includes a diagnostics section 343. The diagnostics section includes buttons that may be used to access various diagnostic pages to test bus features. For example, a stop request button may be used to access a diagnostics test page to test the passenger stop request feature. An example of a diagnostics test page will be described in detail later. Other diagnostic pages accessible from the page 340 include entrance door, exit door, back-up lights, high beam, RH turn lights, LH turn lights, kneeling raise, kneeling down, W/C ramp up, W/C ramp down, curbside lights, streetside lights, and hazard lights. The page 340 also includes a destination sign window 344, and interlock window 345, a retarder on window 346, a day run window 347, and a brake application window 348. The windows may be interactive and may be used to link to other pages related to the specified features. Alternatively, the windows may only provide an indication that the associated feature is activated. For example, the brake application window may be highlighted when the bus brake pedal is pushed. Finally, the page 340 also includes a link 338 to the electrical system overview page 320 and a link 339 to the main page 300.

Figure 13:
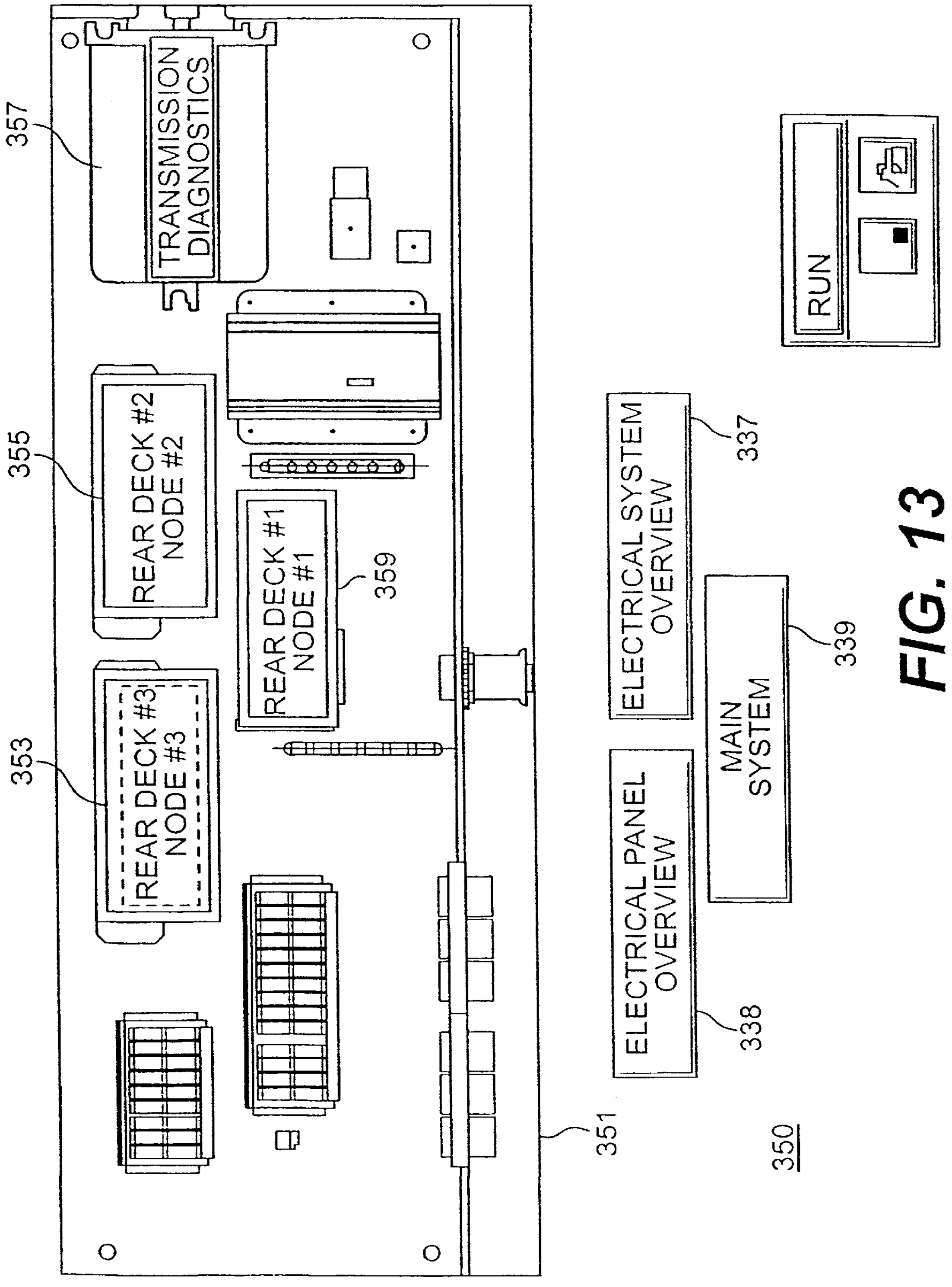

FIG. 13 illustrates a rear deck panel page 350. Similar pages are available for other panels and modules. The page 350 includes a graphical representation 351 of the rear deck panel and graphical representations 353, 355, 357 and 359 of components of the rear deck panel. The page 350 also includes links 337, 338 and 339 to other pages. Using the page 350, the technician may access individual nodes or diagnostic software. For example, the technician may link to pages for rear deck #3 node 3 (353), rear deck #2 node 2 (355), rear deck #1 node #1 (359), and transmission diagnostics 357.

Figure 14:
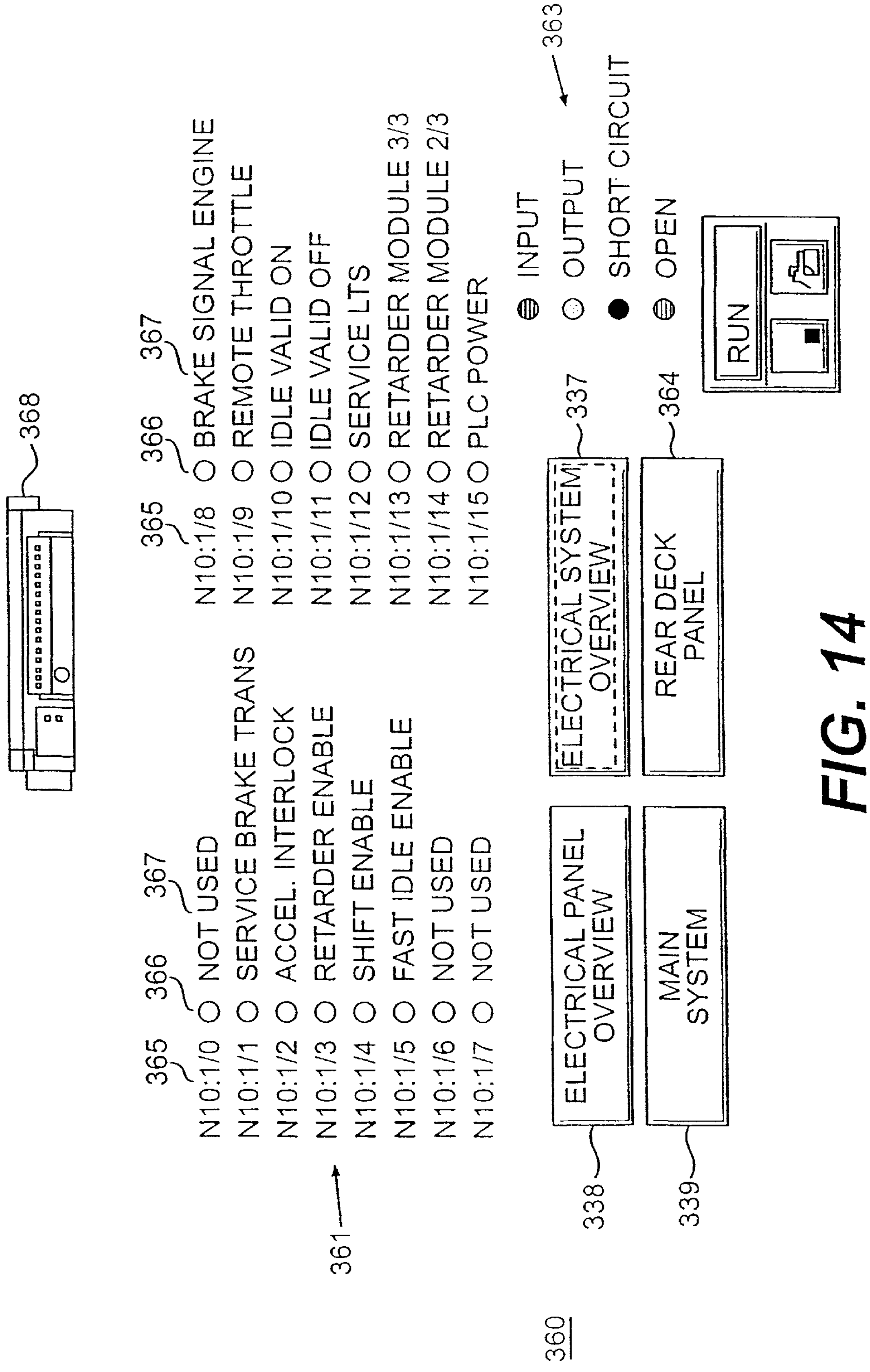

FIG. 14 illustrates a node page 360 for the rear deck #1, node #1. The page 360 includes a feature section 361 that displays, in column format, various bus components that are coupled to rear deck #1, node #1. An address column 365 includes addresses that correspond to physical locations of components of the bus 100. An indicator column 366 includes one of four possible indications. The indications are an input, an output, a short circuit, and an open circuit, as shown in legend 363. The indicator output shows that a particular component provides an output to the system 10. The input indicator shows that the component receives an input from the system 10. A component may both provide an output and receive an input.

The short circuit and open circuit indicators may light when a component is subject to a malfunction. A sensing circuit, operating in parallel with the monitored component, may be used to provide the short or open condition.

The indicators may also include graphical representations of lights that change color to indicate a status of a particular function. For example, an indicator for the function "Low Oil Press. Sw." may change color to indicate that oil pressure is above the minimum specified, or that a low oil pressure interlock is closed to allow the bus engine to operate. In another example, a green indicator light for an Engine Ignition function may indicate that the engine ignition system electronic control unit is receiving power. The function column 367 includes a name of the function monitored. Some functions in the function column 367 may include an active link to an object in the database 22 (see FIG. 1). The linked object may be displayed by selecting and activating the link. For example, a function Low Oil Press. Sw. may include a link to a virtual oil pressure gage that is stored as an object in the database 22. Displaying the virtual oil pressure gage allows the technician to monitor in real-time, or in a replay mode, actual oil pressure, even if the bus 100 does not include an actual (physical) oil pressure gage. The use of the links will be described in more detail later.

Finally, the page 360 includes links to other pages. These links include the electrical panel overview link 338, the electrical systems overview link 337, the main system link 339 and a rear deck panel link 364. Also included on the page 360 is a graphical representation 368 of the node #1.

Figure 15:
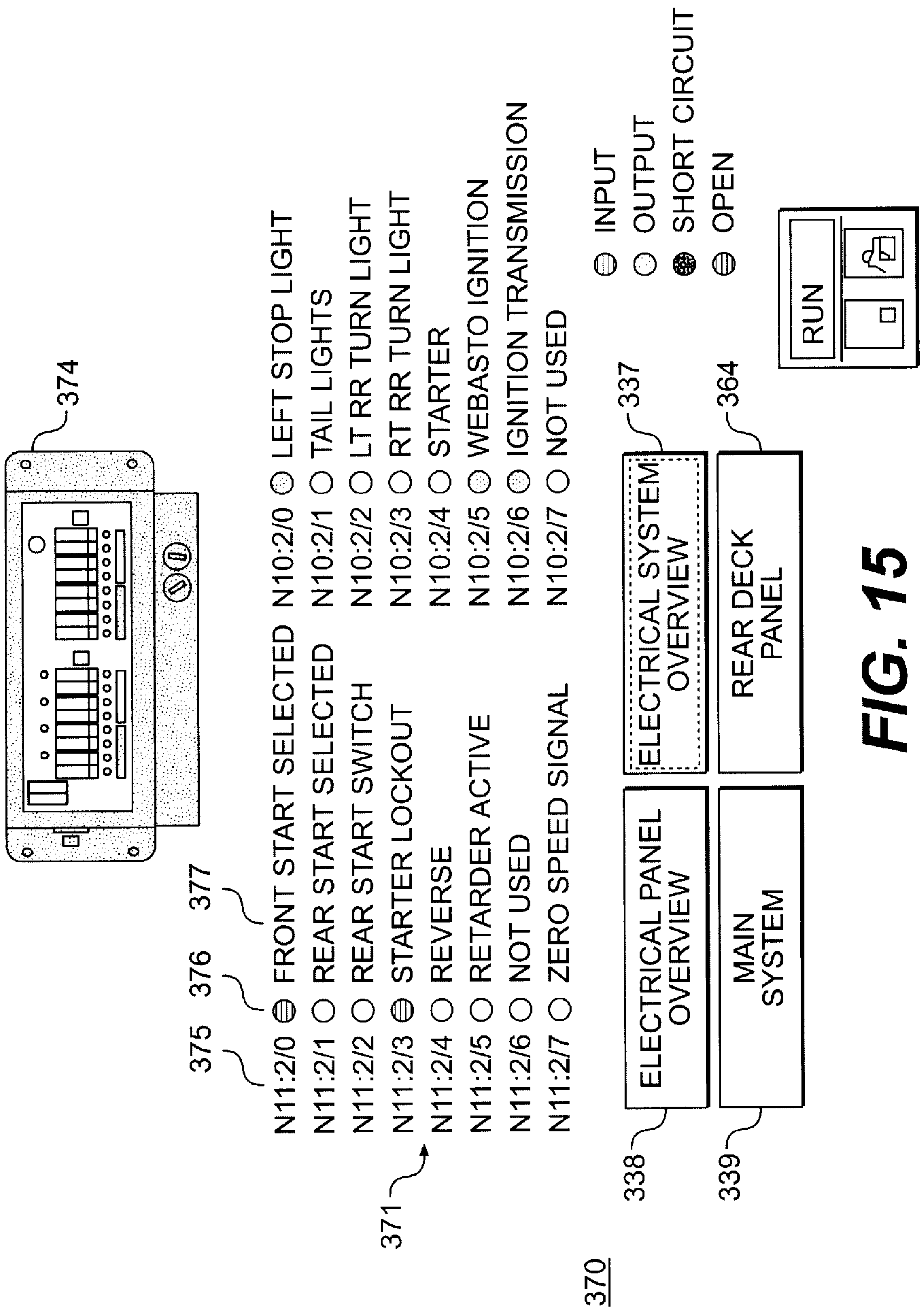
Figure 16:
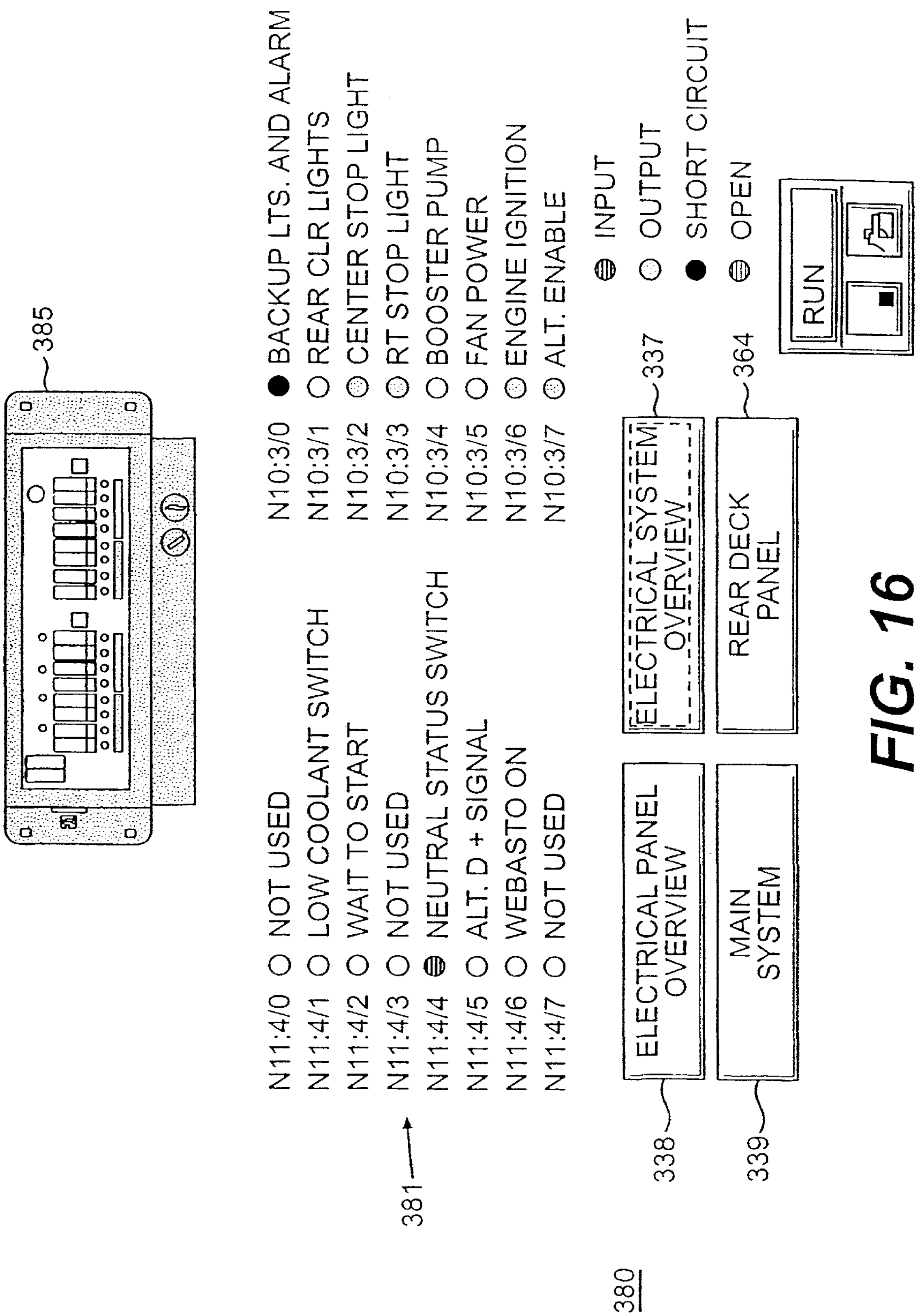
Figure 17:
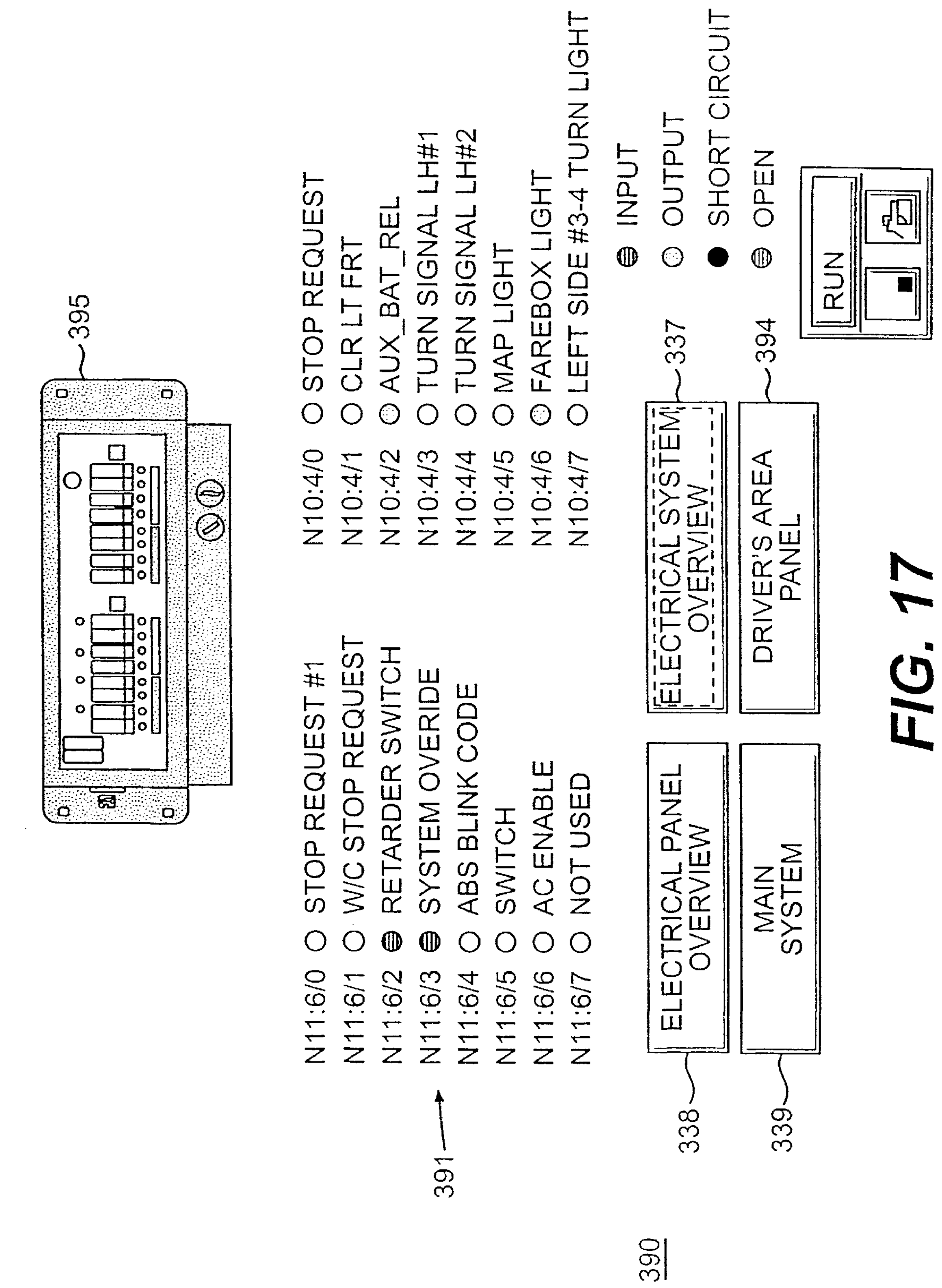
Figure 18:
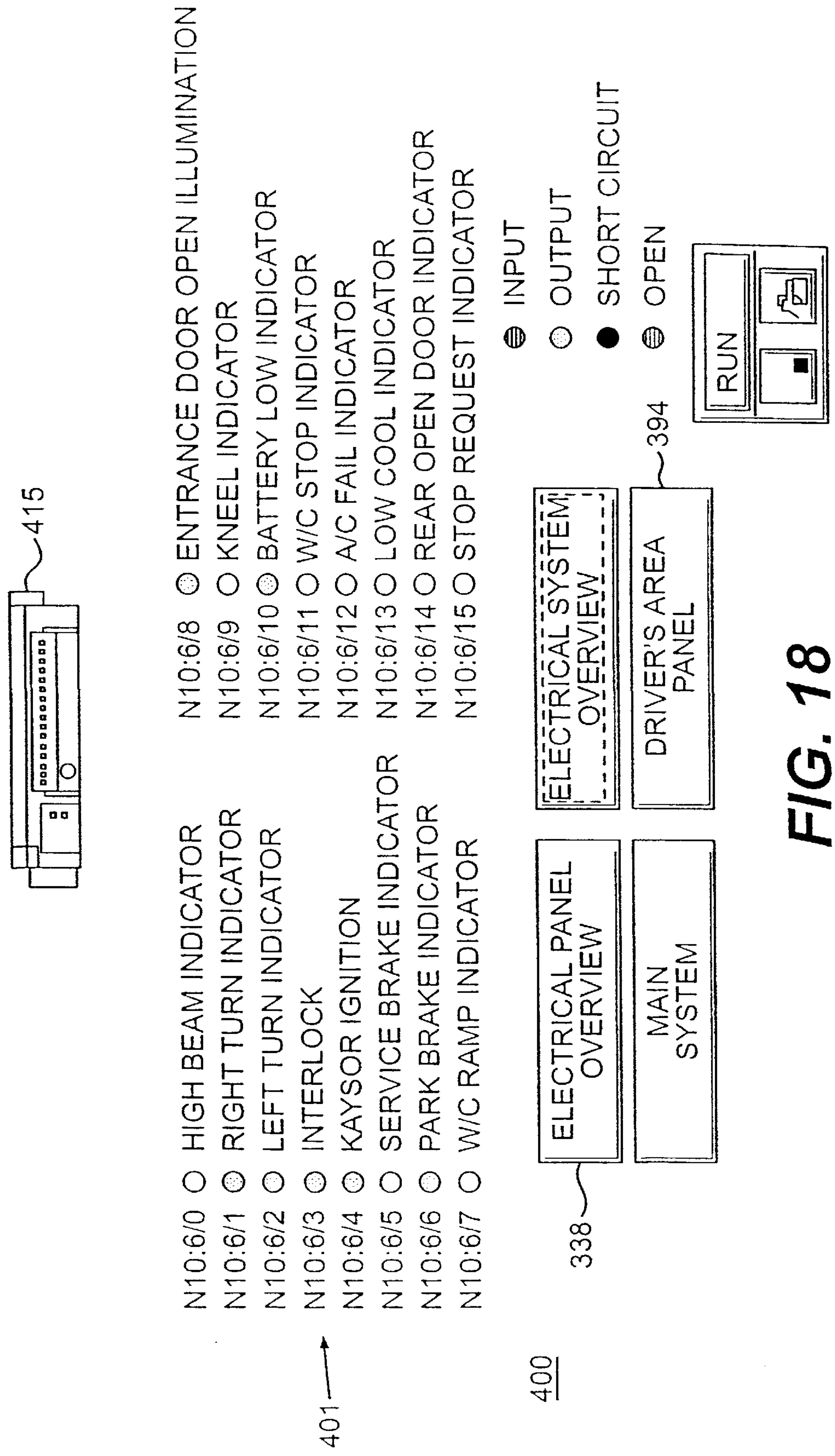
Figure 19:
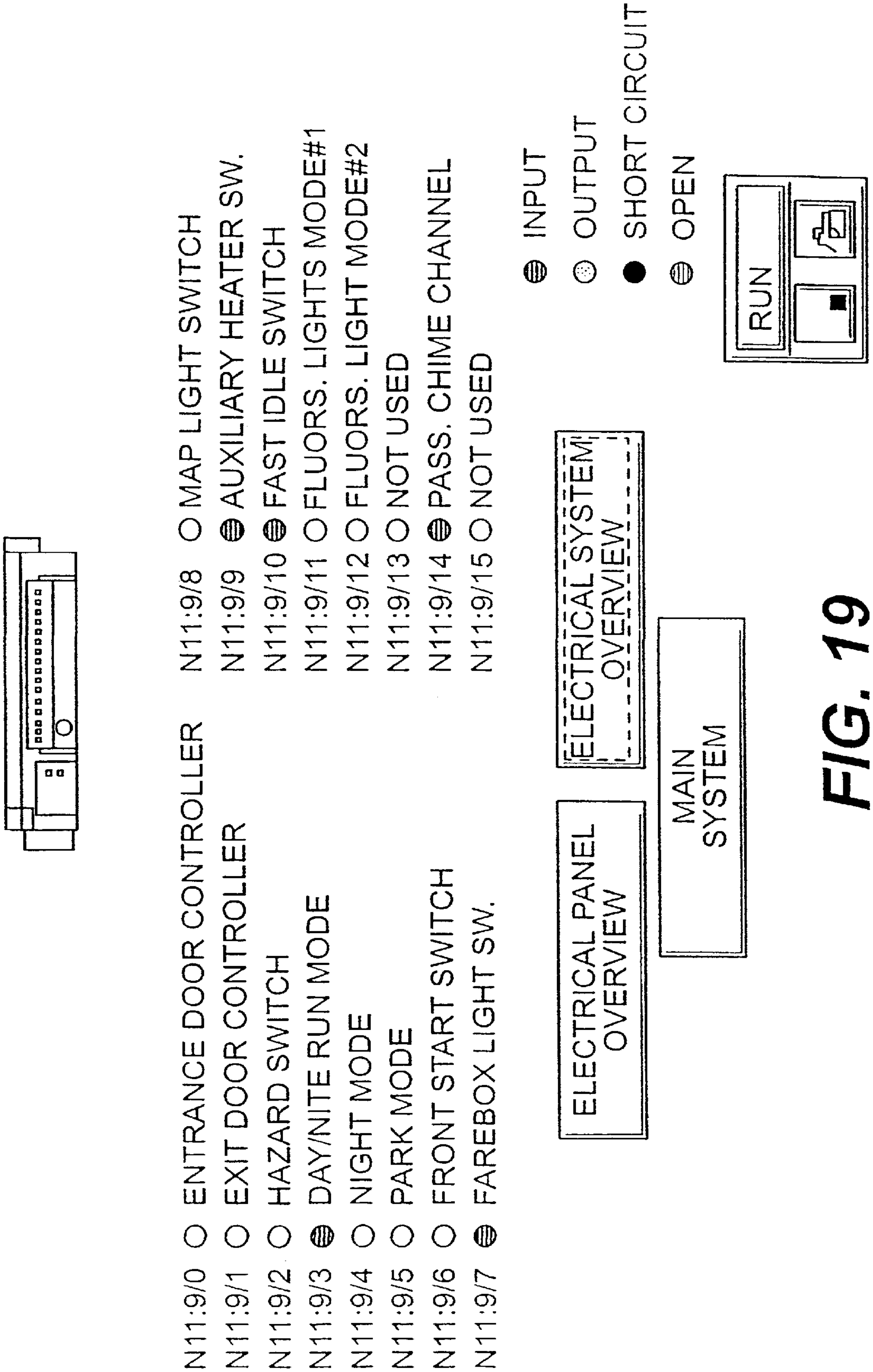
Figure 20:
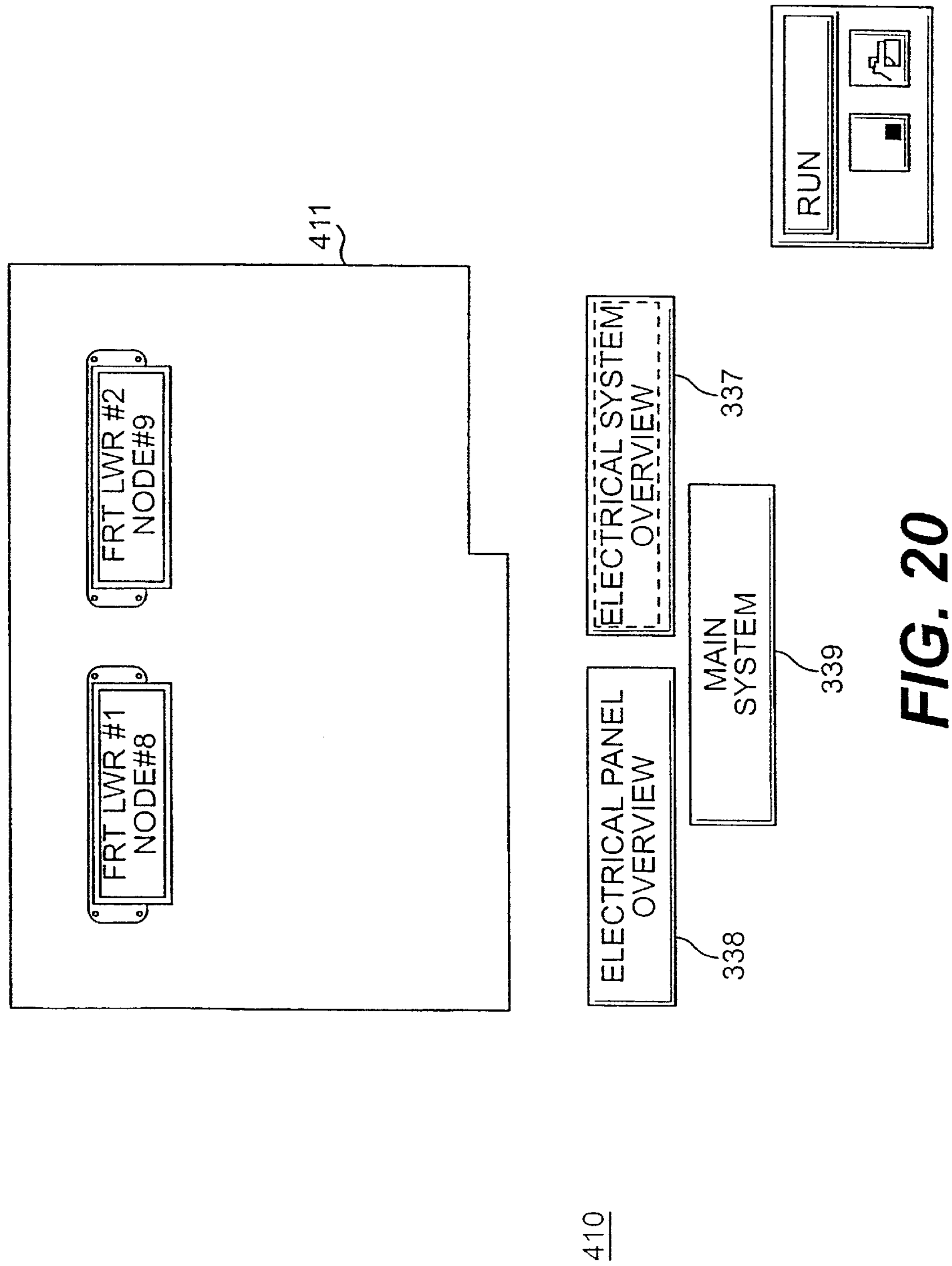
Figure 21:
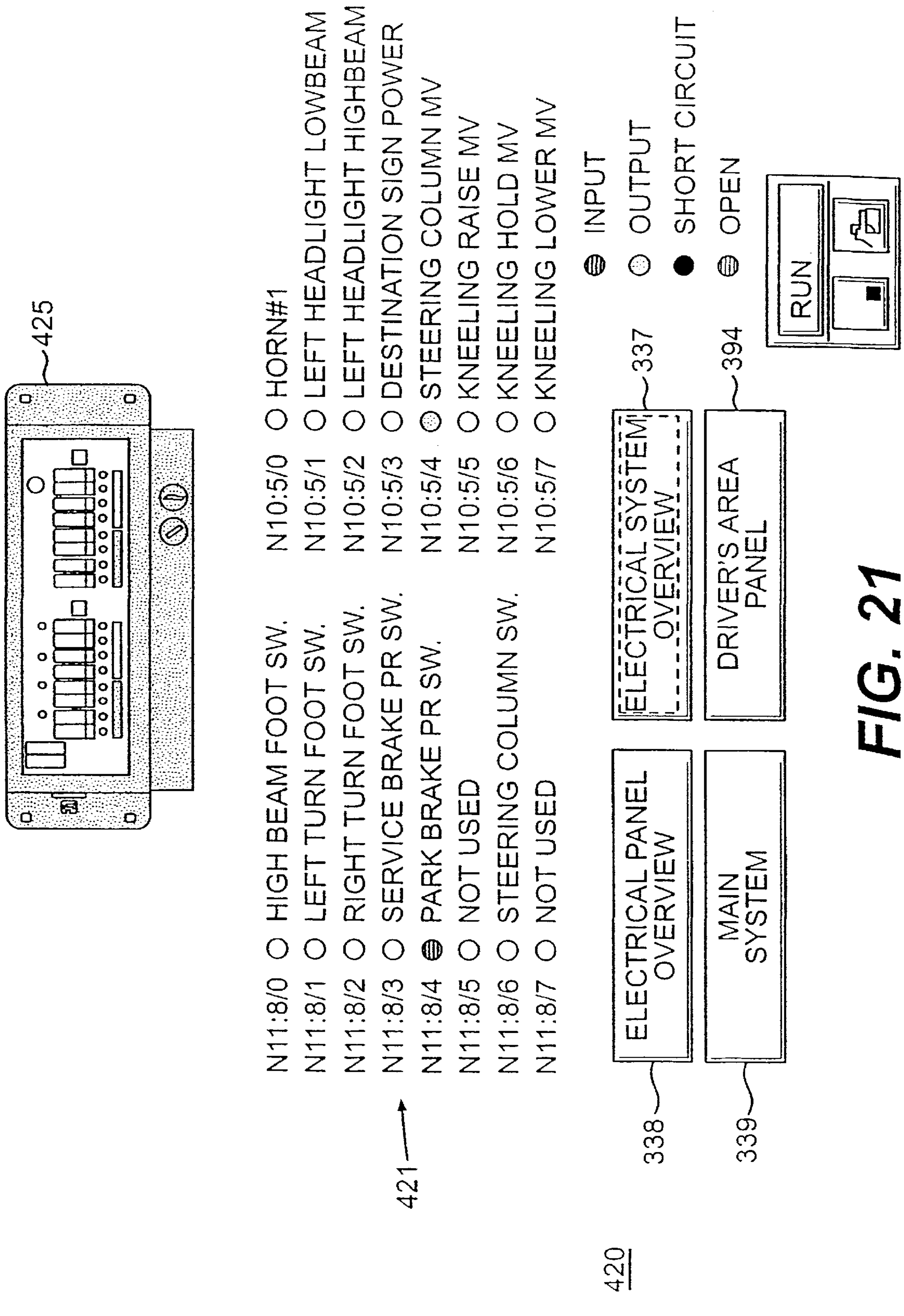
Figure 22:
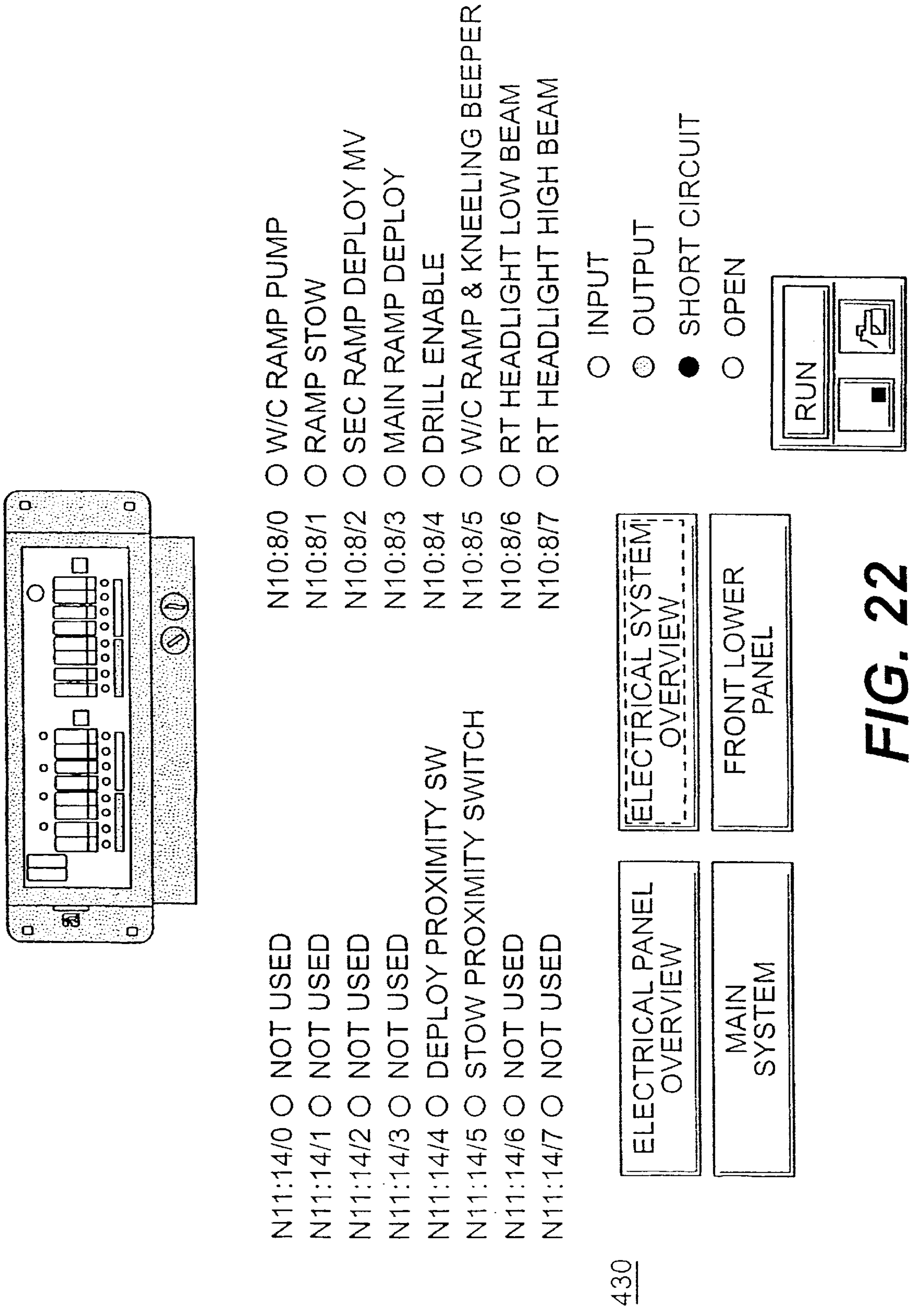
Figure 23:
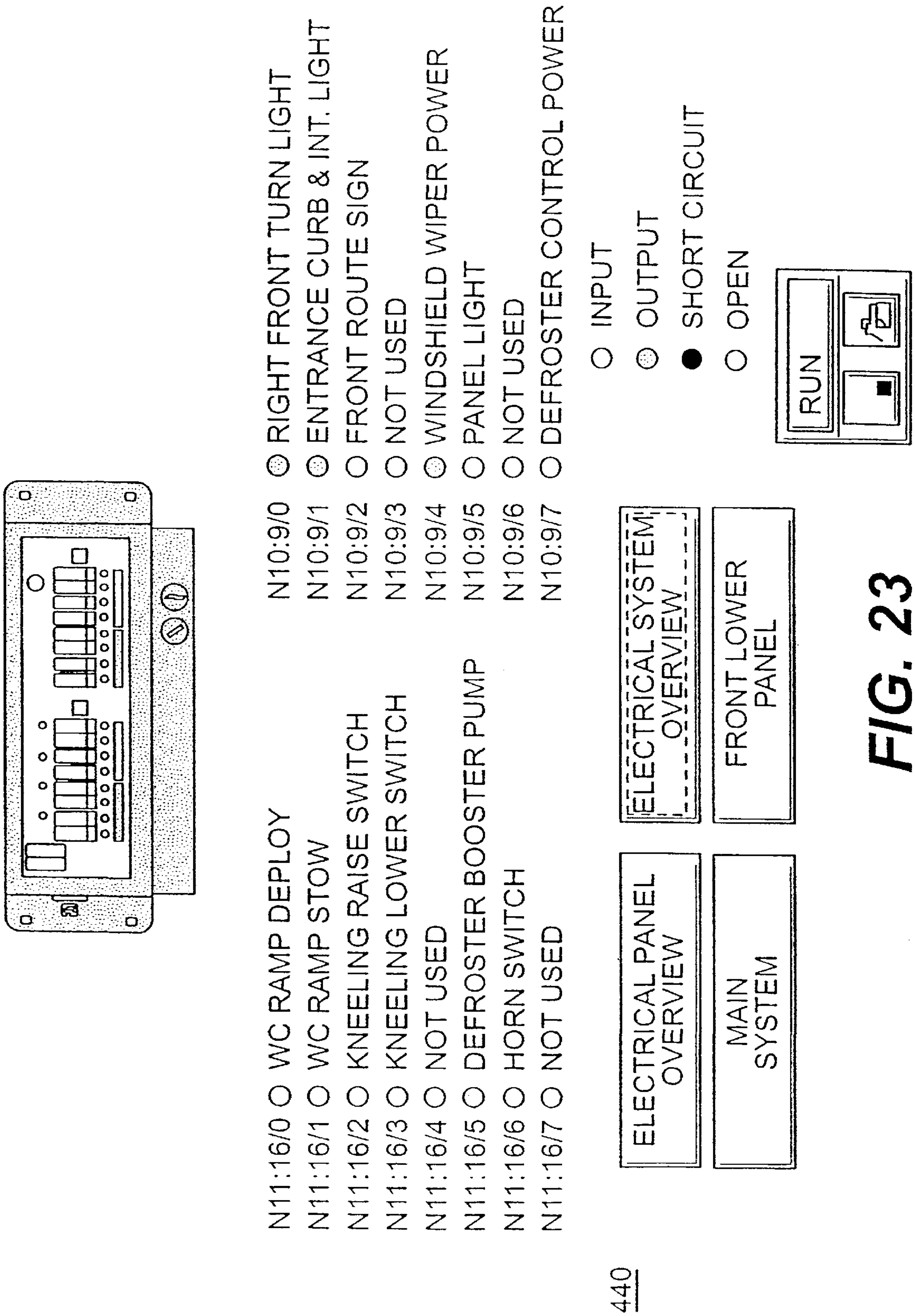
Figure 24:
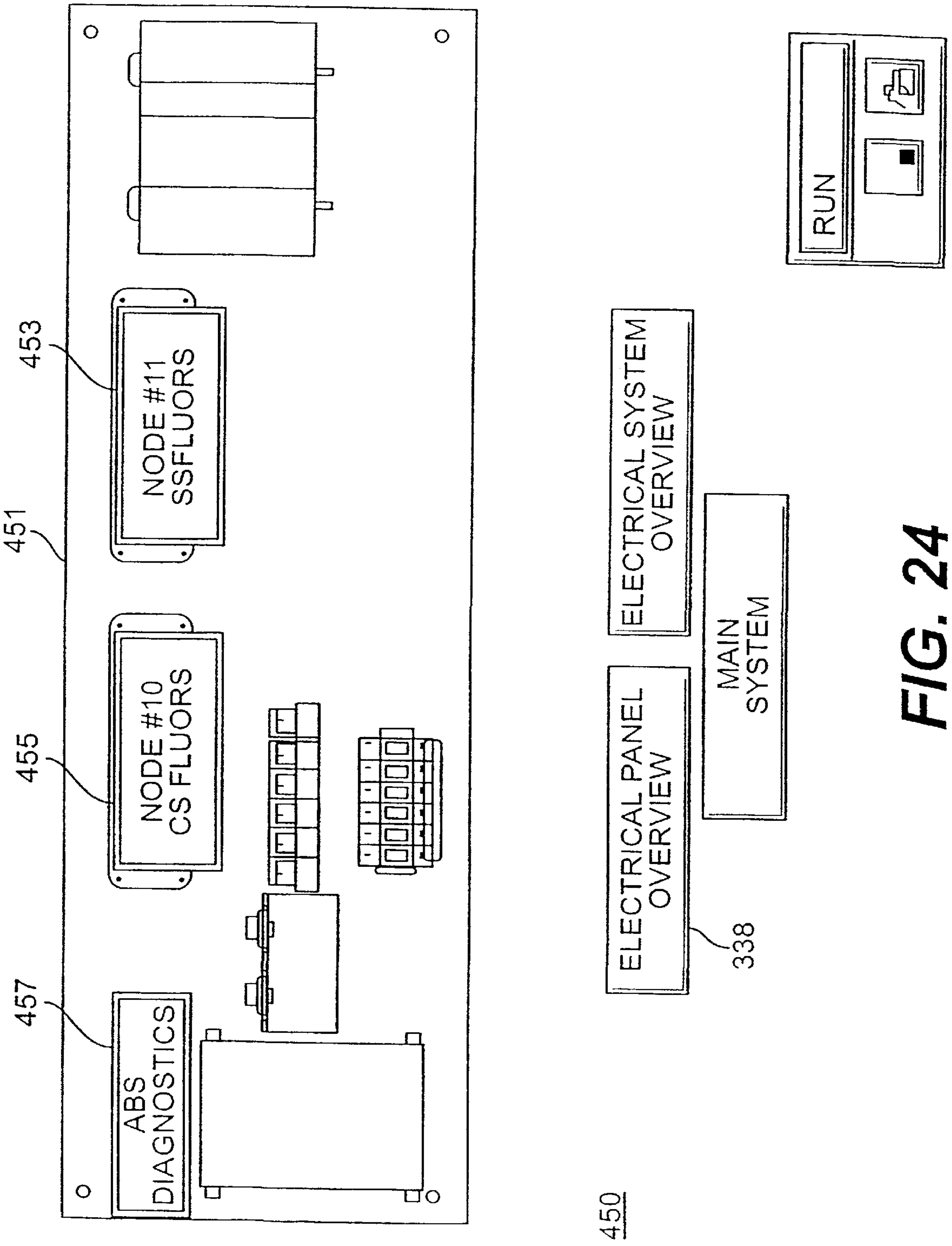
Figure 25:
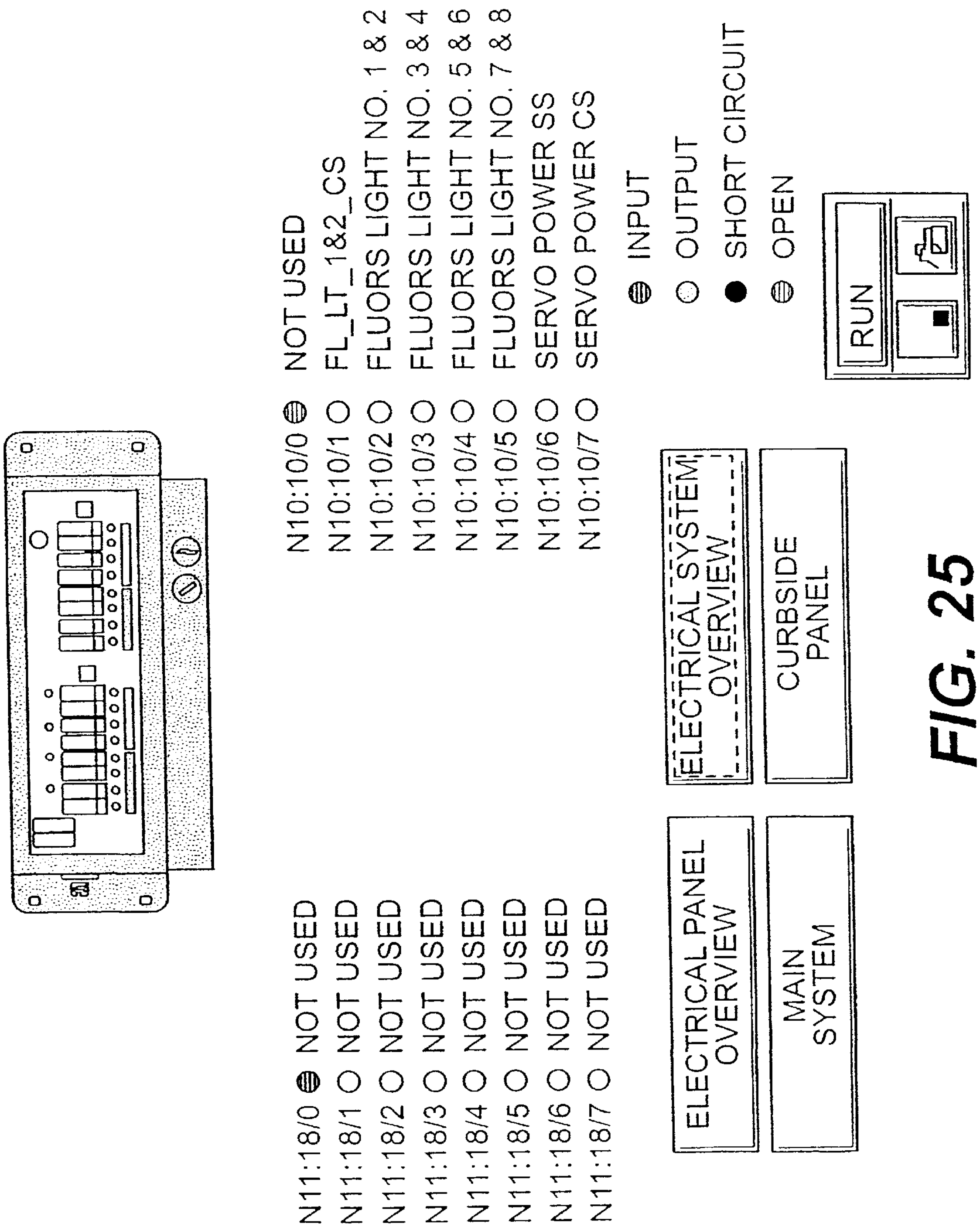
Figure 26:
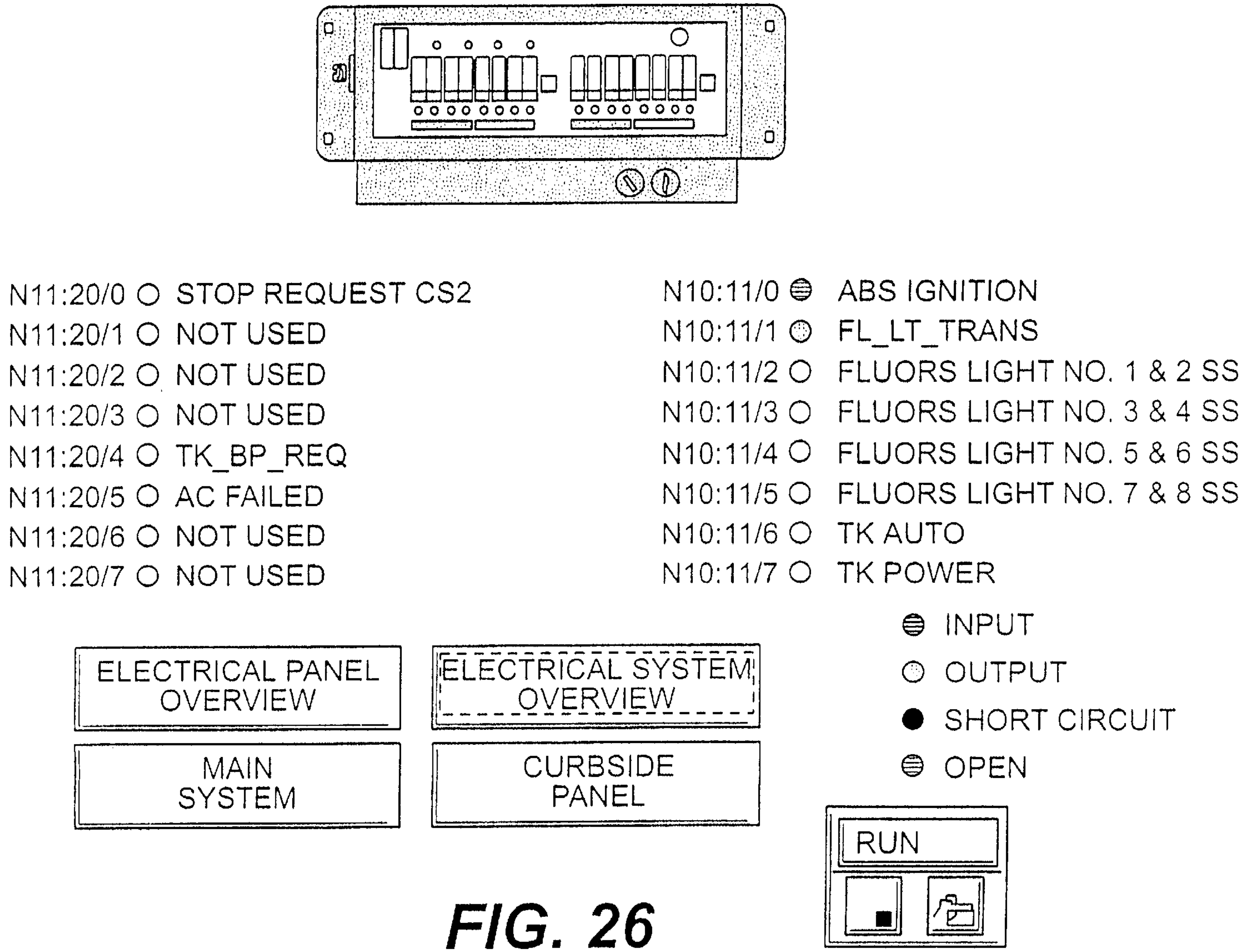
Figure 27:
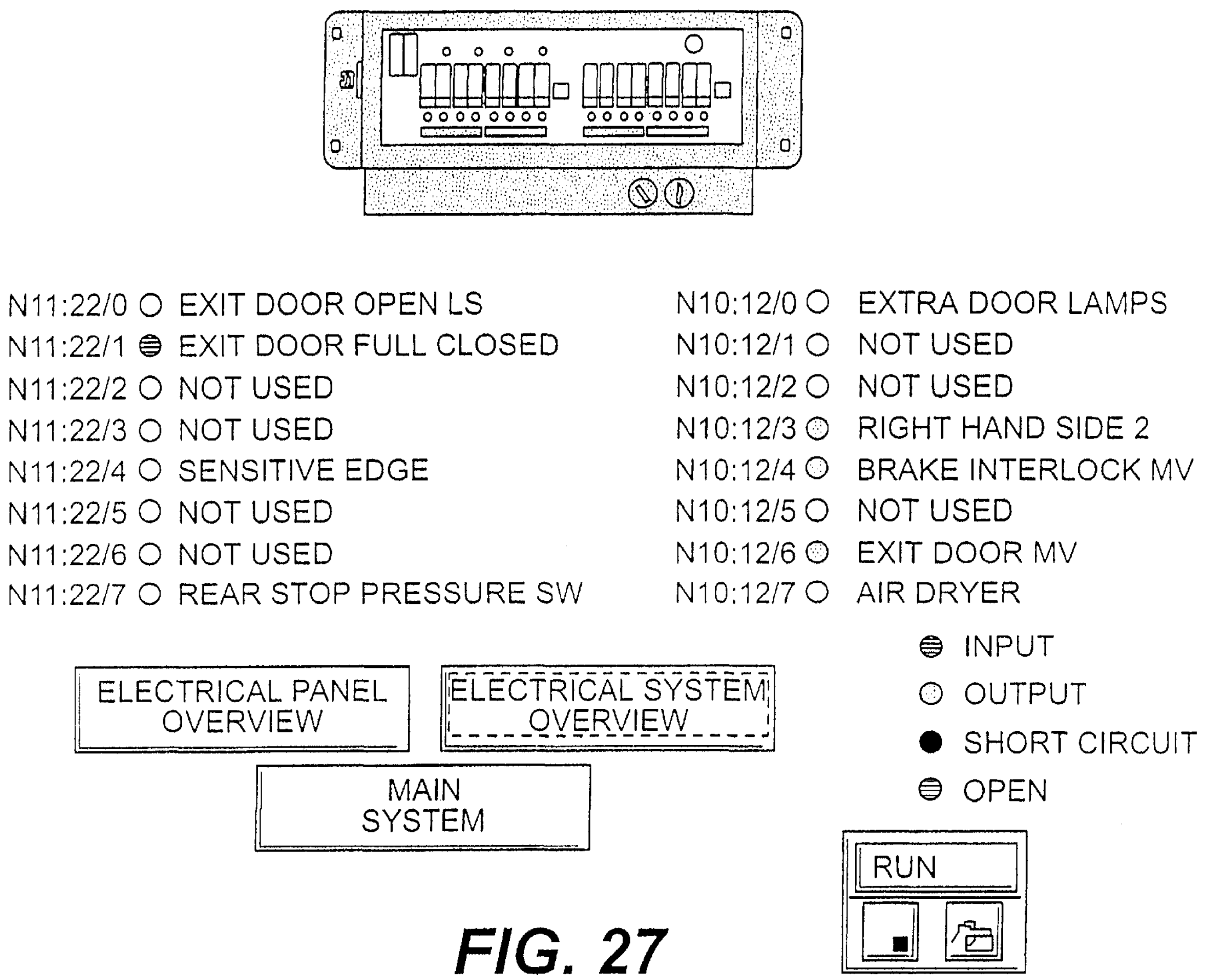
Figure 28:
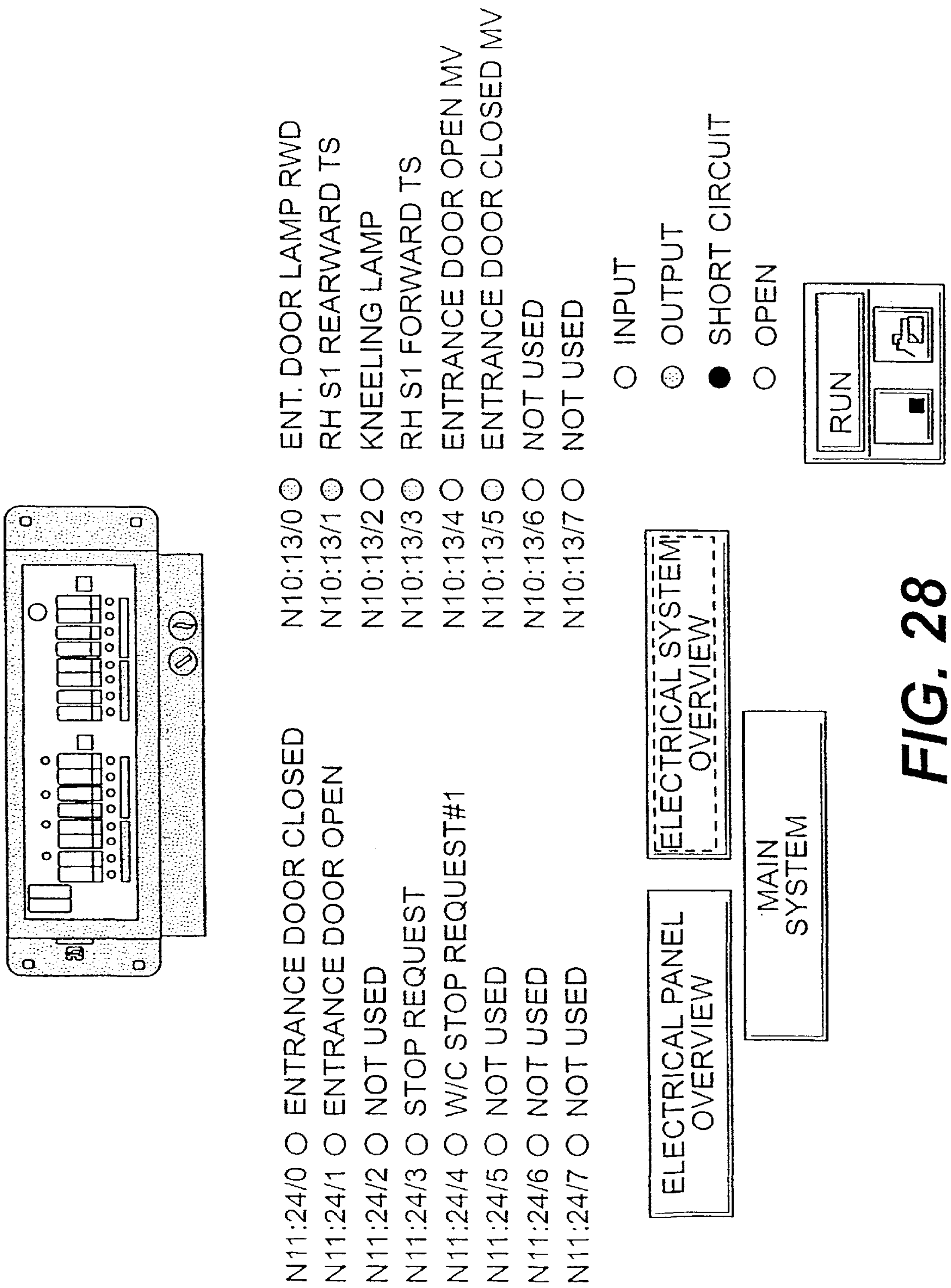
Figure 29:
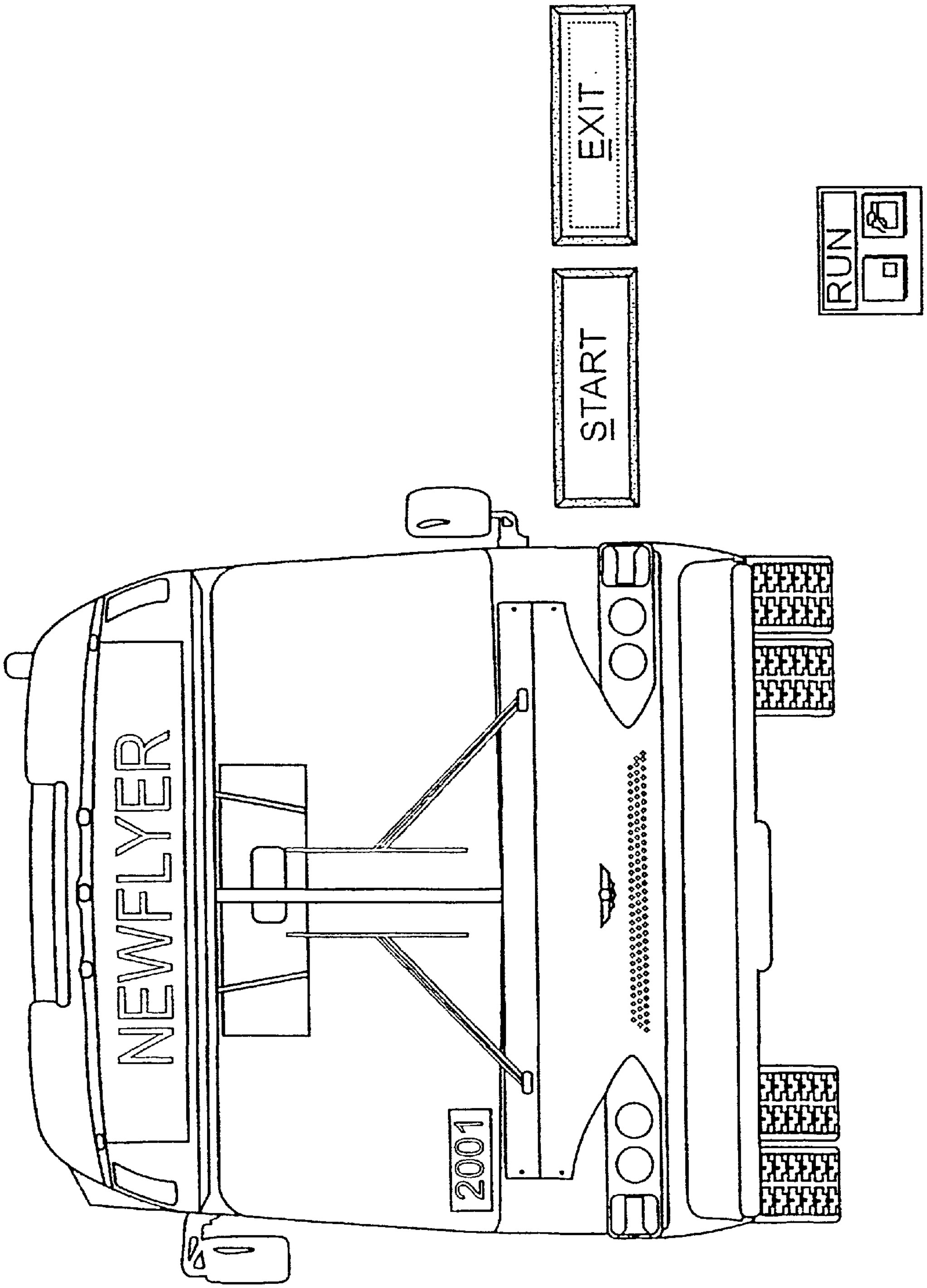

FIG. 15 illustrates a node page 370 for rear deck #1 node 2. The page 370 includes a graphical representation 374 of a transit block, address column 375, indicator column 376 and function column 377. Also included are links 337, 338, 339 and 364 to other pages.

FIGS. 16–29 illustrate other node pages that are available with the system 100 of FIG. 1.

Figure 30:
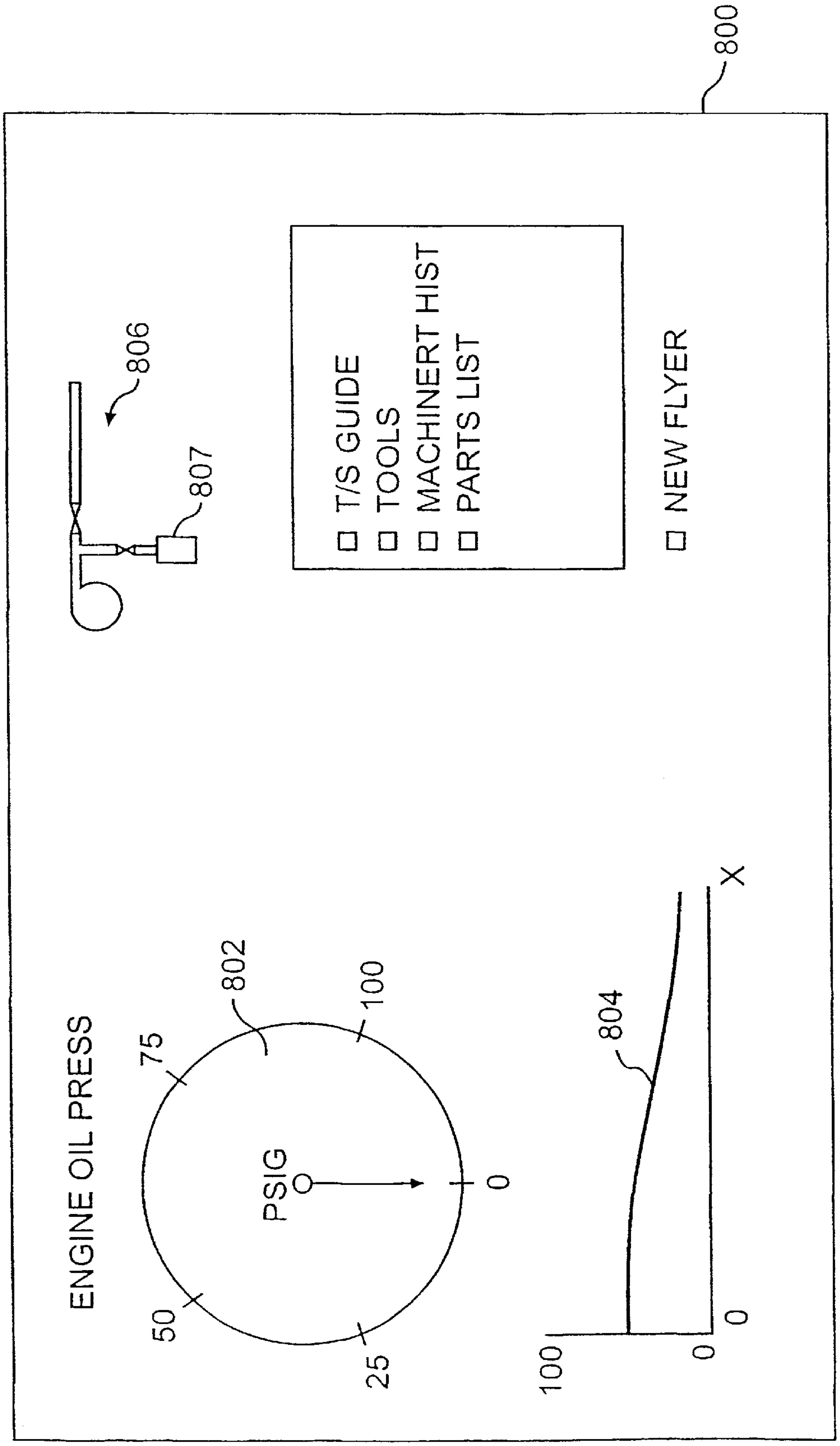
Figure 31A:
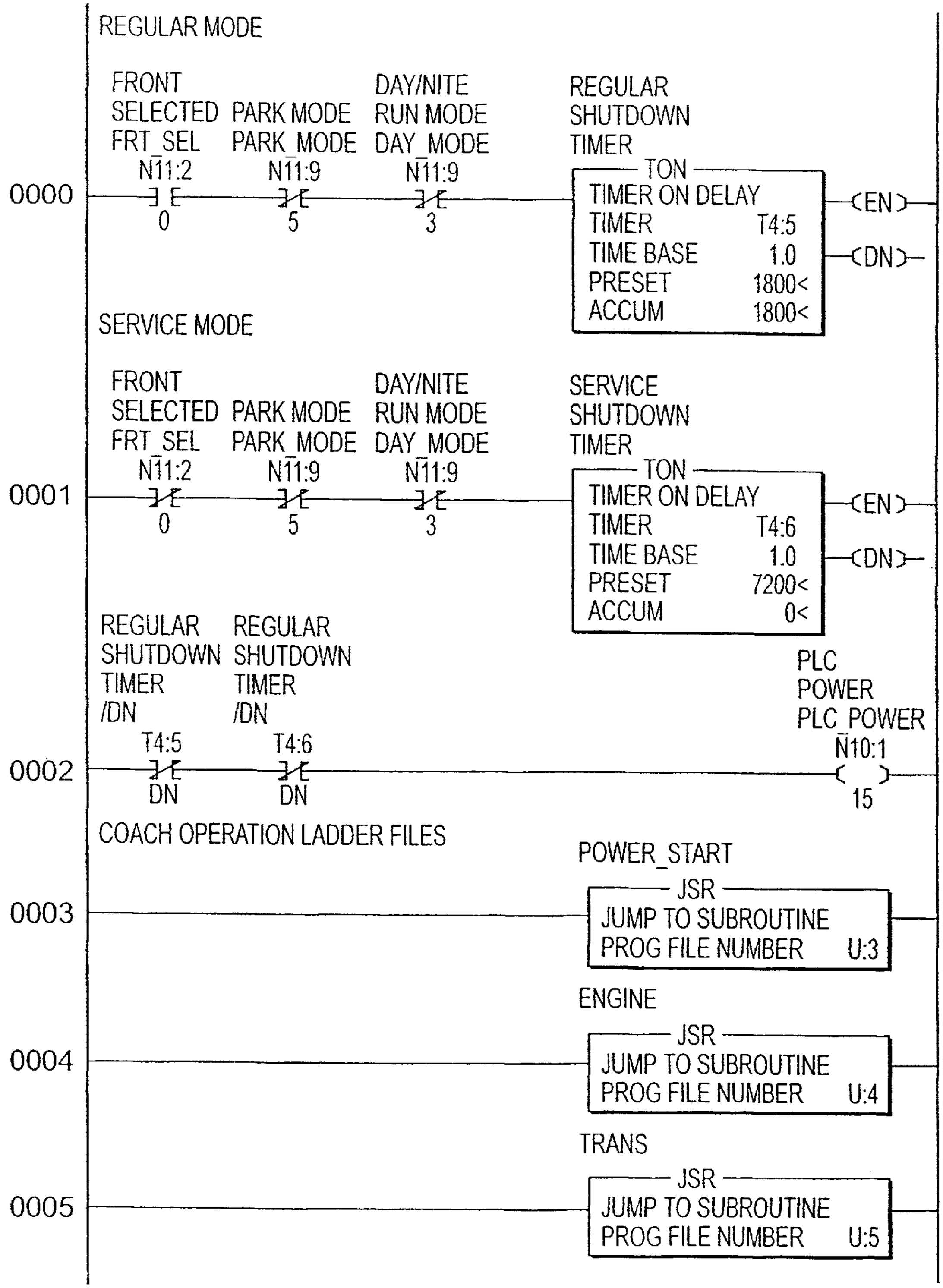
FIG. 31 illustrate's a human to machine interface displaying a virtual display device.
Figure 31B:
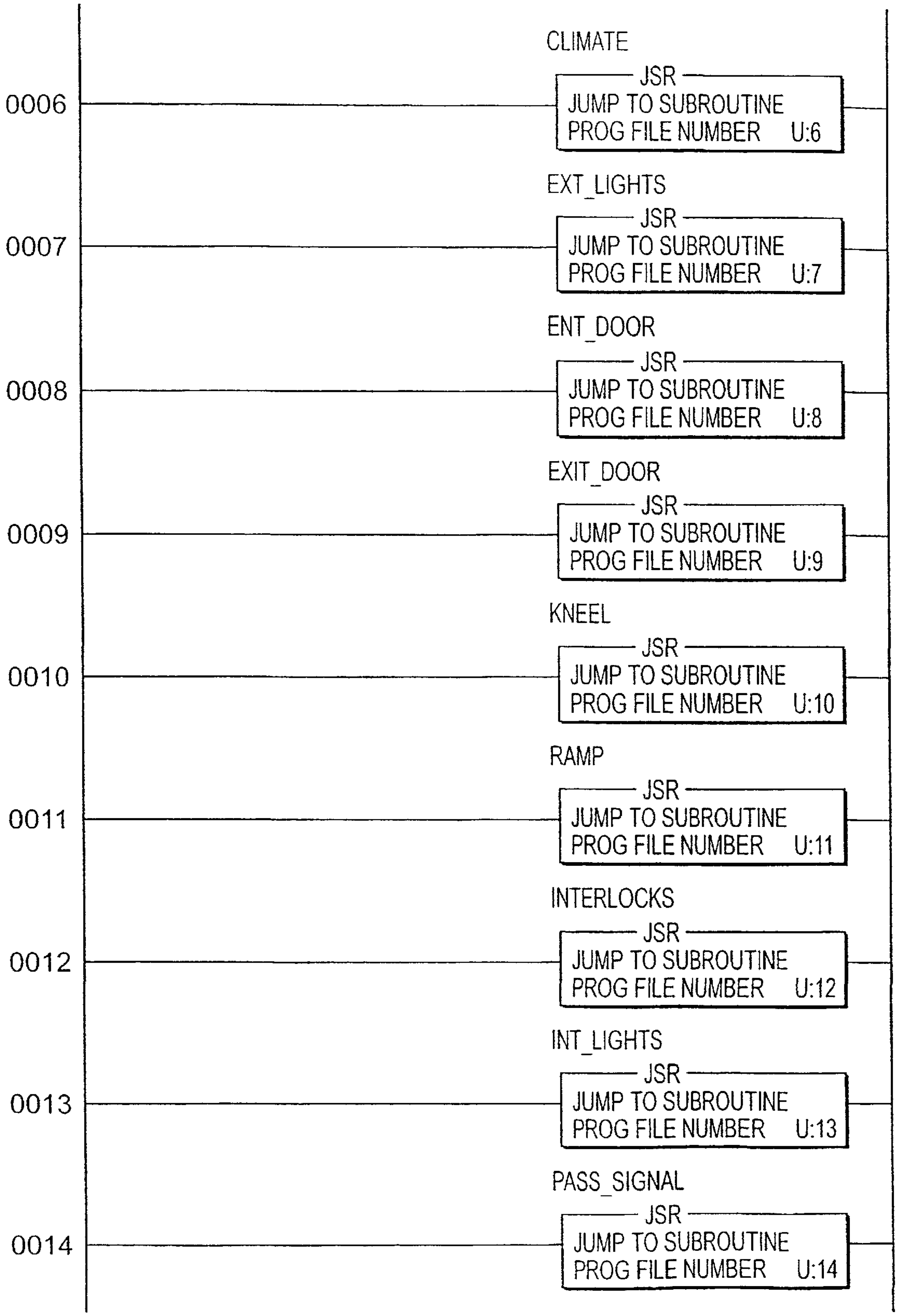
Figure 31C:
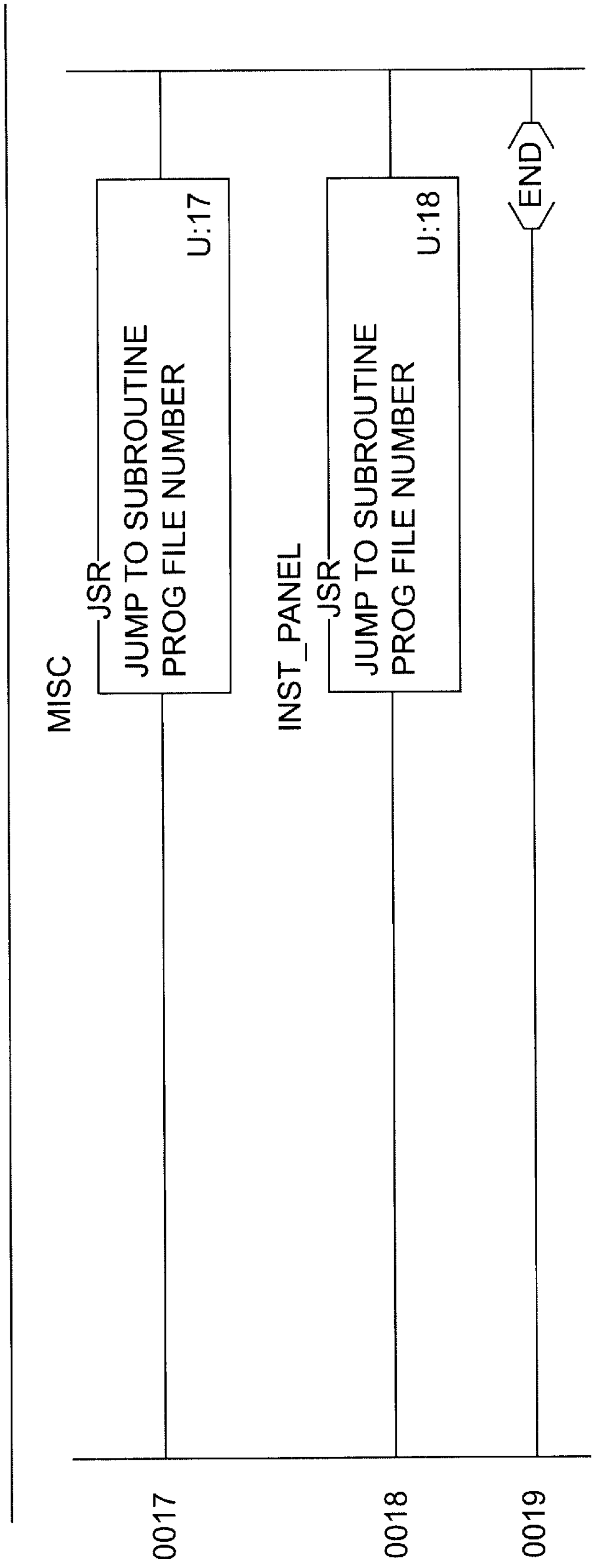

FIG. 30 illustrates an HMI 800 that may be used to monitor operation of a bus subsystem, and to perform diagnostics and trouble shooting. The HMI 800 includes a virtual gage 802 that may be used to display, in real-time, or near real time, a measured parameter in bus subsystem. The gage may also be programmed to display historical data, such as data stored in the database 22 of FIG. 1. In the illustrated example, the bus subsystem may be an engine oil subsystem, and the virtual gage 802 may be programmed to display measured oil pressure at an outlet of an oil pump. The gage 802 may operate based on transfer of data between the bus subsystem and the processor driving the HMI 800. The gage 802 may also provide a visual indication when the bus subsystem itself does not include an actual oil pressure gage. The HMI 800 is also shown capable of displaying oil pressure data in a graphical format 804 over a time period selected by the technician. Such graphical display may use real-time or near real time data, or data stored in the database 22. The HMI 800 may include a schematic 806 showing the location of a pressure sensor 807 in the engine oil subsystem. The HMI may include a two or three-dimensional drawing showing the location of the pressure sensor 807 in the actual bus. The HMI 800 may include other troubleshooting and diagnostics features, such as procedures to remove the pressure sensor, a list of symptoms, possible causes, and suggested corrective actions. Other features may include types/sizes of tools needed to repair a problem, a machinery history record for the pressure sensor and other engine oil subsystem components, a parts list, and a link to automatically order any listed part from the bus manufacturer. The HMI may also include a link to the bus manufacturer that transfers selected data, such as data that allows the bus manufacturer to aggregate data related to the performance of specific bus components.

When the HMI 800 is displayed, the technician may then link to other objects in the database 22 that correspond to a function by, for example, selecting the desired function, and "clicking-on" with a mouse or other pointing device. The technician will then be presented with a page showing the corresponding virtual object. The virtual object may be selected to display a current (and varying) value, or may display historical data stored in the database 22.

The pressure gage 802 (or other virtual object displayed on an HMI) may be linked, or tagged to a specific item in a ladder program that is used to operate the bus. For example, the gage 802 may be tagged to the item PLC_POWER (at address N:10:1) shown in FIG. 31*a*.

Figure 32A:
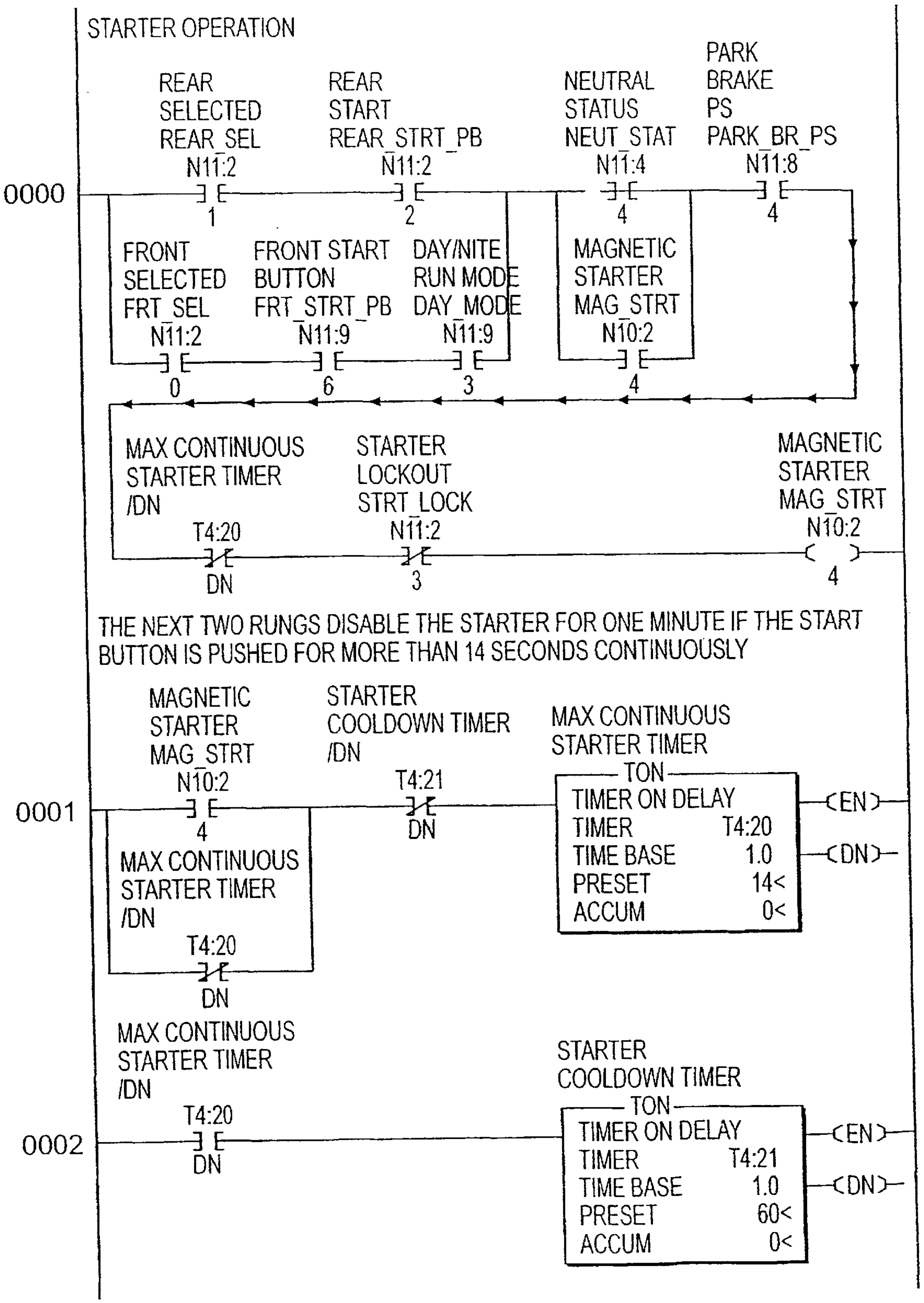
FIGS. 32*a*–48 illustrate ladder programs used in the bus operating system of FIG. 1.
Figure 32B:
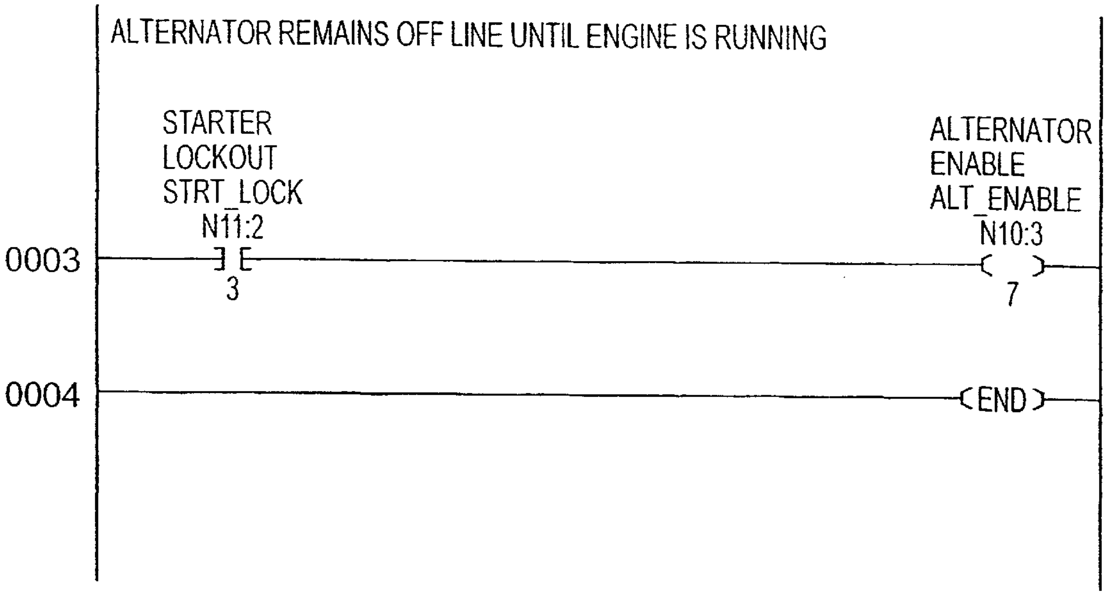

FIGS. 31*a*–48 illustrate representative ladder programs that may be used to control and diagnose the bus. While ladder programming is illustrated, other programming methods may be used. The ladder programs may be accessed at a remote location, or on site on the bus. The ladder functions indicate which parameters must be satisfied in order for the bus to perform a specific function. Taking FIG. 32*a* as an example, the ladder program shows the specific conditions that must be satisfied in order to perform a power start of the bus 100. As shown in FIG. 32*a*, for a rear start, a rear selected switch must be closed (a rear start means that the bus engine is started from the engine compartment, as opposed to the driver's station).

When accessed from a remote location, the ladder programs may allow the technician to remotely control functions of the bus. A pull down menu tied to the program ladder may include force select and force de-select functions that permit the technician to remotely operate components of the bus 100. Continuing with the example of FIG. 32*a*, a technician at a remote location may desire to enable rear start of a bus, but the displayed ladder program indicates the rear selected switch is open. The technician may, using an appropriate pointing device, a mouse for example, select the rear selected switch, "right click" to display a pull down menu, and select a force select feature from the menu. This process send a signal to the system 10 on the bus 100, causing the rear selected switch to close.

What is claimed is:

1. A system for optimum allocation of bus resources, comprising:

one or more buses, each of the one or more buses comprising:

a geo-satellite positioning system (GPS) receiver capable of receiving GPS ranging signals, and a processor that computes bus position and bus attitude based on the received GPS ranging signals; and a local bus operating center in communication with the one or more buses, comprising:

a transceiver that receives a bus position and a bus attitude for a bus, a database that includes expected bus position information for the bus, and a processor that compares the expected bus position information and the received bus position, and that generates an alert based on a mismatch between the expected bus position information and the received bus position, and determines a corrective action if the bus attitude is unusual, wherein the processor provides reroute information to the bus and computes a required speed for the bus to remain on schedule based on the reroute information.

2. The system of claim 1, wherein the database further includes dynamic obstacle information including a location and time reference for an obstacle, and wherein the processor determines if the obstacle location may interfere with the expected bus information.

3. The system of claim 2, wherein when the obstacle location interferes with the expected bus position, the processor issues an alert.

4. The system of claim 3, wherein the processor computes a revised bus route avoiding the obstacle and the transceiver provides the revised bus route to the bus.

5. The system of claim 1, wherein the GPS receiver uses differential GPS (DGPS) to remove errors caused by uncertainties in propagation times in GPS ranging calculations.

6. The system of claim 1, wherein the processor at the local bus operating center provides an indication of an expected delay in reaching all stops based on the reroute information.

7. The system of claim 1, wherein the processor at the local bus operating center continually updates expected route completion time for the one or more buses.

8. The system of claim 1, wherein each of the one or more buses further comprises a driver interface capable of presenting information to a bus driver.

9. The system of claim 8, wherein the driver interface includes a heads-up display feature the projects digital images of bus parameters for the bus driver.

10. The system of claim 8, wherein the driver interface includes a speech recognition device capable of receiving spoken commands from the bus driver.

11. The system of claim 1, wherein the GPS receiver ranging signals are modulated with pseudo-random ranging codes.

12. The system of claim 1, wherein the local bus operating center communicates with the one or more buses using a communications network.

13. The system of claim 12, wherein the communications network permits bi-directional communication between the local bus operating center and the one or more buses.

14. The system of claim 12, wherein the communications network is a radio control link.

15. The system of claim 1, wherein the one or more buses further comprises a television camera with wide angle lens capable of scanning roads ahead of the one or more buses.

16. A method for optimizing allocation of buses in a mass transit system, comprising:

receiving a GPS ranging signal at a bus;

determining a current bus location and attitude based on the GPS ranging signal;

determining an expected bus location based on a designated bus route;

comparing the current bus location and the expected bus location;

if the location comparison indicates a mismatch, issuing an alert;

if the attitude determination indicates an unusual attitude, determining corrective action;

providing reroute information to the bus; and computing a required speed for the bus to remain on schedule based on the reroute information.

17. The method of claim 16, further comprising using differential GPS (DGPS) to remove errors caused by uncertainties in propagation times in GPS ranging calculations.

18. The method of claim 16, further comprising an indication of an expected delay in reaching all bus stops based on the reroute information.

19. The method of claim 16, further comprising continually updating expected route completion time for the bus.

20. A method for optimizing allocation of buses in a mass transit system, comprising:

receiving a GPS ranging signal at a bus;

determining a current bus location and attitude based on the GPS ranging signal;

determining an expected bus location based on a designated bus route;

comparing the current bus location and the expected bus location;

if the location comparison indicates a mismatch, issuing an alert;

if the attitude determination indicates an unusual attitude, determining corrective action;

providing reroute information to the bus;

computing a required speed for the bus to remain on schedule based on the reroute information;

providing an indication of an expected delay in reaching all stops based on the reroute information; and continually updating expected route completion time for the bus.

* * * * *